United States Patent
Takizawa et al.

(10) Patent No.: US 12,100,852 B2
(45) Date of Patent: Sep. 24, 2024

(54) BATTERY WITH A HANDLE

(71) Applicant: HONDA MOTOR CO., LTD., Tokyo (JP)

(72) Inventors: Daijiro Takizawa, Wako (JP); Keiichi Ito, Wako (JP); Nobuo Shigemizu, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 18/259,464

(22) PCT Filed: Dec. 15, 2021

(86) PCT No.: PCT/JP2021/046204
§ 371 (c)(1),
(2) Date: Jun. 27, 2023

(87) PCT Pub. No.: WO2022/145224
PCT Pub. Date: Jul. 7, 2022

(65) Prior Publication Data
US 2024/0039101 A1    Feb. 1, 2024

(30) Foreign Application Priority Data
Dec. 28, 2020 (JP) .................................. 2020-219264

(51) Int. Cl.
*H01M 50/244* (2021.01)
*H01M 50/213* (2021.01)
(Continued)

(52) U.S. Cl.
CPC ....... *H01M 50/244* (2021.01); *H01M 50/213* (2021.01); *H01M 50/256* (2021.01); *H01M 50/296* (2021.01)

(58) Field of Classification Search
CPC .................................................. H01M 50/256
See application file for complete search history.

(56) References Cited

U.S. PATENT DOCUMENTS
2020/0227928 A1    7/2020   Matsumoto et al.

FOREIGN PATENT DOCUMENTS
EP    2 280 436 A2    2/2011
EP    3 644 394 A1    4/2020
(Continued)

OTHER PUBLICATIONS

International Search Report, International Application No. PCT/JP2021/046204, Date of mailing: Mar. 1, 2022, 2 pages.

*Primary Examiner* — Jonathan Crepeau
(74) *Attorney, Agent, or Firm* — Rankin, Hill & Clark LLP

(57) ABSTRACT

A battery capable of leading a user to grip a grip part such that the posture of the battery becomes a prescribed posture when the user lifts up the battery. The battery has an approximately rectangular parallelepiped outer shape, and is provided with a third surface, a fourth surface, a fifth surface, and a sixth surface that are approximately orthogonal to a first surface and a second surface respectively at both ends in a longitudinal direction. A handle has a first portion provided near the third surface side to extend from the fifth surface side to the sixth surface side, and a second portion provided to extend from the third surface side toe the fourth surface side.

4 Claims, 50 Drawing Sheets

(51) Int. Cl.
*H01M 50/256* (2021.01)
*H01M 50/296* (2021.01)

(56) References Cited

FOREIGN PATENT DOCUMENTS

| | | |
|---|---|---|
| JP | 11-120973 A | 4/1999 |
| JP | 2011-049151 A | 3/2011 |
| JP | 2019-068719 A | 4/2019 |
| WO | 2018/235204 A1 | 12/2018 |
| WO | 2019/065495 A1 | 4/2019 |
| WO | WO 2019064721 * | 4/2019 |

* cited by examiner

FIG. 23
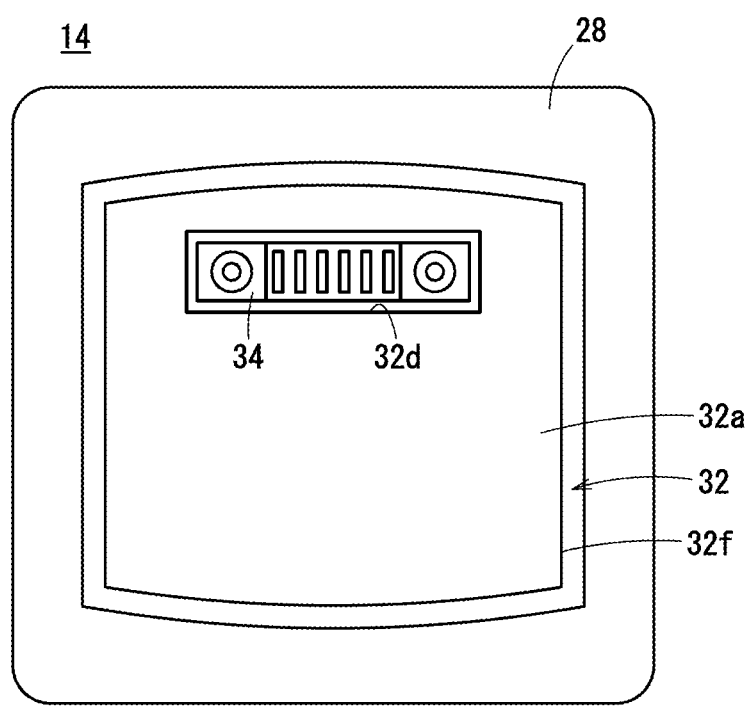
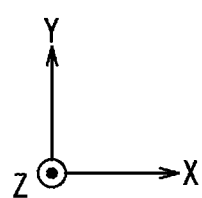

FIG. 36

| STATE | MOVEMENT OF CAM AND LATCH IN DIRECTION OF ROTATION | MOVEMENT OF CAM AND LATCH IN AXIAL DIRECTION | MOVEMENT OF BATTERY LOCK MECHANISM |
|---|---|---|---|
| LOWEST POINT STATE | | | |
| LOCKED STATE | | | |

FIG. 37

| STATE | MOVEMENT OF CAM AND LATCH IN DIRECTION OF ROTATION | MOVEMENT OF CAM AND LATCH IN AXIAL DIRECTION |
|---|---|---|
| LOCKED STATE | 84, 86b1, 86, 84b1, 86b | 86b1, 84b, 86b, 84b2, P4, P3, P1, P2, 86, 88, 68, 84, 84b1, 86b2, BIASING FORCE (COIL SPRING), Z |
| STATE DURING RELEASE OF LOCK | 84, 86b1, 86, 84b1, 86b | ROTATING FORCE (MOTOR), ROTATION, P4, P3, P1, P2, 86b1, 86, MOVEMENT, 88, 68, 84, 84b, 84b1, 86b2, 86b, 84b2, BIASING FORCE (COIL SPRING), Z |
| LOCK RELEASED STATE | 84, 84b1, 86b1, 86, 86b | BIASING FORCE (TORSION SPRING), 84b, 84b1, P4, P3, P1, P2, 86, 88, 68, 84, 86b1, 86b, BIASING FORCE (COIL SPRING), Z |

BATTERY WITH A HANDLE

TECHNICAL FIELD

The present invention relates to a battery including a grip member that is gripped by a user.

BACKGROUND ART

In WO 2018/235204 A1, a battery unit is disclosed. The outer shape of the battery unit is formed substantially in the shape of a rectangular parallelepiped. The battery unit includes a grip member on an upper surface thereof. The battery unit is accommodated in an accommodating slot of an electric vehicle. The battery unit is used as an electrical power source for the electric vehicle. Further, the battery unit is accommodated in an accommodating slot of a charging station. Charging of the battery unit is carried out by the charging station.

SUMMARY OF THE INVENTION

The battery unit disclosed in WO 2018/235204 A1 is provided with connection terminals on a bottom surface of a main body portion. In a state in which the battery unit is accommodated in the accommodating slot, the connection terminals are connected to terminals that are provided in the accommodating slot. The connection terminals of the battery unit are provided at a position that is shifted from the center of the bottom surface. Therefore, it is necessary that the battery unit be accommodated in a prescribed posture in the accommodating slot. However, the battery unit disclosed in WO 2018/235204 A1 has a problem in that the battery unit is accommodated in the accommodating slot in a posture that differs from such a prescribed posture.

The present invention has the object of solving the aforementioned problem.

An aspect of the present invention is characterized by a battery having a substantially rectangular parallelepiped outer shape, the battery comprising a first surface and a second surface which are side surfaces of both ends thereof in a longitudinal direction, a third surface which is a side surface substantially perpendicular to the first surface and the second surface, a fourth surface which is a side surface substantially perpendicular to the first surface and the second surface, and which is on an opposite side from the third surface, a fifth surface which is a side surface substantially perpendicular to the first surface, the second surface, the third surface, and the fourth surface, a sixth surface which is a side surface substantially perpendicular to the first surface and the second surface, and which is on an opposite side from the fifth surface, and a grip member provided on the first surface, wherein the grip member includes a first portion configured to extend in a direction from the fifth surface toward the sixth surface, at a position between the third surface and the fourth surface and closer to the third surface than the fourth surface, and a second portion configured to extend in a direction from the third surface toward the fourth surface, at an intermediate part in the direction from the fifth surface toward the sixth surface, in a longitudinal direction of the first portion, an intermediate part of the first portion is separated from the first surface, and both end parts of the first portion are connected to the first surface, the second portion includes a first end part and a second end part which are end parts in a longitudinal direction of the second portion, and an intermediate part which is a portion between the first end part and the second end part, the first end part of the second portion is connected to the intermediate part of the first portion and is separated from the first surface, the intermediate part of the second portion is separated from the first surface, and the second end part of the second portion is directly connected to the first surface.

According to the present invention, the battery unit can be accommodated in a prescribed posture in the accommodating slot.

BRIEF DESCRIPTION OF DRAWINGS

FIG. 23 is a front view of the slot;

FIG. 36 is a table showing movement in the direction of rotation of the cam and the latch, movement in the axial direction of the cam and the latch, and movement of the battery lock mechanism;

FIG. 37 is a table showing movement in the direction of rotation of the cam and the latch, and movement in the axial direction of the cam and the latch;

DETAILED DESCRIPTION OF THE INVENTION

First Embodiment

Figure 1:
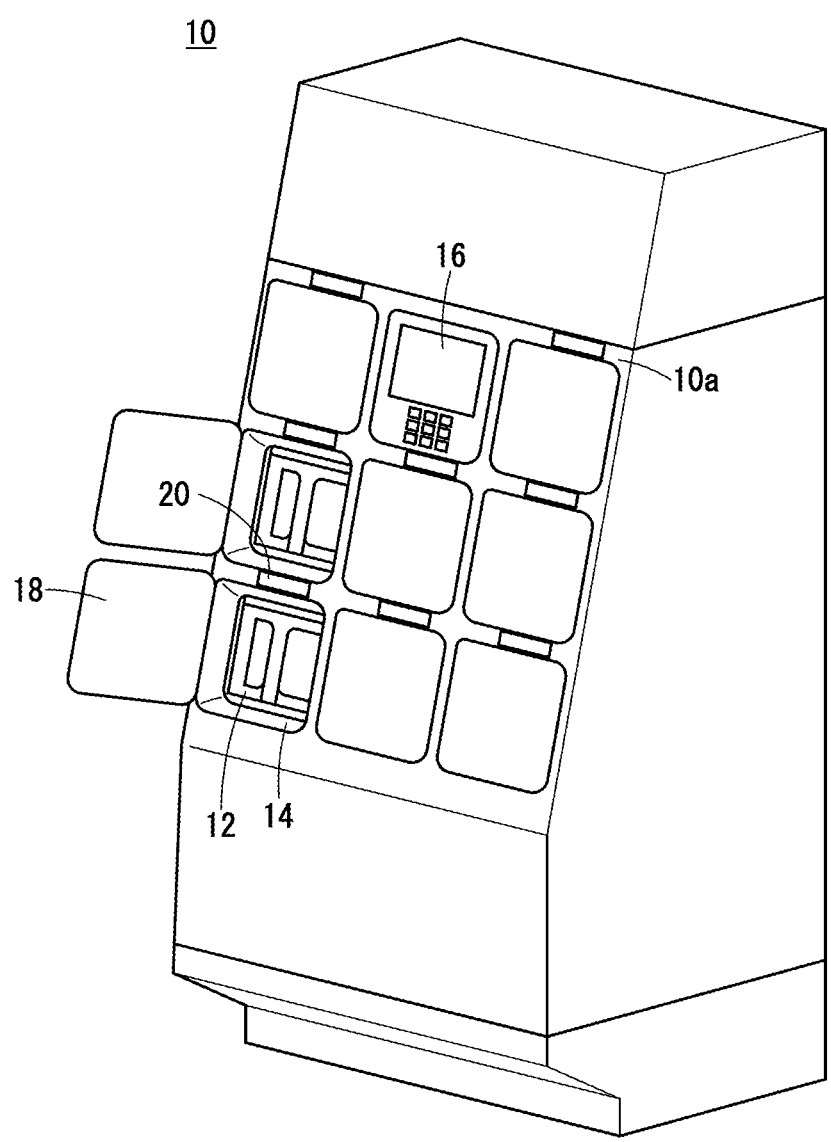
FIG. 1 is an external schematic diagram of a battery exchange device.

FIG. 1 is an external schematic diagram of a battery exchange device 10. The battery exchange device 10 accommodates a mobile battery 12 in the interior thereof. The battery exchange device 10 carries out charging of the mobile battery 12. A user deposits the mobile battery 12 having a low remaining power capacity (SOC: state of charge) in the battery exchange device 10. The user receives another fully charged mobile battery 12 from the battery exchange device 10. The battery exchange device 10 corresponds to an external device of the present invention. The mobile battery 12 corresponds to a battery of the present invention.

The battery exchange device 10 includes eight slots 14. The battery exchange device 10 includes a single operation panel 16. Mobile batteries 12 are accommodated in the slots 14. When the user accommodates the mobile battery 12 in the slot 14 and closes a door 18, the battery exchange device 10 initiates charging of the mobile battery 12. An indicator 20 is provided above the slot 14. The indicator 20 displays the state of charge of the mobile battery 12 that is accommodated in the slot 14 by illumination of colors, flashing, or the like. The operation panel 16 is a device that is operated by the user. By operating the operation panel 16, for example, the user carries out payment of a fee or the like.

The slot 14 opens on a front surface 10a of the battery exchange device 10. The front surface 10a of the battery exchange device 10 is inclined with respect to the vertical direction (the direction of gravity). In a state with the user standing facing the front surface 10a, an upper part of the front surface 10a is positioned more rearward than a lower part thereof. In accordance with this feature, the user is capable of leaning forward at a time when the user inserts the mobile battery 12 into the slot 14. Therefore, it becomes easier to insert the mobile battery 12 into the slot 14.

Figure 2:
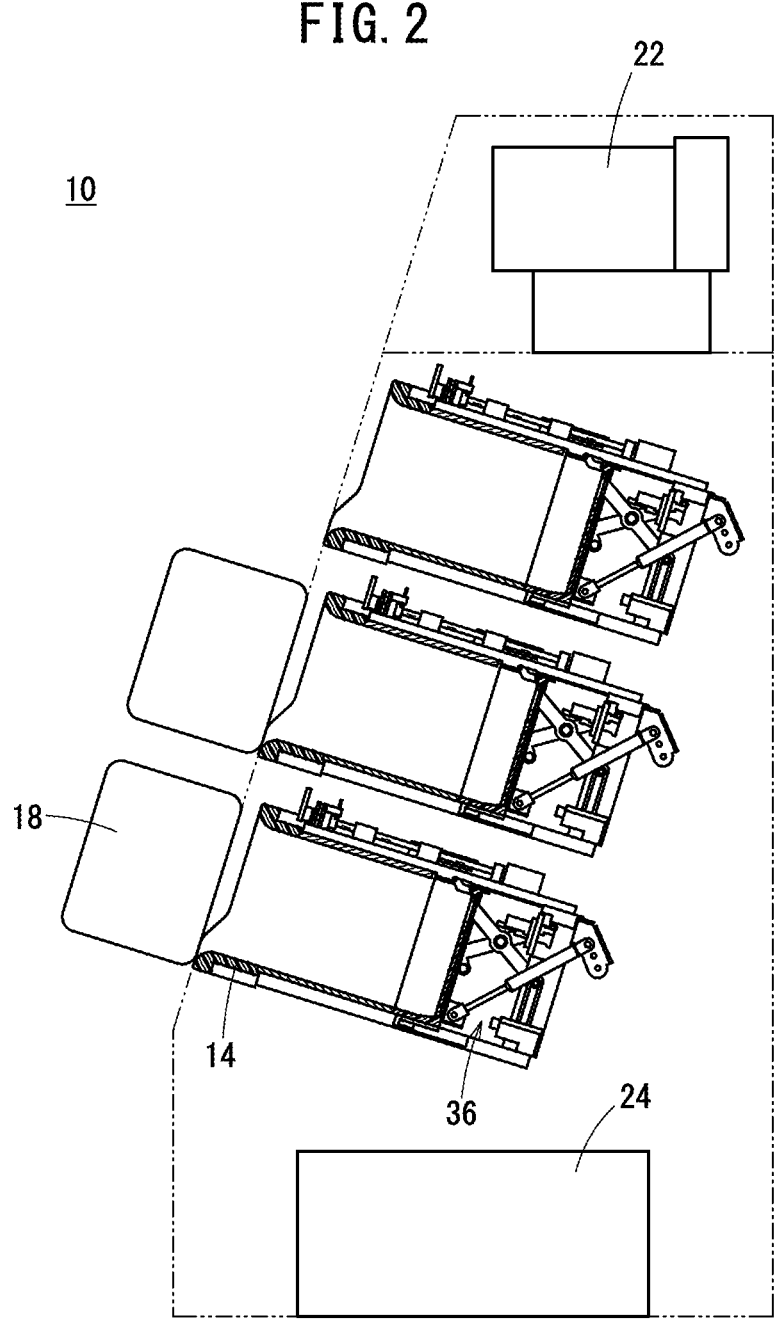
FIG. 2 is a cross-sectional view of the battery exchange device.

FIG. 2 is a cross-sectional view of the battery exchange device 10. The battery exchange device 10 includes a control device 22 located above the slots 14. The control device 22 controls charging or the like of the mobile batteries 12. The battery exchange device 10 includes a utility space 24 located below the slots 14. A cooling device or the like may be installed in the utility space 24. The cooling device serves to cool the interior of the battery exchange device 10.

Figure 3:
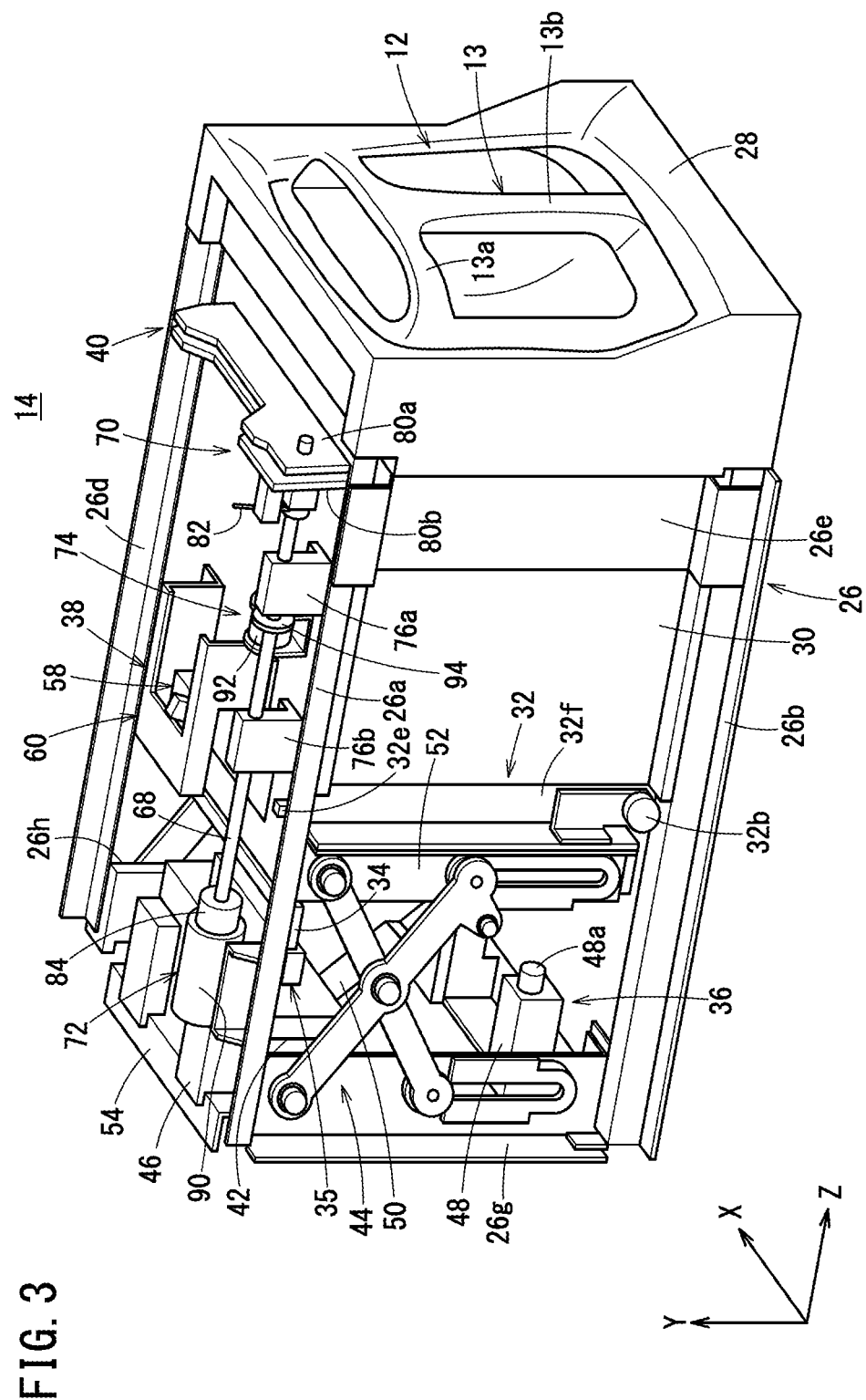
FIG. 3 is a perspective view of a slot.
Figure 4:
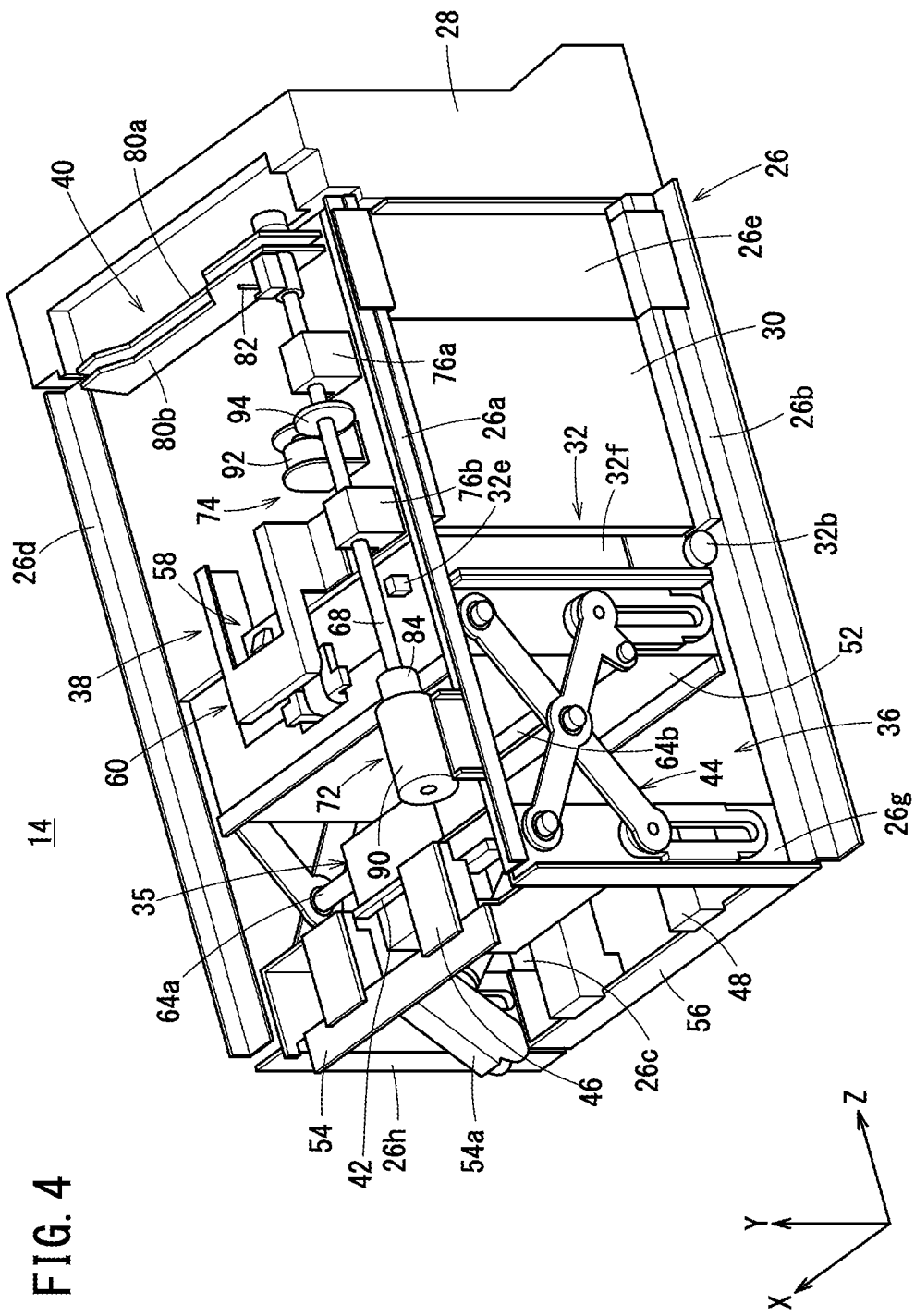
FIG. 4 is a perspective view of the slot.
Figure 5:
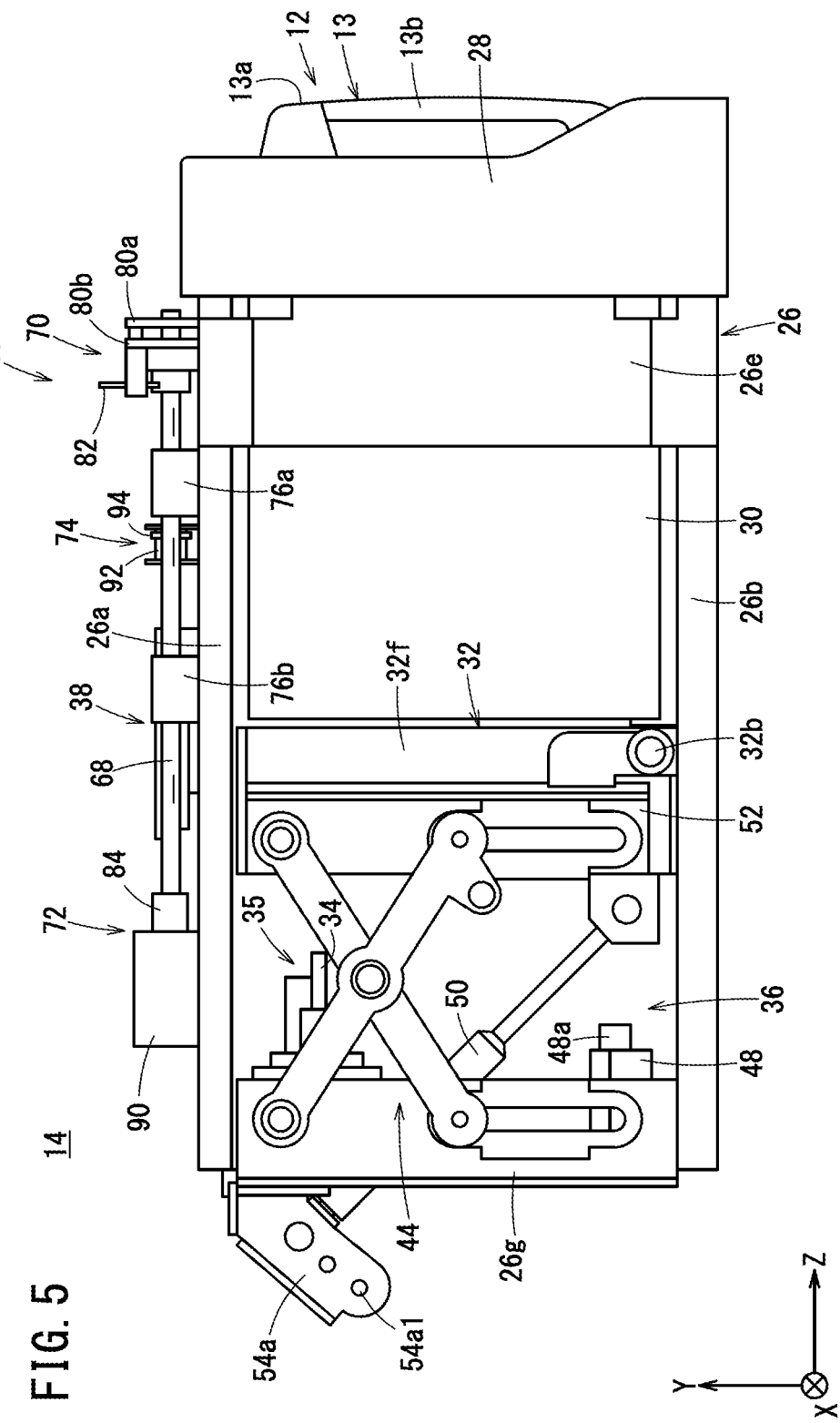
FIG. 5 is a side view of the slot.

FIG. 3 and FIG. 4 are perspective views of the slot 14. FIG. 5 is a side view of the slot 14. The present embodiment will be described based on an X-axis, a Y-axis, and a Z-axis, which are defined in the following manner. The direction in which the mobile battery 12 is inserted into the slot 14 is defined as a Z-axis direction, and a side where the slot 14 opens onto the front surface 10a of the battery exchange device 10 is defined as a positive side. A direction parallel to a widthwise direction of the battery exchange device 10 is defined as an X-axis direction, and a right side thereof when viewed from the side on which the slot 14 opens onto the front surface 10a of the battery exchange device 10 is defined as a positive side. A direction perpendicular to the Z-axis and the X-axis is defined as a Y-axis direction, and an upper side thereof is defined as a positive side.

The slot 14 includes a frame 26, an insertion opening 28, a battery holder 30, a battery tray 32, a connector unit 35, a tray retention mechanism 36, a tray lock mechanism 38, and a battery lock mechanism 40.

Figure 6:
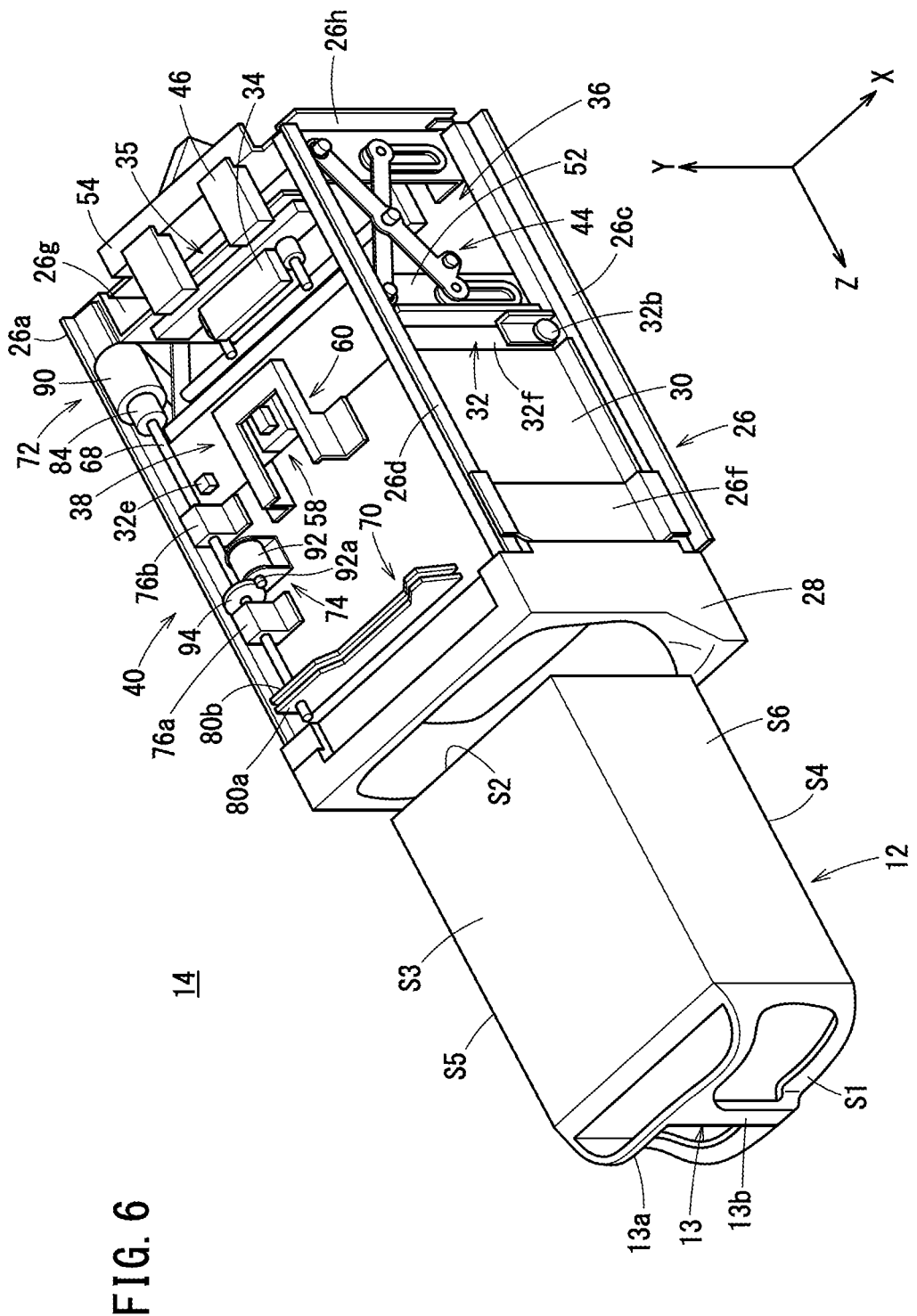
FIG. 6 is a diagram showing a manner in which a mobile battery is accommodated in the slot.

The frame 26 includes main frames 26a to 26d, and side frames 26e to 26h (concerning the side frame 26f, refer to FIG. 6). The main frames 26a to 26d are columnar members extending in the Z-axis direction. The outer appearance of the slot 14 is in the form of a substantially rectangular parallelepiped shape, the longitudinal direction of which is the Z-axis direction. The main frames 26a to 26d are provided at respective locations corresponding to four sides that extend in the longitudinal direction of the rectangular parallelepiped. The two side frames 26e and 26f are provided on the positive side in the Z-axis direction of the slot 14. The two side frames 26g and 26h are provided on the negative side in the Z-axis direction of the slot 14. The side frame 26e and the side frame 26g are fixed to the main frame 26a and the main frame 26b. The side frame 26f and the side frame 26h are fixed to the main frame 26c and the main frame 26d.

The insertion opening 28 is mounted on end parts of the main frames 26a to 26d on the positive side in the Z-axis direction. The insertion opening 28 is formed from a resin. The insertion opening 28 includes a through hole that penetrates therethrough in the Z-axis direction. In the Z-axis direction, the distal end of a portion of the insertion opening 28 on the negative side in the Y-axis direction is positioned more on the positive side in the Z-axis direction than the distal end of a portion of the insertion opening 28 on the positive side in the Y-axis direction. At a time when the user inserts the mobile battery 12 into the slot 14, the user is capable of lifting up the mobile battery 12, and placing a second surface S2 (refer to FIG. 6) of the mobile battery 12 on a portion of the insertion opening 28 on the negative side in the Y-axis direction. Thereafter, the user inserts the mobile battery 12 into the slot 14.

The battery holder 30 is provided on the negative side in the Z-axis direction with respect to the insertion opening 28.

The battery holder 30 is fixed to the main frames 26a to 26d. Both sides of the battery holder 30 in the Z-axis direction are open. A space in the interior of the battery holder 30 communicates with a space in the interior of the insertion opening 28. The shape of the inner peripheral surface of the battery holder 30 is formed substantially in the same shape as the shape of the inner peripheral surface of the insertion opening 28.

The battery tray 32 is provided on the negative side in the Z-axis direction with respect to the battery holder 30. The battery tray 32 is capable of moving in the Z-axis direction along the main frames 26a to 26d. The movement of the battery tray 32 to the positive side in the Z-axis direction is restricted by the battery tray 32 coming into contact with a side surface of the battery holder 30 on the negative side in the Z-axis direction. A surface of the battery tray 32 on a side facing toward the battery holder 30 is open. The battery tray 32 includes a bottom part 32a (refer to FIG. 13, to be described later) on an opposite side from the surface on the side facing toward the battery holder 30. A space in the interior of the battery tray 32 communicates with a space in the interior of the battery holder 30, in a state in which the battery tray 32 is in contact with the side surface of the battery holder 30 on the negative side in the Z-axis direction. The shape of the inner peripheral surface of the battery tray 32 is formed in substantially the same shape as the shape of the inner peripheral surface of the battery holder 30. A roller 32b is mounted respectively on a side surface of the battery tray 32 on the positive side in the X-axis direction, and on a side surface of the battery tray 32 on the negative side in the X-axis direction. The rollers 32b are provided on the negative side in the Y-axis direction of the battery tray 32. At a time when the battery tray 32 moves in the Z-axis direction, the rollers 32b rotate on the main frame 26b and the main frame 26c. Consequently, the rollers 32b serve to guide the battery tray 32 in the Z-axis direction along the main frame 26b and the main frame 26c.

The connector unit 35 includes a connector 34. The connector 34 is connected to a connector 15 (refer to FIG. 10, to be described later) on the second surface S2 of the mobile battery 12. Consequently, electrical power is supplied from the battery exchange device 10 to the mobile battery 12. The connector unit 35 is installed in a connector bracket 42. The connector bracket 42 is fixed to the side frame 26g and the side frame 26h at an end part of the slot 14 on the negative side in the Z-axis direction. The connector unit 35 is arranged in close proximity to a central part of the slot 14 in the X-axis direction. In the Y-axis direction, the connector unit 35 is arranged closer to the positive side than the central part of the slot 14.

The tray retention mechanism 36 is arranged on the negative side in the Z-axis direction of the battery tray 32. The tray retention mechanism 36 includes X-links 44, stoppers 46, air dampers 48, and a gas spring 50.

The battery tray 32 includes a tray main body 32f and a tray bracket 52. The tray bracket 52 is mounted on the negative side in the Z-axis direction of the tray main body 32f. The tray retention mechanism 36 includes two X-links 44. One of the X-links 44 is provided on the negative side in the X-axis direction with respect to the battery tray 32. This X-link 44 is disposed between the tray bracket 52 and the side frame 26g. The other one of the X-links 44 is provided on the positive side in the X-axis direction with respect to the battery tray 32. This X-link 44 is disposed between the tray bracket 52 and the side frame 26h.

The stoppers 46 are installed in a stopper bracket 54. The stopper bracket 54 is fixed to the side frame 26g and the side frame 26h at an end part of the slot 14 on the negative side in the Z-axis direction. The stoppers 46 are arranged on a rear surface (on the positive side in the Y-axis direction) of the connector unit 35. Two stoppers 46 are arranged while being separated from each other in the X-axis direction.

The air dampers 48 are installed in an air damper bracket 56. The air damper bracket 56 is fixed to the side frame 26g and the side frame 26h at an end part of the slot 14 on the negative side in the Z-axis direction. The air dampers 48 are arranged on the negative side in the Y-axis direction of the slot 14. Two air dampers 48 are arranged while being separated from each other in the X-axis direction.

An end of the gas spring 50 on the negative side in the Z-axis direction is mounted in a spring bracket 54a. An end part of the gas spring 50 on the positive side in the Z-axis direction is mounted in the tray bracket 52. The spring bracket 54a is fixed to the stopper bracket 54. The tray bracket 52 is fixed to the battery tray 32. The gas spring 50 is installed in a central part of the slot 14 in the X-axis direction.

The tray lock mechanism 38 restricts the movement of the battery tray 32 to the negative side in the Z-axis direction. The tray lock mechanism 38 will be described in detail later.

The battery lock mechanism 40, in a state in which the mobile battery 12 is accommodated in the slot 14, restricts the movement of the mobile battery 12 to the positive side in the Z-axis direction. The battery lock mechanism 40 will be described in detail later.

Figure 7:
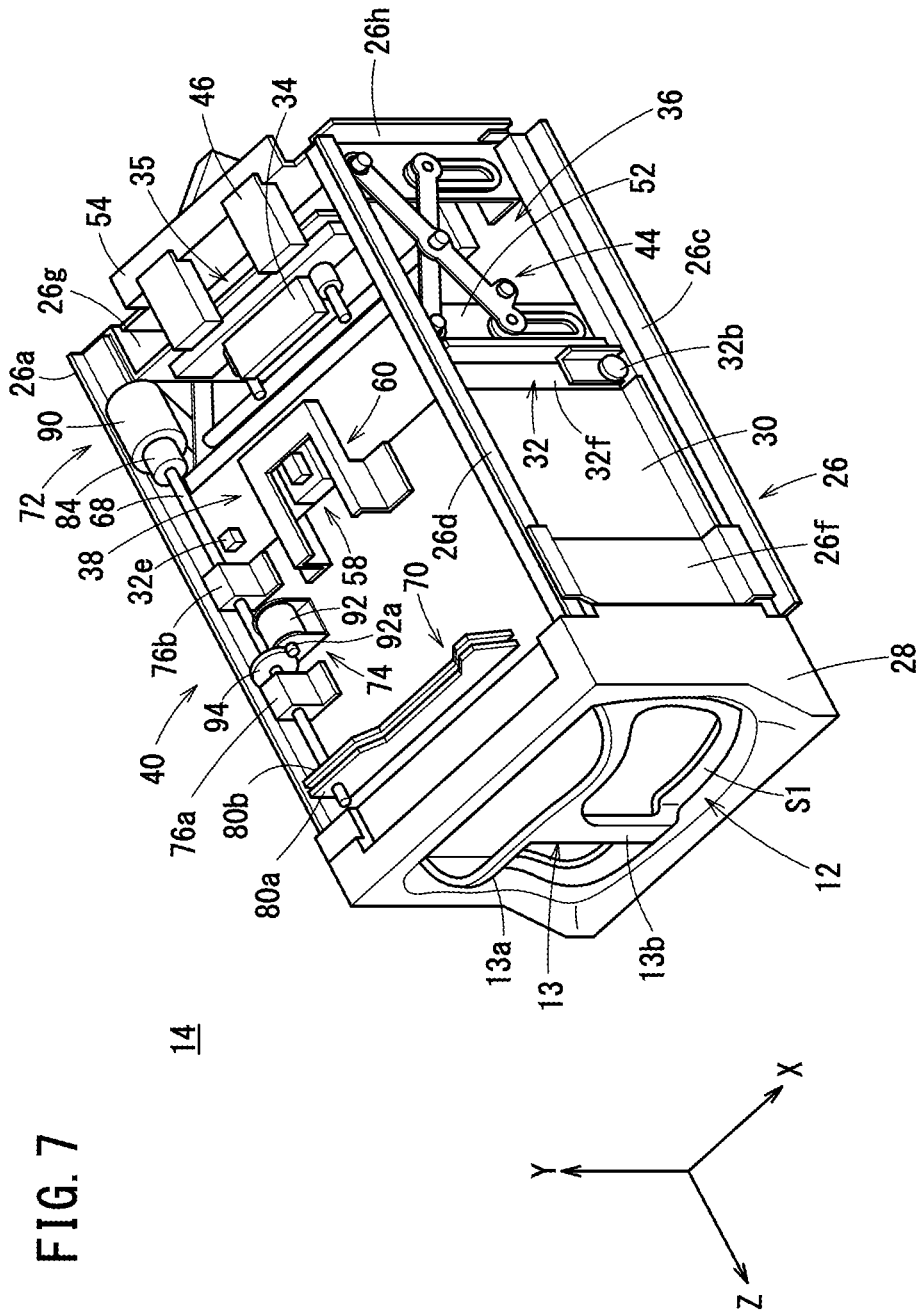
FIG. 7 is a diagram showing a manner in which the mobile battery is accommodated in the slot.
Figure 8:
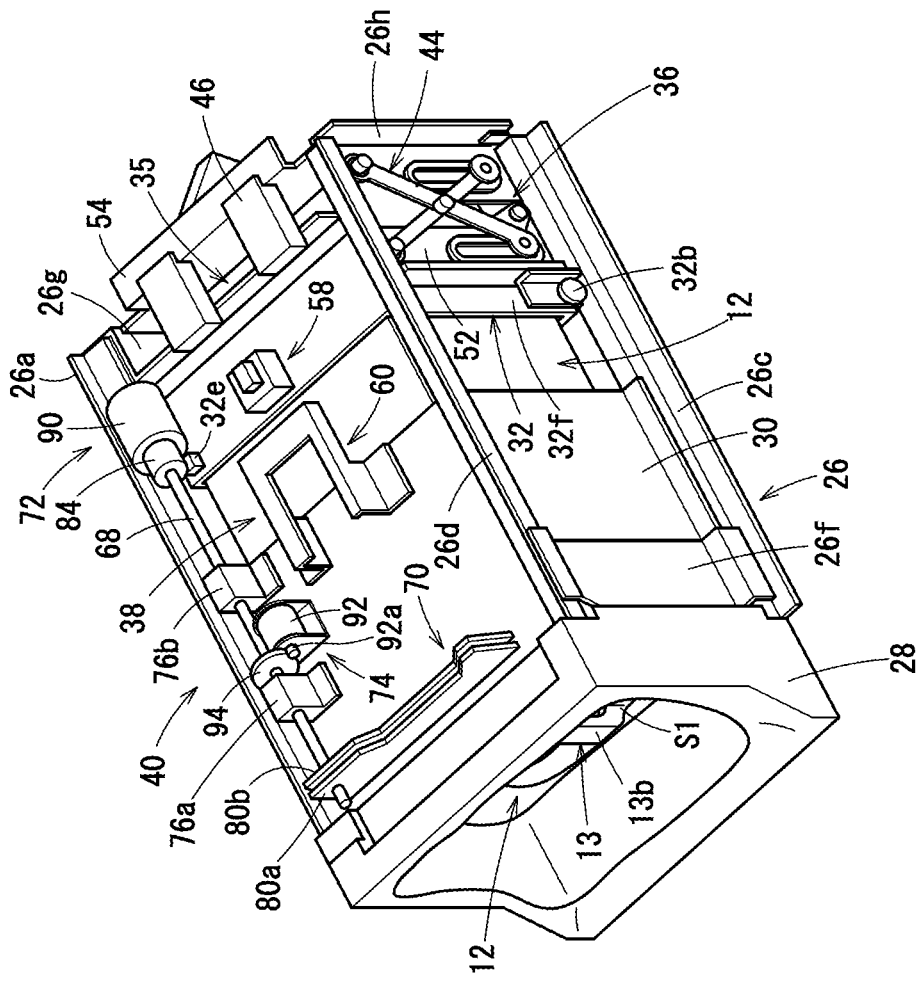
FIG. 8 is a diagram showing a manner in which the mobile battery is accommodated in the slot.

FIG. 6, FIG. 7, and FIG. 8 are diagrams showing a manner in which the mobile battery 12 is accommodated in the slot 14. At a time when the mobile battery 12 is accommodated in the slot 14, the user grips a handle 13 of the mobile battery 12 and inserts the mobile battery 12 into the insertion opening 28 (see FIG. 6). The user places the entirety of the mobile battery 12 in a state in which it is inserted into the slot 14 (see FIG. 7). Thereafter, the user further pushes in the mobile battery 12 (see FIG. 8). Consequently, the battery tray 32 moves together with the mobile battery 12 to the negative side in the Z-axis direction, and the connector 15 of the mobile battery 12 and the connector 34 of the slot 14 are connected to each other. Hereinafter, the state of the slot 14 shown in FIG. 7 may be described as a state in which the mobile battery 12 is inserted into the slot 14. Further, the state of the slot 14 shown in FIG. 8 may be described as a state in which the mobile battery 12 is pushed into the slot 14.

[Configuration of Mobile Battery]

Figure 9:
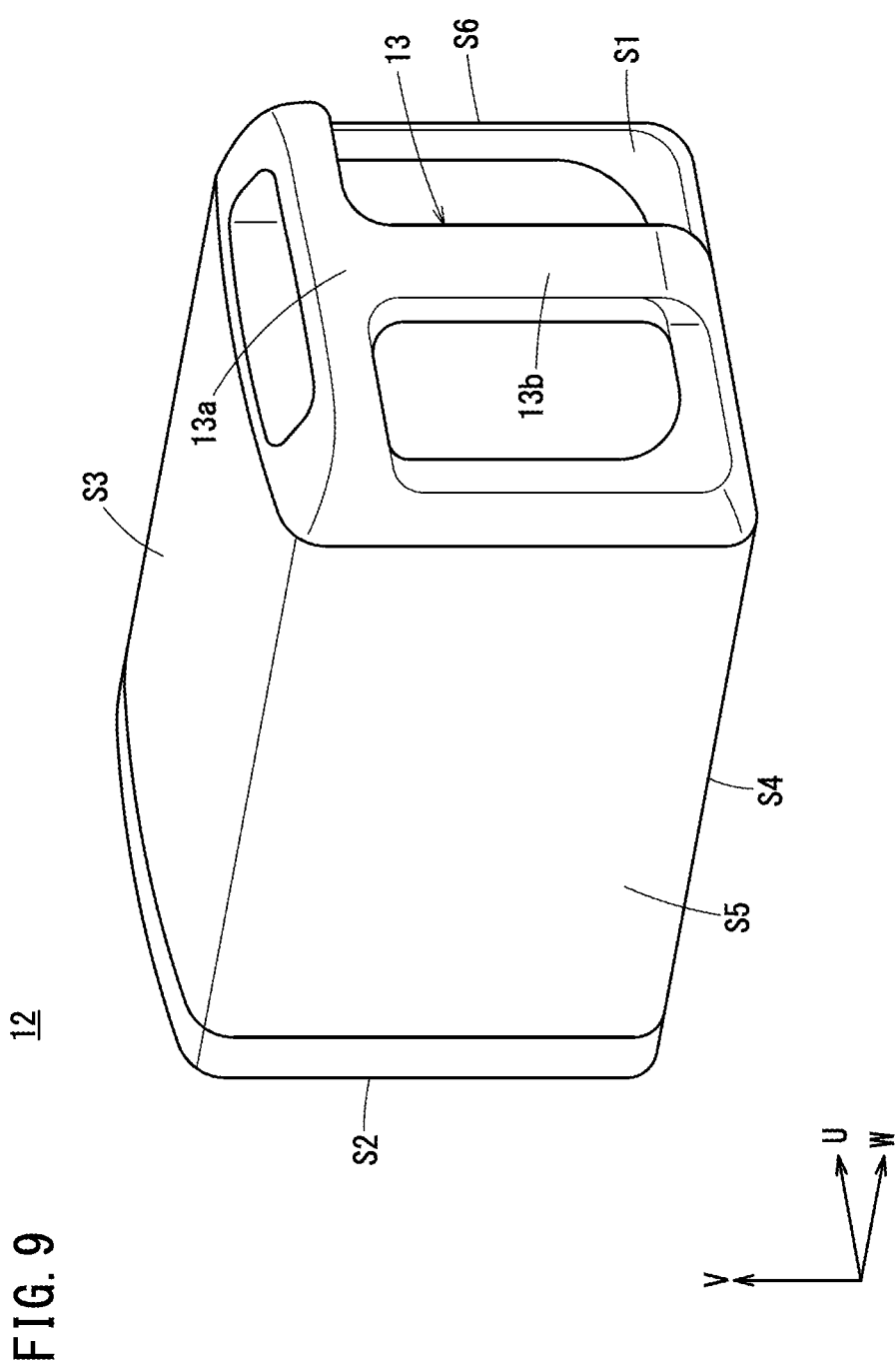
FIG. 9 is a perspective view of the mobile battery.
Figure 10:
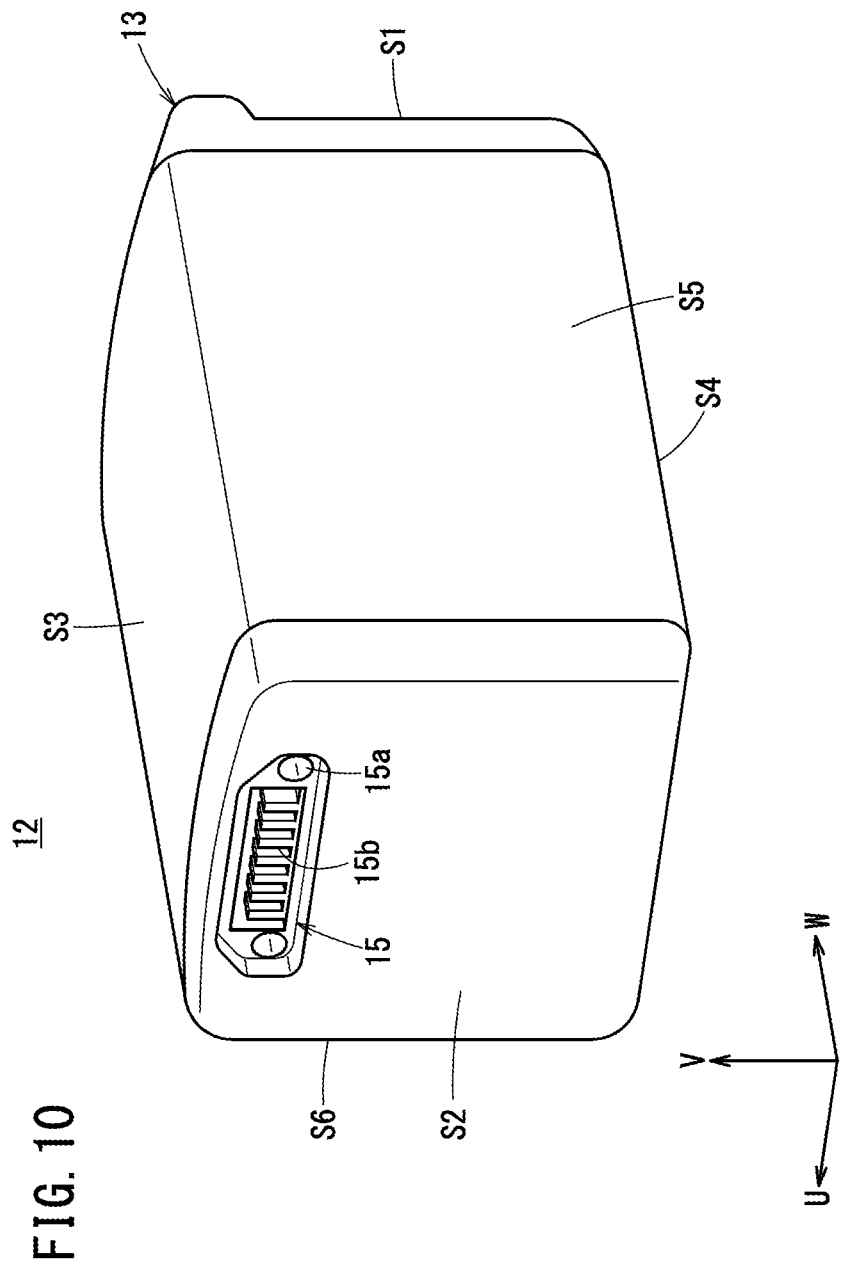
FIG. 10 is a perspective view of the mobile battery.
Figure 11:
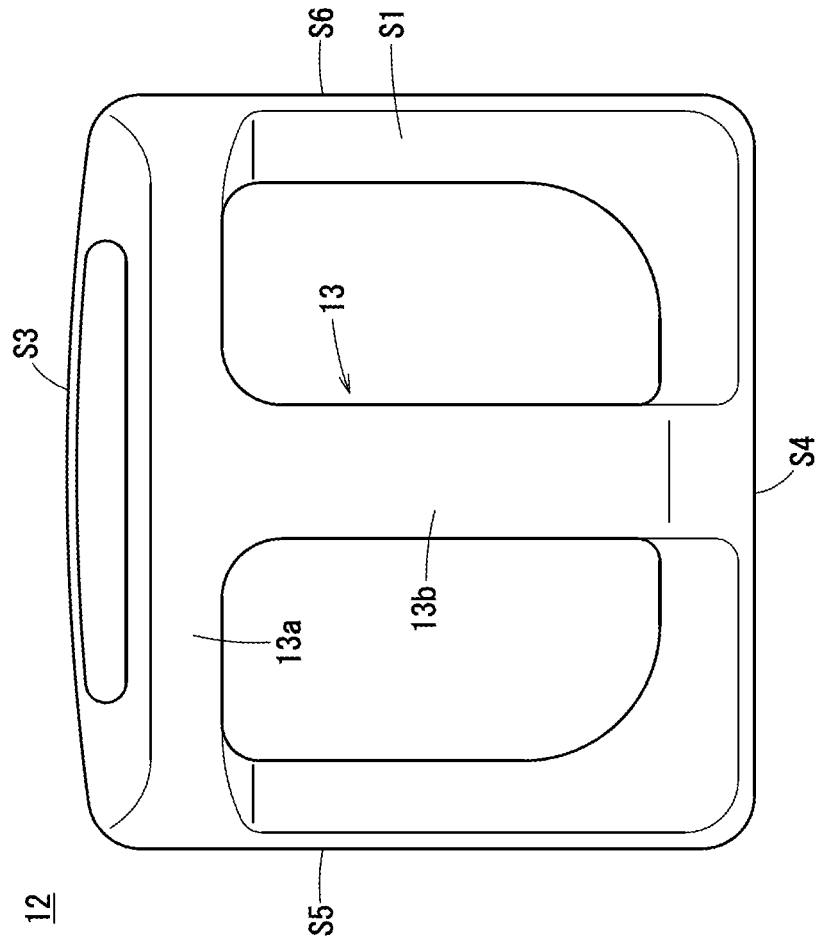
FIG. 11 is a view of the mobile battery as seen from the side of a first surface.

FIG. 9 is a perspective view of the mobile battery 12. FIG. 10 is a perspective view of the mobile battery 12. FIG. 11 is a view of the mobile battery 12 as seen from the side of a first surface S1 of the mobile battery 12.

The outer shape of the mobile battery 12 is formed substantially in the shape of a rectangular parallelepiped. The mobile battery 12 includes the first surface S1 and the second surface S2, which are side surfaces respectively at both ends of the mobile battery 12 in the longitudinal direction thereof. The mobile battery 12 includes a third surface S3 and a fourth surface S4, which are side surfaces substantially perpendicular to the first surface S1 and the second surface S2. The third surface S3 and the fourth surface S4 are arranged on sides that are opposite to each other. The mobile battery 12 includes a fifth surface S5 and a sixth surface S6, which are side surfaces substantially perpendicular to the first surface S1 and the second surface S2. The fifth surface S5 and the sixth surface S6 are arranged on sides that are opposite to each other.

In describing the configuration of the mobile battery 12, a U-axis, a V-axis, and a W-axis, which are defined in the following manner, are used. The longitudinal direction of the mobile battery 12 is defined as a W-axis direction, and the side of the first surface S1 is defined as a positive side. The direction connecting the third surface S3 and the fourth surface S4 of the mobile battery 12 is defined as a V-axis direction, and the direction from the fourth surface S4 toward the third surface S3 is defined as a positive direction. The direction connecting the fifth surface S5 and the sixth surface S6 of the mobile battery 12 is defined as a U-axis direction, and the direction from the fifth surface S5 toward the sixth surface S6 is defined as a positive direction.

The handle 13 is provided on the first surface S1 of the mobile battery 12. The first surface S1 and the handle 13 are formed together in an integral manner. The user grips the handle 13, and carries out insertion or removal of the mobile battery 12 into or out of the slot 14 of the battery exchange device 10. The handle 13 corresponds to a grip member of the present invention.

As shown in FIG. 11, the handle 13 is formed in a T-shape when the mobile battery 12 is viewed from the side of the first surface S1. The handle 13 includes a first portion 13a and a second portion 13b. The first portion 13a extends in the U-axis direction. In other words, the first portion 13a extends in the direction from the fifth surface S5 toward the sixth surface S6. The second portion 13b extends in the V-axis direction. The second portion 13b extends in the direction from the third surface S3 toward the fourth surface S4.

In the V-axis direction, the first portion 13a is arranged more on the positive side in the V-axis direction than the center of the first surface S1. In other words, the first portion 13a is arranged on the first surface S1 and between the third surface S3 and the fourth surface S4. Furthermore, on the first surface S1, the first portion 13a is arranged at a position in closer to the third surface S3 than the fourth surface S4. An intermediate part of the first portion 13a in the longitudinal direction (the U-axis direction) is separated from the first surface S1 toward the positive side in the W-axis direction. In accordance with this feature, a space is provided between the first portion 13a and the first surface S1. Both ends of the first portion 13a in the longitudinal direction (the U-axis direction) are directly connected to the first surface S1.

In the U-axis direction, the second portion 13b is arranged at the central part of the first surface S1. In other words, the second portion 13b is arranged on the first surface S1 and between the fifth surface S5 and the sixth surface S6. Furthermore, the second portion 13b is arranged on the first surface S1, in a manner so that the distance between the second portion 13b and the fifth surface S5 and the distance between the second portion 13b and the sixth surface S6 are substantially the same. In the longitudinal direction (the V-axis direction) of the second portion 13b, among both end parts of the second portion 13b, a first end part (an end part on the positive side in the V-axis direction) in close proximity to the third surface S3, and an intermediate part are separated from the first surface S1 toward the positive side in the W-axis direction. In accordance with this feature, a space is provided between the second portion 13b and the first surface S1. The aforementioned first end part (the end part on the positive side in the V-axis direction) is connected to the first portion 13a. In the longitudinal direction (the U-axis direction) of the first portion 13a, the second portion 13b is connected to the central part of the first portion 13a. In the longitudinal direction (the V-axis direction) of the second portion 13b, a second end part (an end part on the negative side in the V-axis direction) in close proximity to the fourth surface S4 is directly connected to the first surface S1.

As shown in FIG. 10, the connector 15 is provided on the second surface S2 of the mobile battery 12. In the V-axis direction, the connector 15 is arranged more on the positive side in the V-axis direction than the center of the second surface S2. In other words, the connector 15 is arranged on the second surface S2 and between the third surface S3 and the fourth surface S4. Furthermore, on the second surface S2, the connector 15 is arranged at a position closer to the third surface S3 than the fourth surface S4.

As shown in FIG. 11, the third surface S3 of the mobile battery 12 is formed in a curved shape that is convex toward an outer side. Each of the fourth surface S4, the fifth surface S5, and the sixth surface S6 of the mobile battery 12 is formed in a planar shape.

Figure 12:
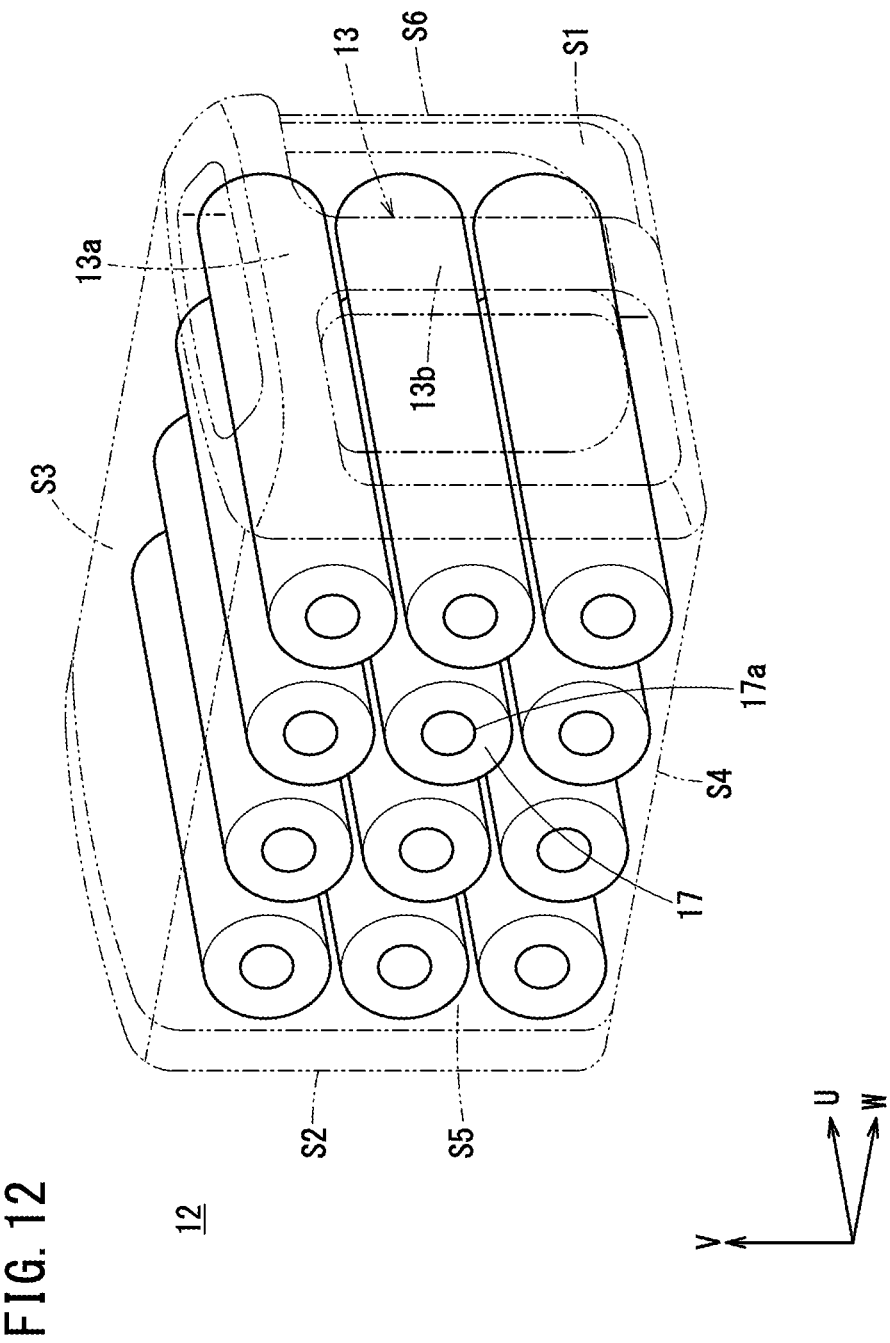
FIG. 12 is a transparent view of the mobile battery.

FIG. 12 is a transparent view of the mobile battery 12. A plurality of cells 17 are accommodated inside the mobile battery 12. Each of the cells 17 has a substantially cylindrical outer shape. Each of the cells 17 includes electrodes 17a at both ends thereof in the longitudinal direction. In a state of being accommodated inside the mobile battery 12, the longitudinal direction of each of the cells 17 substantially coincides with the U-axis direction. In other words, in a state of being accommodated inside the mobile battery 12, the longitudinal direction of each of the cells 17 substantially coincides with a direction perpendicular to the fifth surface S5 and the sixth surface S6 of the mobile battery 12.

Consequently, each of the cells 17 can be placed inside the mobile battery 12, in a state with one of the two electrodes 17a of each of the cells 17 being made to face toward the fifth surface S5 of the mobile battery 12. Further, each of the cells 17 can be placed inside the mobile battery 12, in a state with the other one of the two electrodes 17a of each of the cells 17 being made to face toward the sixth surface S6 of the mobile battery 12. The fifth surface S5 and the sixth surface S6 are formed in a planar shape. Therefore, in comparison with a case in which the fifth surface S5 and the sixth surface S6 are formed in a curved shape, the electrodes 17a can be brought into closer proximity to the fifth surface S5 and the sixth surface S6. Consequently, the heat of the electrodes 17a, which have a comparatively high temperature within the cell 17, can be efficiently released from the fifth surface S5 and the sixth surface S6.

Normally, at a time when the user grips the handle 13 of the mobile battery 12, the user grips the second portion 13b of the handle 13 with the second finger (the index finger), the third finger (the middle finger), the fourth finger (the ring finger), and the fifth finger (the little finger). At this time, the user places his or her first finger (the thumb) on the first portion 13a. In the case that the user grips the handle 13 in this manner, and attempts to insert the mobile battery 12 into the slot 14 from the second surface S2, the third surface S3 of the mobile battery 12 is positioned upward. At a time when the mobile battery 12 is inserted into the slot 14, the posture of the mobile battery 12 with the third surface S3 thereof facing upward is the correct posture of the mobile battery 12.

The user is also capable of gripping the second portion 13b of the handle 13 with the first, the second, the third, the fourth, and the fifth fingers, with the first finger facing toward a side opposite to the first portion 13a of the handle 13. In the case that the user inserts the mobile battery 12 into the slot 14 in a state in which the handle 13 is gripped in this manner, the fourth surface S4 of the mobile battery 12 is positioned upward. However, at a time when the user grips the handle 13 in this manner, and attempts to insert the mobile battery 12 into the slot 14 from the second surface S2, the user finds it difficult to apply a force to lift the mobile battery 12.

By the handle 13 being formed in a T shape, it is possible to guide the direction in which the user grips the handle 13. In accordance with this feature, in the case that the user attempts to insert the mobile battery 12 into the slot 14, the third surface S3 of the mobile battery 12 can be positioned upward. Thus, the mobile battery 12 can be inserted into the slot 14 in the correct posture.

In the case that the user has gripped the handle 13 and lifted the mobile battery 12 with the third surface S3 of the mobile battery 12 facing upward, a force that acts on the third surface S3 that is positioned upward is larger than a force that acts on the fourth surface S4 that is positioned downward. The third surface S3 of the mobile battery 12 that is formed in a curved shape has a higher rigidity than the fourth surface S4 that is formed in a planar shape. Therefore, the rigidity of the mobile battery 12 can be ensured.

Further, in the case that the user has gripped the handle 13 and lifted the mobile battery 12 with the third surface S3 thereof facing upward, a large force acts on the connecting portion between the first portion 13a of the handle 13 and the first surface S1. The first portion 13a is arranged at a position closer to the third surface S3 than the fourth surface S4. As noted previously, the third surface S3 of the mobile battery 12 is higher in rigidity than the fourth surface S4. Therefore, there is no need to separately provide a reinforcing member or the like at the connecting portion between the first portion 13a and the first surface S1. Consequently, an increase in the number of parts of the mobile battery 12 can be suppressed.

The fourth surface S4 is formed in a planar shape. In comparison with a case in which the fourth surface S4 is formed in a curved shaped, the cells 17 can be arranged in closer proximity to the fourth surface S4. In accordance with this feature, the heat generated in the cells 17 can be efficiently released from the fourth surface S4.

At the time when the mobile battery 12 is inserted into the slot 14, the connector 34 of the slot 14 is inserted into the connector 15. At this time, a force acts on the connector 15 from the connector 34. The connector 34 is arranged at a position closer to the third surface S3 than the fourth surface S4. As noted previously, the third surface S3 of the mobile battery 12 is higher in rigidity than the fourth surface S4. Therefore, there is no need to separately provide a reinforcing member or the like at the connector 15. Consequently, an increase in the number of parts of the mobile battery 12 can be suppressed.

[Tray Lock Mechanism]

In a state in which the mobile battery 12 is inserted into the slot 14, the tray lock mechanism 38 allows movement of the battery tray 32 to the negative side in the Z-axis direction. In a state in which the mobile battery 12 is not inserted into the slot 14, the tray lock mechanism 38 restricts movement of the battery tray 32 to the negative side in the Z-axis direction.

Figure 13:
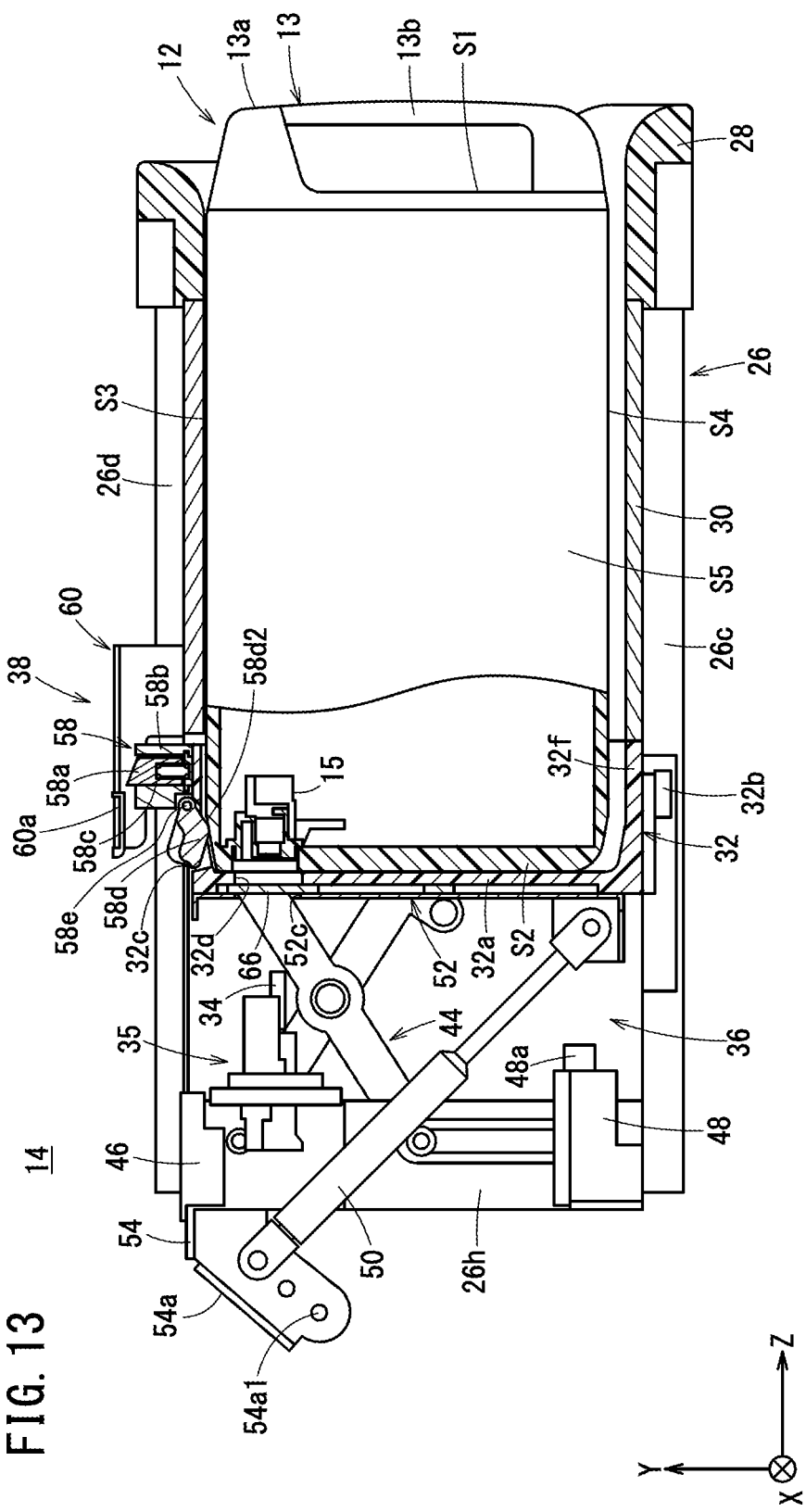
FIG. 13 is a cross-sectional view of the slot.

FIG. 13 is a cross-sectional view of the slot 14. The slot 14 shown in FIG. 13 is cut along a plane parallel to the YZ plane. FIG. 13 shows a state in which the mobile battery 12 is inserted into the slot 14. In FIG. 13, the mobile battery 12 is shown in the form of a partial cross-sectional view. The tray lock mechanism 38 is installed on a side surface of the slot 14 on the positive side in the Y-axis direction. The tray lock mechanism 38 includes a latch 58 and a striker 60.

The latch 58 is installed on a side surface of the tray main body 32f of the battery tray 32 on the positive side in the Y-axis direction. The latch 58 includes a latch bolt 58a, a latch bolt holder 58b, a spring 58c, and a lever 58d. The latch bolt 58a is provided so as to be capable of moving in the Y-axis direction within the latch bolt holder 58b. The latch bolt holder 58b is fixed to the battery tray 32. The spring 58c is provided inside the latch bolt holder 58b. The latch bolt 58a is biased by the spring 58c toward the positive side in the Y-axis direction. An end part of the lever 58d on the positive side in the Z-axis direction is connected to the latch bolt 58a. An end part of the lever 58d on the negative side in the Z-axis direction is provided so as to extend from a through hole 32c into the interior of the battery tray 32. The through hole 32c is formed in a side surface of the battery tray 32 on the positive side in the Y-axis direction. The lever 58d is provided so as to be capable of rotating, at an intermediate part thereof in the Z-axis direction, about a rotation shaft 58e with respect to the latch bolt holder 58b. The rotation shaft 58e is fixed to the latch bolt holder 58b.

The striker 60 is fixed to the surface of the battery holder 30 on the positive side in the Y-axis direction. As shown in FIG. 4, the striker 60 is formed to extend from the battery holder 30 beyond the end part of the battery holder 30 to the negative side in the Z-axis direction. As shown in FIG. 13, an end part of the striker 60 on the negative side in the Z-axis direction includes an engagement member 60a. The engagement member 60a is formed to extend in the X-axis direction. In a state in which the battery tray 32 is moved maximally to the positive side in the Z-axis direction, the latch bolt 58a is positioned more on the positive side in the Z-axis direction than the engagement member 60a of the striker 60. In other words, in a state in which the battery tray 32 is in contact with the side surface of the battery holder 30 on the negative side in the Z-axis direction, the latch bolt 58a is positioned on the positive side in the Z-axis direction with respect to the engagement member 60a of the striker 60.

In the case of being in the following state, the tray lock mechanism 38 restricts the movement of the battery tray 32 to the negative side in the Z-axis direction. Such a state is defined as a state in which the latch bolt 58a of the latch 58 is positioned more on the positive side in the Z-axis direction than the engagement member 60a of the striker 60, and further, is a state (a locked state) in which the distal end of the latch bolt 58a on the positive side in the Y-axis direction is positioned more on the positive side in the Y-axis direction than the engagement member 60a. In the case of being in the following state, the tray lock mechanism 38 allows the movement of the battery tray 32 to the negative side in the Z-axis direction. Such a state is defined as a state in which the distal end of the latch bolt 58a of the latch 58 on the positive side in the Y-axis direction is positioned more on the negative side in the Y-axis direction than the engagement member 60a of the striker 60.

Figure 14:
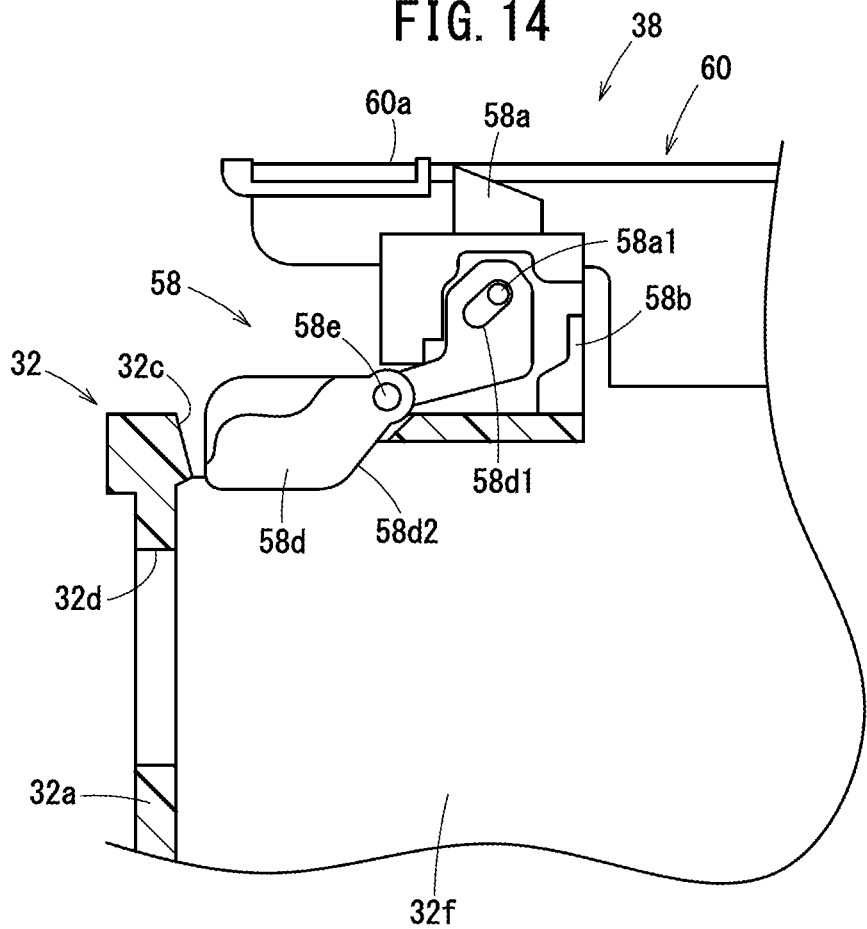
FIG. 14 is a cross-sectional view of a tray lock mechanism in a locked state.
Figure 15:
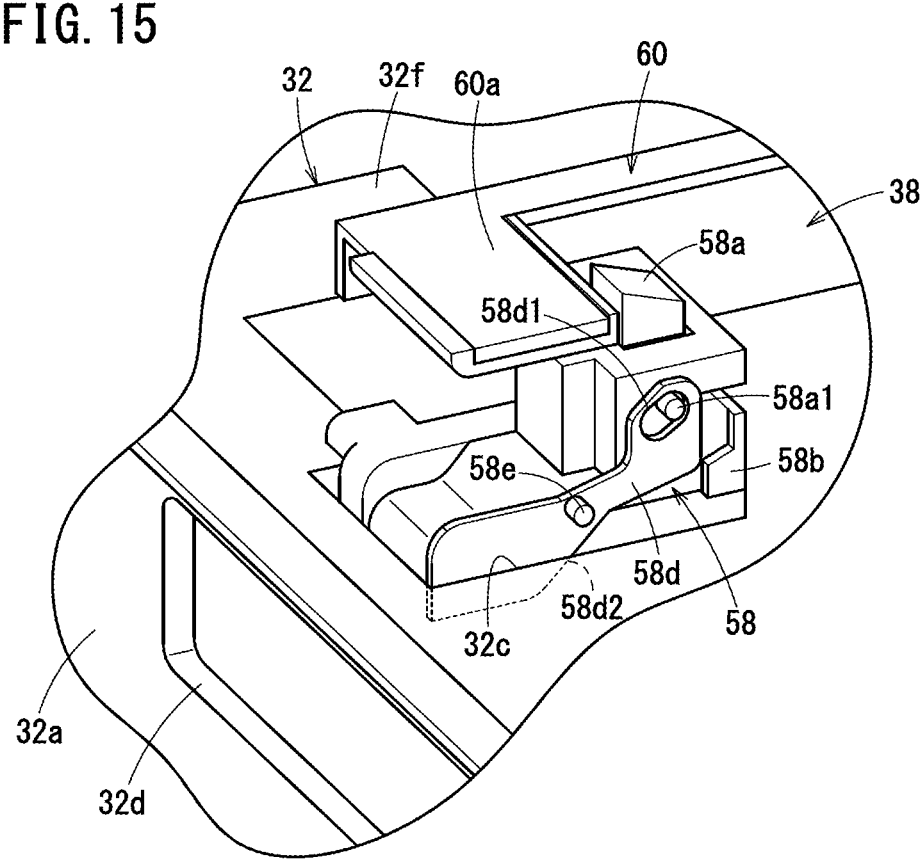
FIG. 15 is a cross-sectional perspective view of the tray lock mechanism in the locked state.

FIG. 14 is a cross-sectional view of the tray lock mechanism 38 in a locked state. FIG. 15 is a cross-sectional perspective view of the tray lock mechanism 38 in the locked state. The tray lock mechanism 38 shown in FIG. 14 and FIG. 15 is cut along a plane parallel to the YZ plane.

The latch bolt 58a includes a connecting shaft 58a1. The connecting shaft 58a1 penetrates through the latch bolt holder 58b in the X-axis direction, and extends to an outer side of the latch bolt holder 58b. An elongated hole 58d1 is formed at the end part of the lever 58d on the positive side in the Z-axis direction. On the outer side of the latch bolt holder 58b, the connecting shaft 58a1 of the latch bolt 58a is inserted into the elongated hole 58d1.

As shown in FIG. 14, the lever 58d includes an inclined surface 58d2. The inclined surface 58d2 is formed on the positive side in the Z-axis direction of the lever 58d. The inclined surface 58d2 is formed on a portion of the lever 58d that is positioned in the interior of the battery tray 32. When viewed from the negative side in the X-axis direction, the inclined surface 58d2 is formed in a manner so as to be positioned on an inner side of the battery tray 32 as it extends to the negative side in the Z-axis direction.

Figure 16:
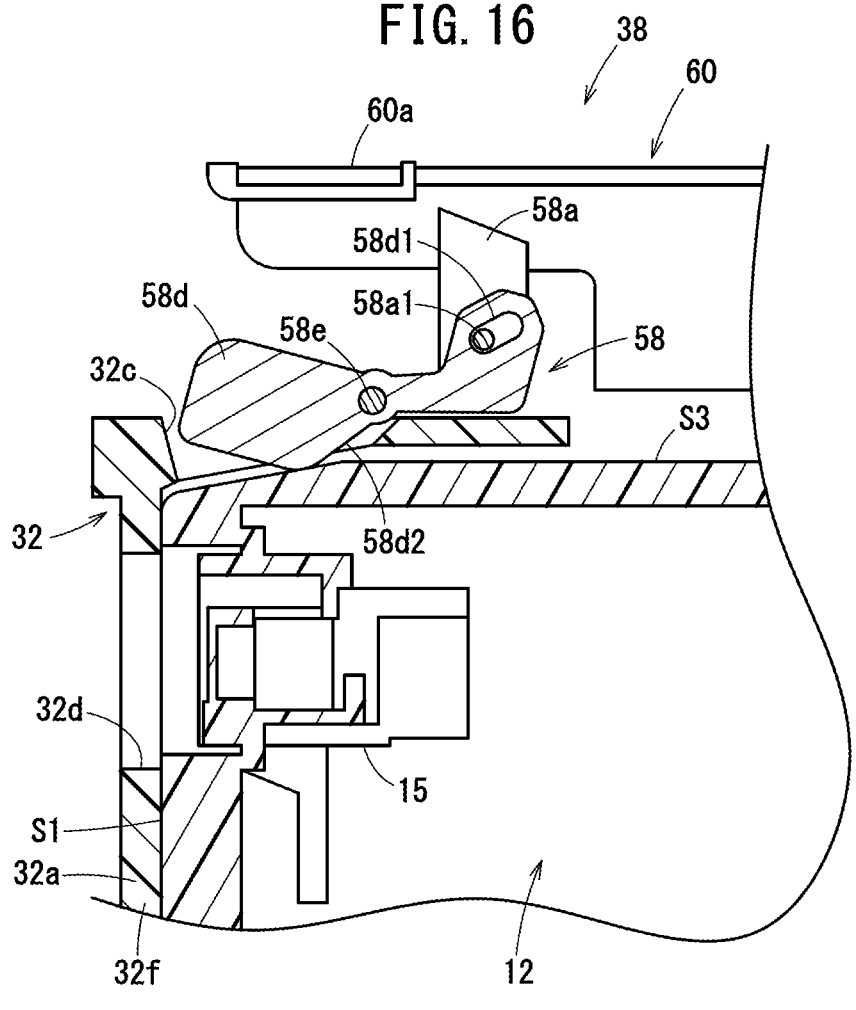
FIG. 16 is a cross-sectional view of the tray lock mechanism in an unlocked state.
Figure 17:
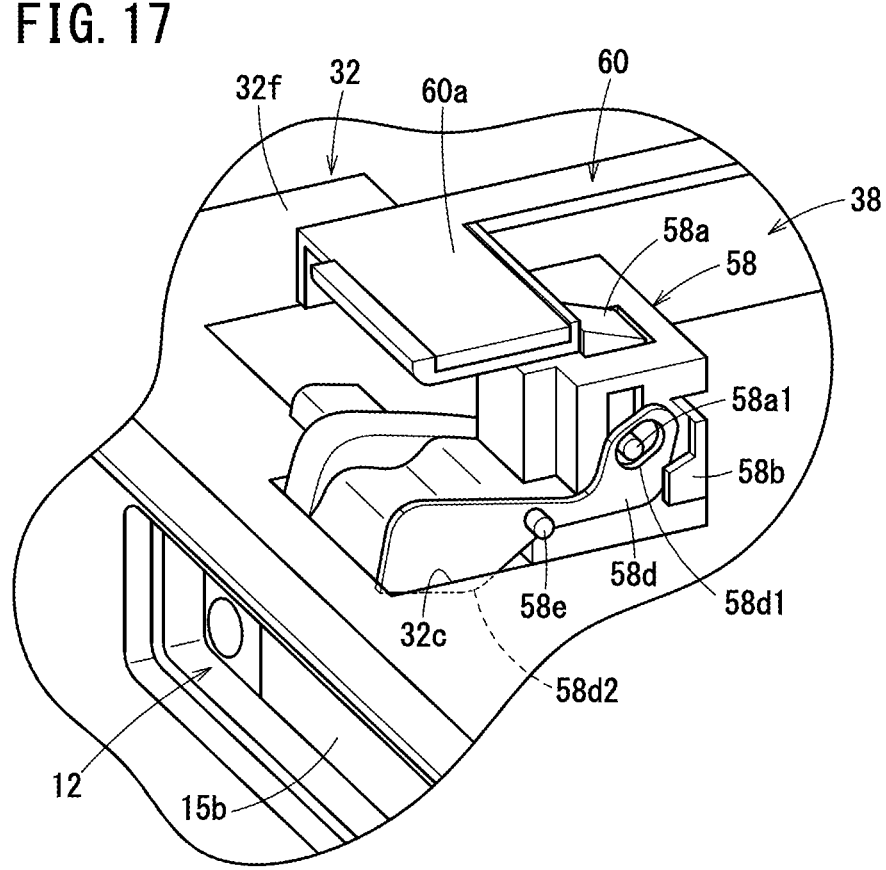
FIG. 17 is a cross-sectional perspective view of the tray lock mechanism in the unlocked state.

FIG. 16 is a cross-sectional view of the tray lock mechanism 38 in an unlocked state. FIG. 17 is a cross-sectional perspective view of the tray lock mechanism 38 in the unlocked state. The tray lock mechanism 38 shown in FIG. 16 and FIG. 17 is cut along a plane parallel to the YZ plane.

As shown in FIG. 16, when the mobile battery 12 is inserted into the slot 14, the lever 58d is pressed by the third surface S3 of the mobile battery 12, and thereby rotates about the rotation shaft 58e. The position of the lever 58d that is pressed by the third surface S3 is on the negative side in the Z-axis direction with respect to the rotation shaft 58e, and further, is on the negative side in the Y-axis direction with respect to the rotation shaft 58e. In accordance with this feature, the portion of the lever 58d more on the positive side in the Z-axis direction than the rotation shaft 58e moves to the negative side in the Y-axis direction. Further, the connecting shaft 58a1 of the latch bolt 58a is pulled toward the negative side in the Y-axis direction. Consequently, the latch bolt 58a moves to the negative side in the Y-axis direction. As a result, an end part of the latch bolt 58a on the positive side in the Y-axis direction is positioned on the negative side in the Y-axis direction with respect to the engagement member 60a of the striker 60.

As noted previously, in a state in which the battery tray 32 is in contact with the side surface of the battery holder 30 on the negative side in the Z-axis direction, the latch bolt 58a is positioned on the positive side in the Z-axis direction with respect to the engagement member 60a of the striker 60. In other words, in a state in which the battery tray 32 is positioned foremost on the positive side in the Z-axis direction, the latch bolt 58a and the engagement member 60a do not contact each other. Therefore, in the case that the battery tray 32 rattles with respect to the battery holder 30, an excessive force does not act on the latch 58 and the striker 60.

The tray lock mechanism 38 has a function of preventing the mobile battery 12 from being inserted in reverse. The user is required to insert the mobile battery 12 into the slot 14 with the third surface S3 thereof facing upward. This is in order to align the connector 34 of the slot 14 with the connector 15 of the mobile battery 12. In the case that the user inserts the mobile battery 12 into the slot 14 with the third surface S3 thereof facing downward, the connector 15 of the mobile battery 12 is not connected to the connector 34 of the slot 14. Further, there is a concern that large forces may be applied to the connector 34 of the slot 14. In the case that the mobile battery 12 is inserted into the slot 14 with the third surface S3 thereof facing downward, the tray lock mechanism 38 maintains the locked state, and restricts the movement of the battery tray 32 in the Z-axis direction.

Figure 18A:
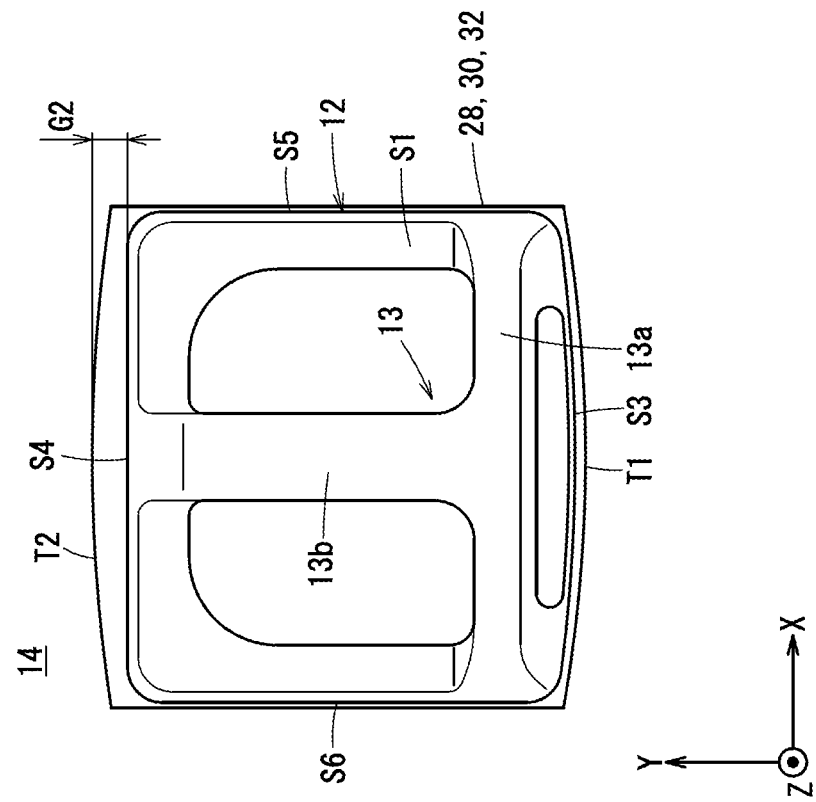
FIG. 18A and FIG. 18B are schematic diagrams showing the shapes of an insertion opening, a battery holder, a battery tray, and a mobile battery as seen from a positive side in the Z-axis direction.
Figure 18B:
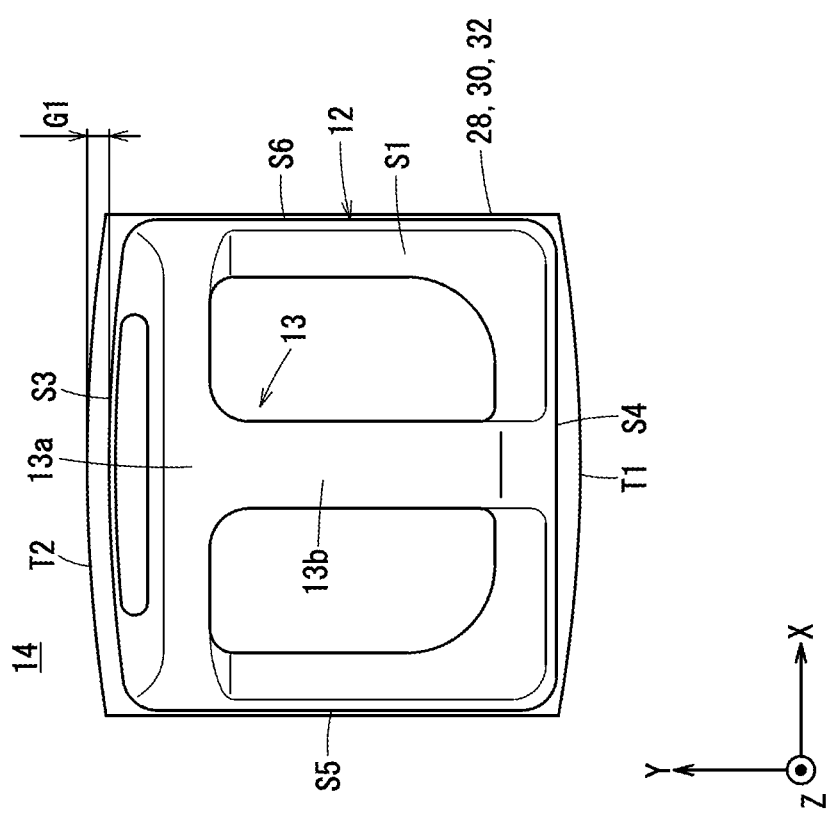

FIG. 18A and FIG. 18B are schematic diagrams showing the shapes of the insertion opening 28, the battery holder 30, the battery tray 32, and the mobile battery 12 as seen from the positive side in the Z-axis direction. An inner peripheral surface of the insertion opening 28, an inner peripheral surface of the battery holder 30, and an inner peripheral surface of the battery tray 32 are formed in substantially the same shape when viewed from the positive side in the Z-axis direction. The side surface, on the negative side in the Y-axis direction, of the inner peripheral surface of the insertion opening 28, the inner peripheral surface of the battery holder 30, and the inner peripheral surface of the battery tray 32 is defined as a side surface T1. The side surface, on the positive side in the Y-axis direction, of the on the inner peripheral surface of the insertion opening 28, the inner peripheral surface of the battery holder 30, and the inner peripheral surface of the battery tray 32 is defined as a side surface T2.

FIG. 18A shows a state in which the mobile battery 12 is inserted into the slot 14 with the third surface S3 thereof facing upward. The posture of the mobile battery 12 at this time is defined as a first posture. FIG. 18B shows a state in which the mobile battery 12 is inserted into the slot 14 with the third surface S3 thereof facing downward. The posture of the mobile battery 12 at this time is defined as a second posture.

From among the four sides of the mobile battery 12, excluding the first surface S1 on which the handle 13 is provided and the second surface S2 on which the connector 15 is provided, the fourth surface S4, the fifth surface S5, and the sixth surface S6 are formed in a planar shape. The third surface S3 that faces toward the fourth surface S4 is formed in a curved shape that is convex toward the outer side. The posture with the third surface S3 facing upward is the correct posture when the mobile battery 12 is inserted into the slot 14.

The side surface T1 is formed in a shape that follows along the curved shape of the third surface S3 of the mobile battery 12. In the case that the mobile battery 12 is inserted into the slot 14 in the second posture, the mobile battery 12 is positioned more on the negative side in the Y-axis direction than in a case in which the mobile battery 12 is inserted into the slot 14 in the first posture. Therefore, a size G2 of the gap between the side surface T2 and the mobile battery 12 in the case that the mobile battery 12 is inserted into the slot 14 in the second posture becomes larger than a size G1 of the gap between the side surface T2 and the mobile battery 12 in the case that the mobile battery 12 is inserted into the slot 14 in the first posture.

As shown in FIG. 14, the lever 58d of the latch 58 of the tray lock mechanism 38 is provided so as to extend, from the through hole 32c of the battery tray 32 on the positive side in the Y-axis direction, into the inner side of the inner peripheral surface of the battery tray 32. For this reason, in the case that the mobile battery 12 is inserted into the slot 14 in the second posture, the fourth surface S4 of the mobile battery 12 does not come into contact with the lever 58d of the latch 58. Therefore, the tray lock mechanism 38 does not become capable of being unlocked. Consequently, the user is incapable of pushing in the mobile battery 12. As a result, it is possible to prevent the mobile battery 12 from being inserted in reverse.

[Tray Retention Mechanism]

Figure 19:
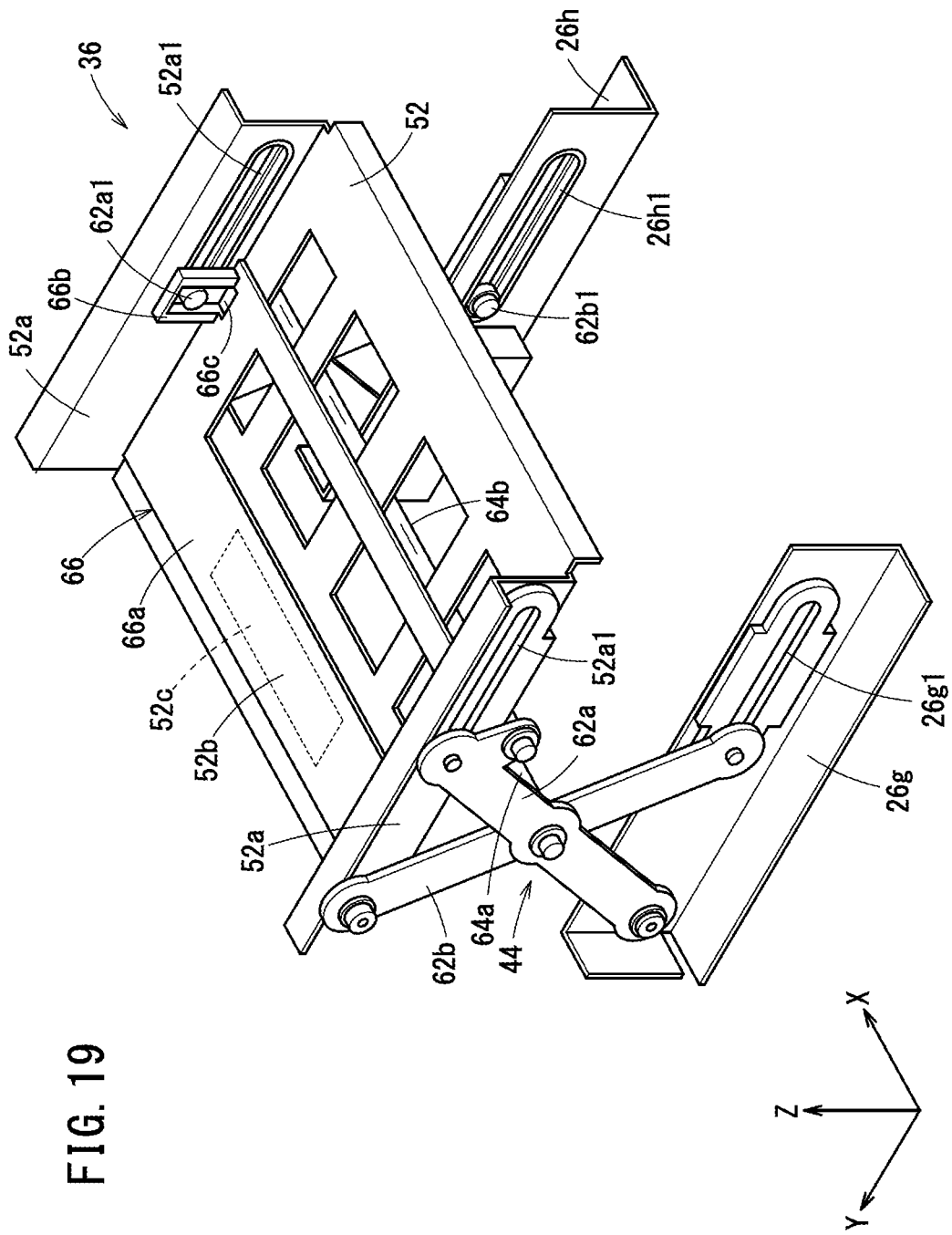
FIG. 19 is a perspective view of a tray retention mechanism.

FIG. 19 is a perspective view of the tray retention mechanism 36. The X-links 44 are provided respectively on the positive side in the X-axis direction and the negative side in the X-axis direction with respect to the tray bracket 52. Each of the X-links 44 includes a link 62a and a link 62b.

End parts of the links 62a on the negative side in the Z-axis direction are mounted onto end parts of the side frames 26g and 26h on the positive side in the Y-axis direction. Pins 62a1 are provided at end parts of the links 62a on the positive side in the Z-axis direction. The pins 62a1 extend toward the inner side of the slot 14 in the X-axis direction. The pins 62a1 are inserted into guides 52a1 that are formed on side surfaces 52a of the tray bracket 52. The guides 52a1 are formed in the shape of elongated holes that extend in the Y-axis direction. The end parts of the links 62a on the positive side in the Z-axis direction are guided in the Y-axis direction along the guides 52a1.

End parts of the links 62b on the positive side in the Z-axis direction are mounted onto end parts of the side surfaces 52a of the tray bracket 52 on the positive side in the Y-axis direction. Pins 62b1 are provided at end parts of the links 62b on the negative side in the Z-axis direction. The pins 62b1 extend toward the inner side of the slot 14 in the X-axis direction. The pins 62b1 are inserted into guides 26g1 and 26h1 that are formed on the side frames 26g and 26h. The guides 26g1 and 26h1 are formed in the shape of elongated holes that extend in the Y-axis direction. The end parts of the links 62b on the negative side in the Z-axis direction are guided in the Y-axis direction along the guides 26g1 and 26h1.

Central parts of the links 62a in the longitudinal direction are connected to central parts of the links 62b in the longitudinal direction. The links 62a and the links 62b are capable of being rotated relatively about the connection locations. The X-link 44 on the negative side in the X-axis direction with respect to the tray bracket 52, and the X-link 44 on the positive side in the X-axis direction with respect to the tray bracket 52 are connected by a rod 64a. The rod 64a is connected to the respective X-links 44 at the connection locations between the links 62a and 62b. Further, the X-link 44 on the negative side in the X-axis direction with respect to the tray bracket 52, and the X-link 44 on the positive side in the X-axis direction with respect to the tray bracket 52 are connected by a rod 64b. The rod 64b is connected to the respective X-links 44 at the end parts of the links 62a on the positive side in the Z-axis direction. The strength of the X-links 44 with respect to forces in the X-axis direction can be ensured by the rod 64a and the rod 64b.

As shown in FIG. 13, a through hole 32d is formed in the bottom part 32a of the tray main body 32f of the battery tray 32. The through hole 32d is formed in the bottom part 32a closer to the positive side in the Y-axis direction. A through hole 52c is formed in the tray bracket 52. The through hole 52c is formed at a position corresponding to the through hole 32d of the tray main body 32f. A shutter 66 is arranged between the bottom part 32a of the tray main body 32f and the tray bracket 52.

As shown in FIG. 19, the shutter 66 includes a main body portion 66a and a connecting portion 66b. The main body portion 66a is a flat plate shaped member. A portion of the main body portion 66a closer to the negative side in the Y-axis direction is hollowed out. In accordance with this feature, the weight of the shutter 66 can be reduced. Moreover, it should be noted that the main body portion 66a need not necessarily be hollowed out. The connecting portion 66b is formed in the main body portion 66a. The connecting portion 66b is formed at an end part of the main body portion 66a on the negative side in the Y-axis direction. The main body portion 66a is formed with the connecting portion 66b on each of both sides thereof in the X-axis direction. The connecting portion 66b is formed so as to project out from the main body portion 66a toward the positive side in the Z-axis direction. A cutout portion 66c is formed in the portion of the main body portion 66a where the connecting portion 66b is formed.

Figure 20:
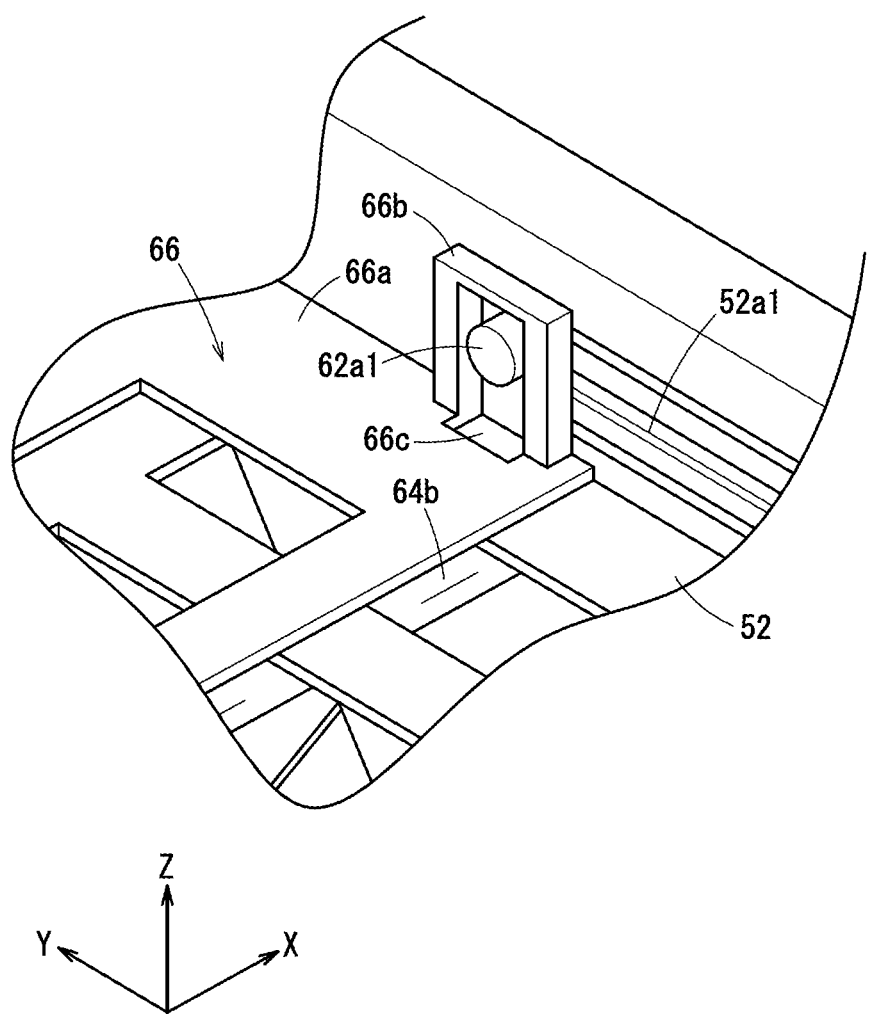
FIG. 20 is an enlarged view of the vicinity of a connecting portion of a shutter.

FIG. 20 is an enlarged view of the connecting portion 66b of the shutter 66 and the vicinity thereof. As shown in FIG. 20, the pin 62a1 of the link 62a is inserted into the connecting portion 66b from the positive side in the X-axis direction. Consequently, the connecting portion 66b and the link 62a are connected to each other. As a result, the shutter 66 is capable of moving in the Y-axis direction together with the link 62a.

Figure 21:
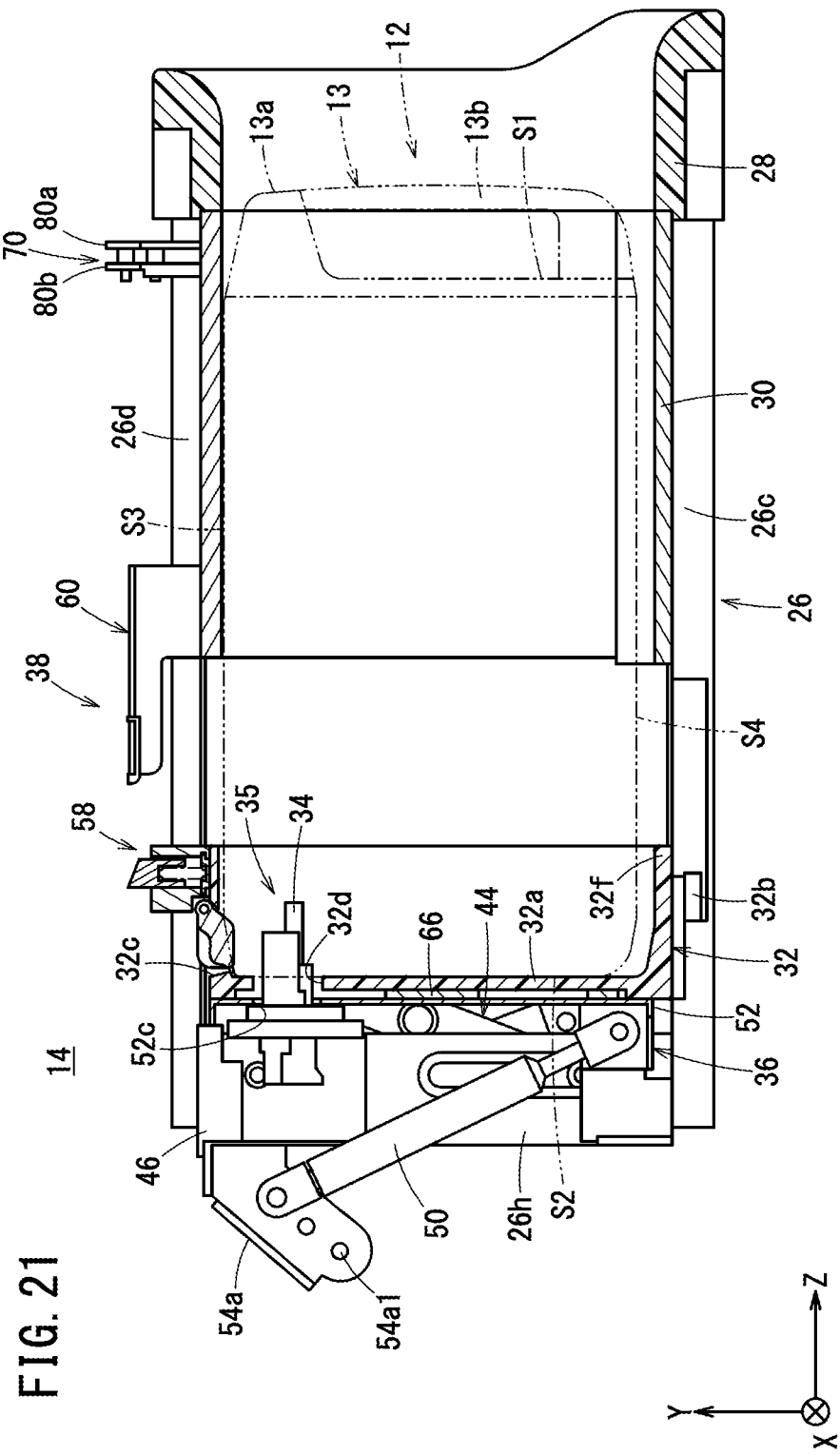
FIG. 21 is a cross-sectional view of the slot.
Figure 22:
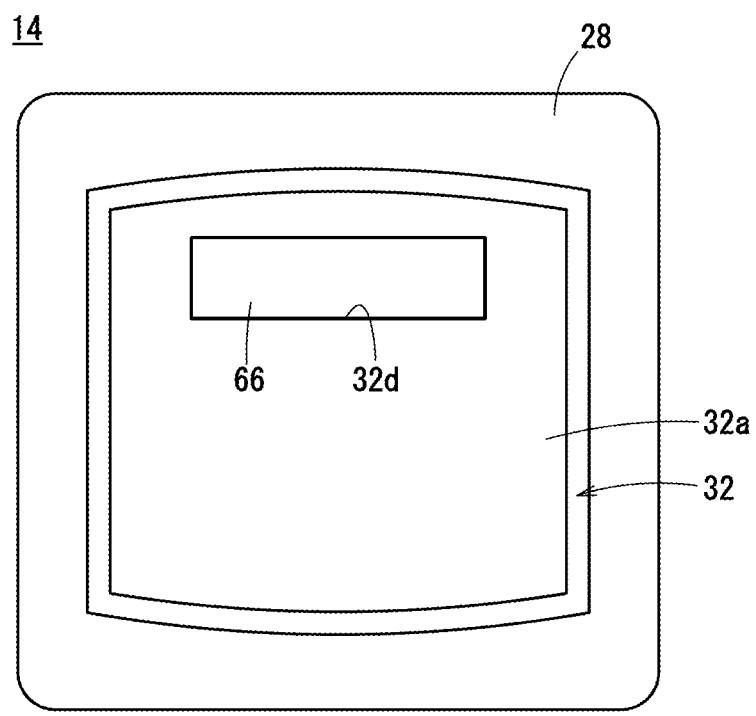
FIG. 22 is a front view of the slot.

FIG. 21 is a cross-sectional view of the slot 14. The slot 14 shown in FIG. 21 is cut along a plane parallel to the YZ plane. FIG. 21 shows the slot 14 in a state in which the battery tray 32 is positioned foremost on the negative side in the Z-axis direction. In FIG. 21, an outline of the mobile battery 12 is indicated by the two-dot dashed line, in a manner so that the connector 34 and the like can be easily seen. FIG. 22 and FIG. 23 are front views of the slot 14. FIG. 22 shows the slot 14 in a state in which the battery tray 32 is positioned foremost on the positive side in the Z-axis direction. FIG. 23 shows the slot 14 in a state in which the battery tray 32 is positioned foremost on the negative side in the Z-axis direction. Moreover, the state in which the battery tray 32 is positioned foremost on the positive side in the Z-axis direction indicates a state in which the battery tray 32 is in contact with an end surface of the battery holder 30 on the negative side in the Z-axis direction. Further, the state in which the battery tray 32 is positioned foremost on the negative side in the Z-axis direction indicates a state in which the battery tray 32 is in contact with the stopper 46.

By the tray bracket 52 moving in the Z-axis direction, the shutter 66 moves in the Y-axis direction together with the link 62a. In the case that the battery tray 32 is positioned on the positive side in the Z-axis direction, the shutter 66 blocks communication between the through hole 52c of the tray bracket 52 and the through hole 32d of the tray main body 32f. In accordance with this feature, foreign matter can be prevented from entering the connector 34 from the battery tray 32. When the battery tray 32 moves to the negative side in the Z-axis direction, the shutter 66 opens. Consequently, the through hole 32d of the tray main body 32f and the through hole 52c of the tray bracket 52 are placed in communication with each other. The connector 34 passes through the through hole 52c of the tray bracket 52 and the through hole 32d of the battery tray 32, and enters the interior of the battery tray 32. Consequently, the connector 34 of the slot 14 is connected to the connector 15 of the mobile battery 12 that is retained in the battery tray 32.

The gas spring 50 of the tray retention mechanism 36 is filled with a gas. The tray retention mechanism 36 has a damper function and a spring function. By the damper function, a damping force is generated that prevents the displacement of the tray bracket 52 in the Z-axis direction. By the spring function, the tray bracket 52 is biased toward the positive side in the Z-axis direction. At a time when the battery tray 32 receives a load of the mobile battery 12 and moves to the negative side in the Z-axis direction, the gas spring 50 accumulates energy. Further, at a time when the battery tray 32 moves to the positive side in the Z-axis direction, the gas spring 50 releases the accumulated energy. The gas spring 50 accumulates energy as the pressure of the gas enclosed in the gas spring 50. Moreover, it should be noted that a metal spring may be used instead of the gas spring 50. In that case, energy is accumulated as the elastic force of the spring. The inclination at which the slot 14 is installed in the battery exchange device 10 differs depending on the model of the battery exchange device 10. The force from the mobile battery 12 that acts in the Z-axis direction on the battery tray 32 changes in accordance with the inclination at which the slot 14 is installed in the battery exchange device 10. Therefore, the damper load of the gas spring 50 needs to be set in accordance with the inclination at which the slot 14 is installed in the battery exchange device 10.

As shown in FIG. 13, three mounting holes 54a1 are formed in the spring bracket 54a. The spring bracket 54a supports the gas spring 50. By changing the mounting hole 54a1 in which the gas spring 50 is mounted, the inclination of the gas spring 50 with respect to the Z-axis direction can be changed. The damper load that acts on the battery tray 32 from the gas spring 50 increases as the inclination of the gas spring 50 with respect to the Z-axis direction decreases. In accordance with this feature, even with a single type of the gas spring 50, the damper load that acts on the battery tray 32 from the gas spring 50 can be changed. Thus, there is no need to prepare, for each model of the battery exchange device 10, gas springs 50 having damper loads corresponding to the inclinations at which the slots 14 are installed in the battery exchange device 10.

The air dampers 48 of the tray retention mechanism 36 generate a damping force so as to prevent the tray bracket 52 from being displaced to the negative side in the Z-axis direction. As shown in FIG. 3, the air damper 48 includes a cylindrical columnar shaped plunger 48a. At a time when the tray bracket 52 moves to the negative side in the Z-axis direction, the tray bracket 52 comes into contact with the plunger 48a. At this time, a damping force acts on the tray bracket 52 from the plunger 48a toward the positive side in the Z-axis direction. In accordance with this feature, the air damper 48 absorbs the force input from the tray bracket 52.

The stopper 46 of the tray retention mechanism 36 restricts the movement of the battery tray 32 to the negative side in the Z-axis direction. At a position where the battery tray 32 has moved maximally to the negative side in the Z-axis direction, the tray bracket 52 comes into contact with the stopper 46. In accordance with this feature, the movement of the battery tray 32 to the negative side in the Z-axis direction is restricted. Therefore, it is possible to prevent an excessive force from acting on the connector 34 from the mobile battery 12.

[Battery Lock Mechanism]

The battery lock mechanism 40, in a state in which the mobile battery 12 is pushed into the slot 14, restricts the movement of the mobile battery 12 to the positive side in the Z-axis direction. Consequently, the state in which the mobile battery 12 is pushed into the slot 14 is maintained.

Figure 24:
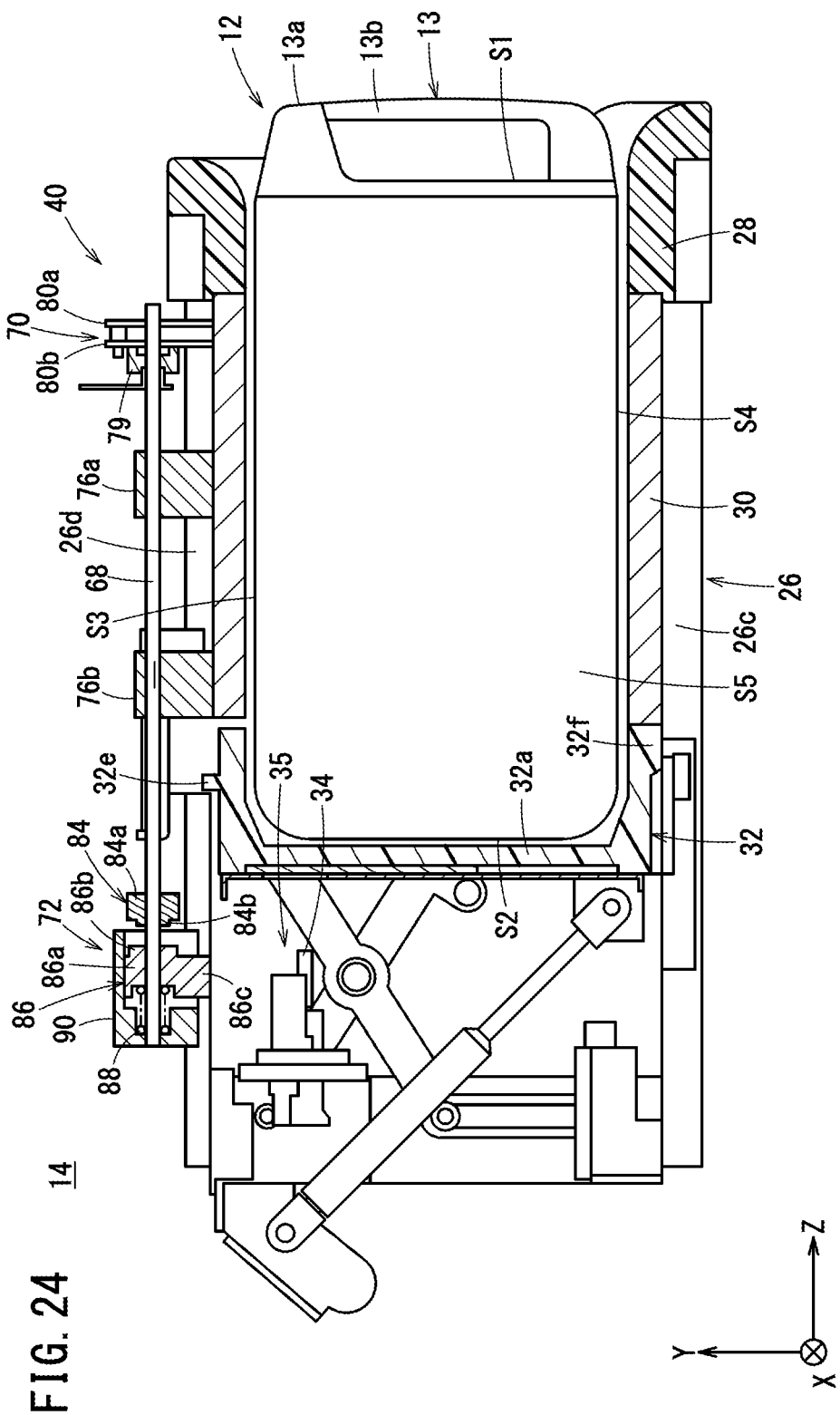
FIG. 24 is a cross-sectional view of the slot.
Figure 25:
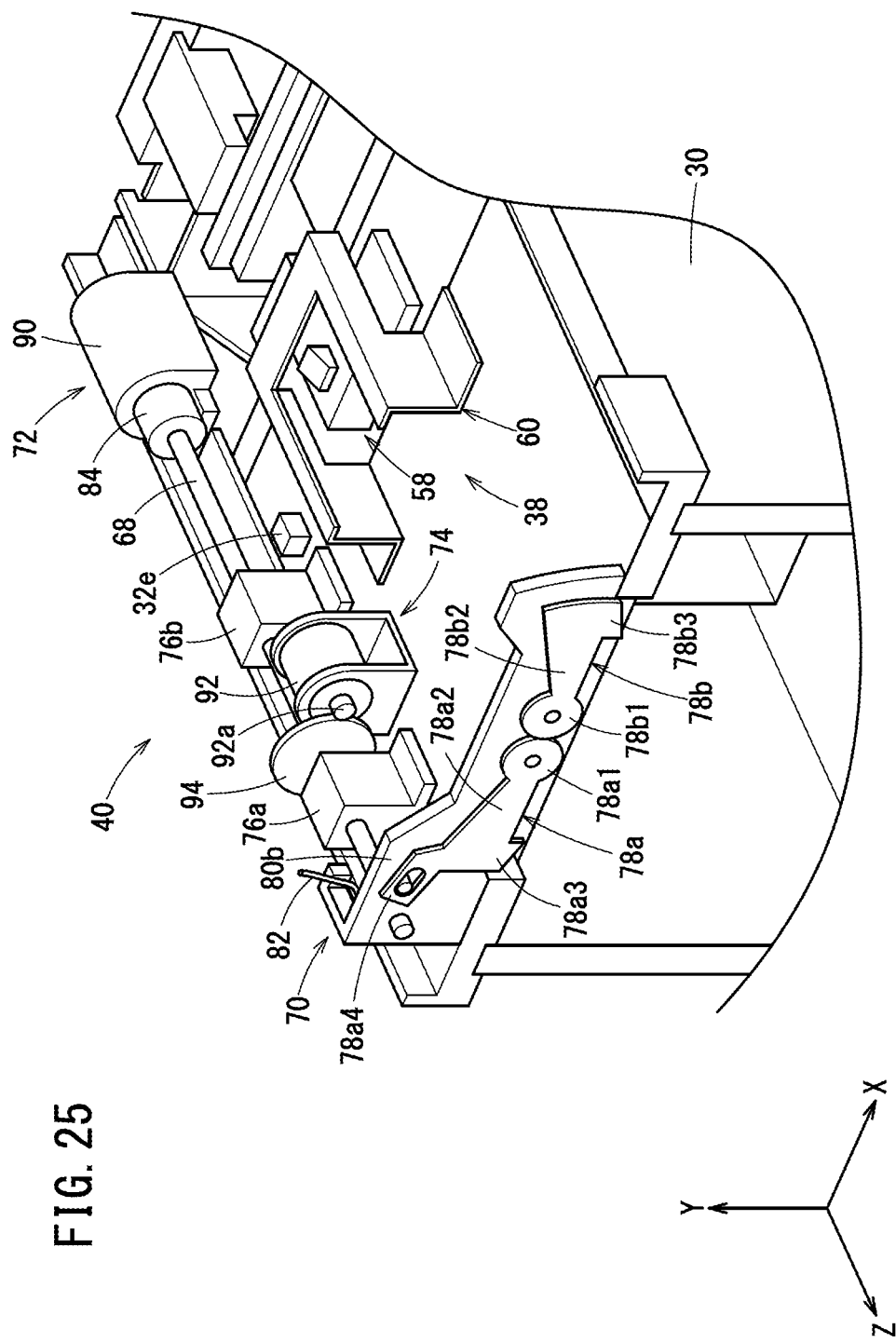
FIG. 25 is an enlarged perspective view of a battery lock mechanism.
Figure 26:
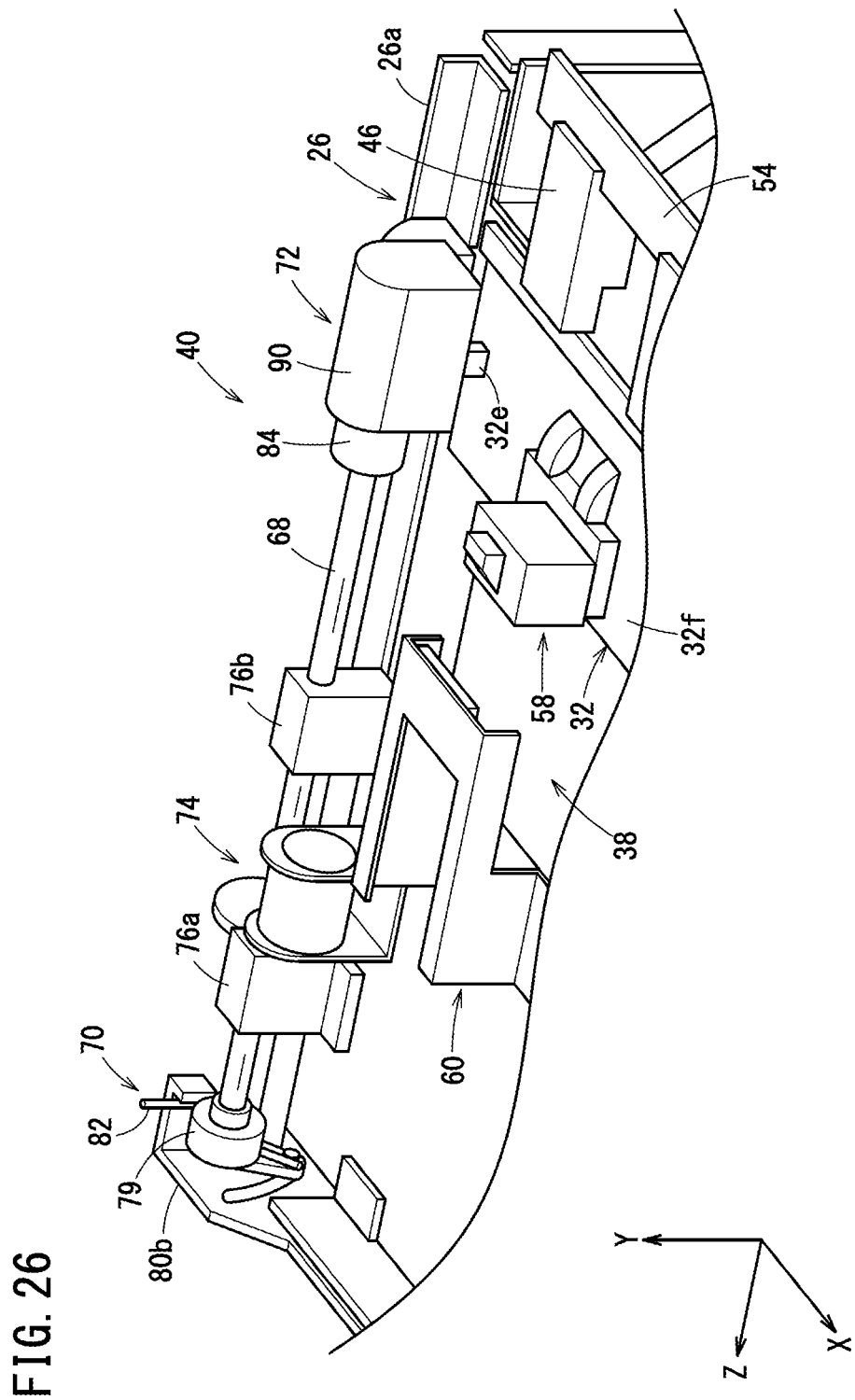
FIG. 26 is an enlarged perspective view of the battery lock mechanism.

FIG. 24 is a cross-sectional view of the slot 14. The slot 14 shown in FIG. 24 is cut along a plane parallel to the YZ plane. FIG. 25 and FIG. 26 are enlarged perspective views of the battery lock mechanism 40. FIG. 25 shows a state in which the mobile battery 12 is not inserted into the slot 14. FIG. 26 shows a state in which the mobile battery 12 is pushed into the slot 14.

The battery lock mechanism 40 is installed on the side surface of the slot 14 on the positive side in the Y-axis direction. The battery lock mechanism 40 includes a shaft 68, a stopper drive unit 70, a stopper lock unit 72, and a stopper lock releasing unit 74.

The shaft 68 is arranged so as to extend in the Z-axis direction. The shaft 68 is rotatably supported by two bearings 76a and 76b. The bearings 76a and 76b are installed on a side surface of the battery holder 30 on the positive side in the Y-axis direction.

The stopper drive unit 70 includes flaps 78a and 78b, a lever 79, and a torsion spring 82. The flaps 78a and 78b are arranged between a plate 80a and a plate 80b. The plates 80a and 80b are installed on the side surface of the battery holder 30 on the positive side in the Y-axis direction. The flaps 78a and 78b include gears 78a1 and 78b1, arms 78a2 and 78b2, and stoppers 78a3 and 78b3. The flaps 78a and 78b are mounted in a rotatable manner to the plates 80a and 80b. The gears 78a1 and 78b1 are each formed with teeth on the outer circumference thereof. The gear 78a1 of the flap 78a and the gear 78b1 of the flap 78b mesh with each other. In accordance with this feature, when the flap 78a rotates, the flap 78b also rotates. The arms 78a2 and 78b2 extend from the gears 78a1 and 78b1. The stoppers 78a3 and 78b3 extend from the arms 78a2 and 78b2 toward the negative side in the Y-axis direction of the battery holder 30.

The lever 79 is mounted on the shaft 68. The lever 79 and the shaft 68 rotate together in an integral manner. The torsion spring 82 is provided between the lever 79 and the plate 80b. When viewed from the positive side in the Z-axis direction, the torsion spring 82 biases the lever 79 such that the lever 79 rotates in a clockwise direction about the shaft 68. The lever 79 is connected to a connecting portion 78a4 of the flap 78a. Due to the lever 79 being rotated, the flap 78a rotates about the gear 78a1. The gear 78b1 that meshes with the gear 78a1 also rotates. Consequently, the flap 78b is made to rotate about the gear 78b1.

Figure 27:
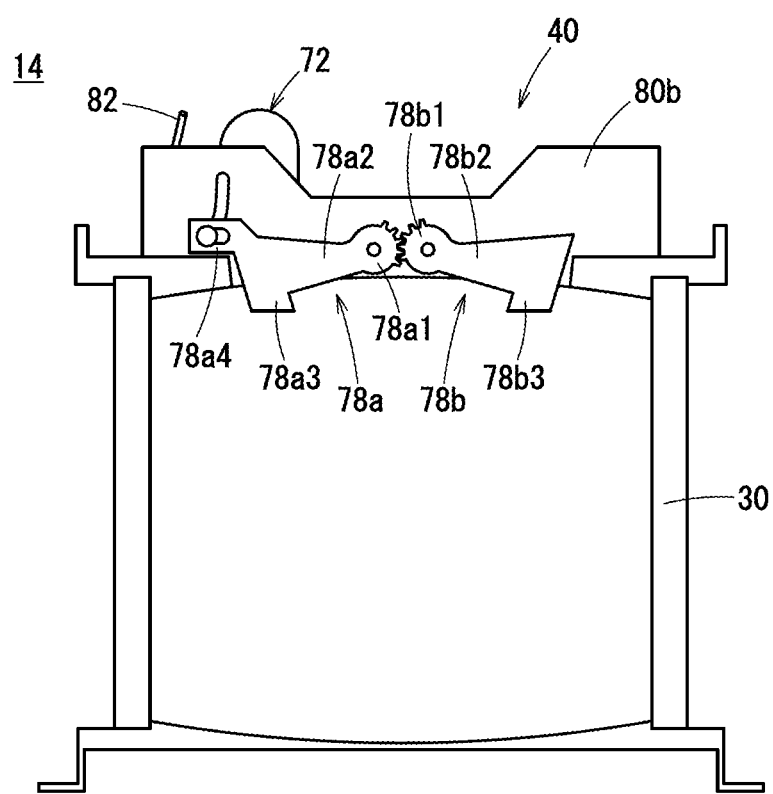
FIG. 27 is a cross-sectional front view of the slot.
Figure 28:
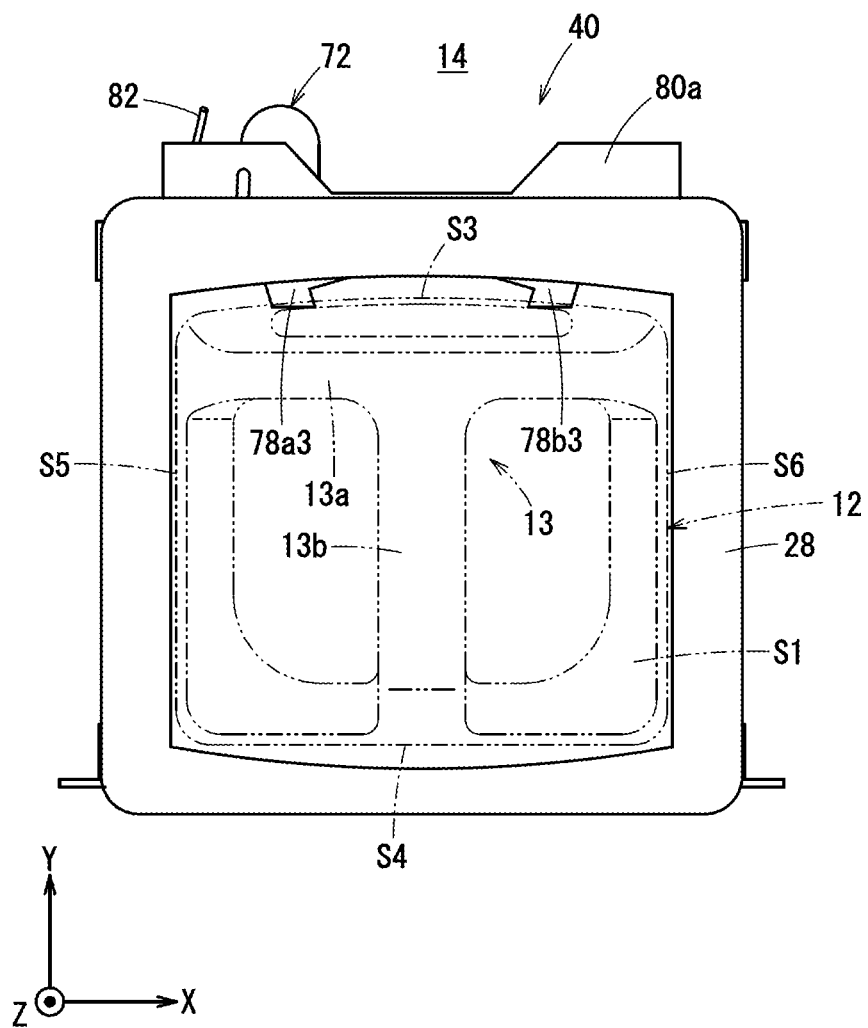
FIG. 28 is a front view of the slot.

FIG. 27 is a cross-sectional front view of the slot 14. The slot 14 shown in FIG. 27 is cut along a plane parallel to the XY plane. FIG. 28 is a front view of the slot 14. FIG. 27 and FIG. 28 show a state in which the flaps 78a and 78b are lowered.

As viewed from the positive side in the Z-axis direction, when the shaft 68 rotates to the right together with the lever 79, the stoppers 78a3 and 78b3 of the flaps 78a and 78b move to the inner side of the battery holder 30. At a time when the mobile battery 12 is about to be pulled out from the slot 14, the mobile battery 12 comes into contact with the stoppers 78a3 and 78b3. Consequently, the movement of the mobile battery 12 to the positive side in the Z-axis direction is restricted.

Figure 29:
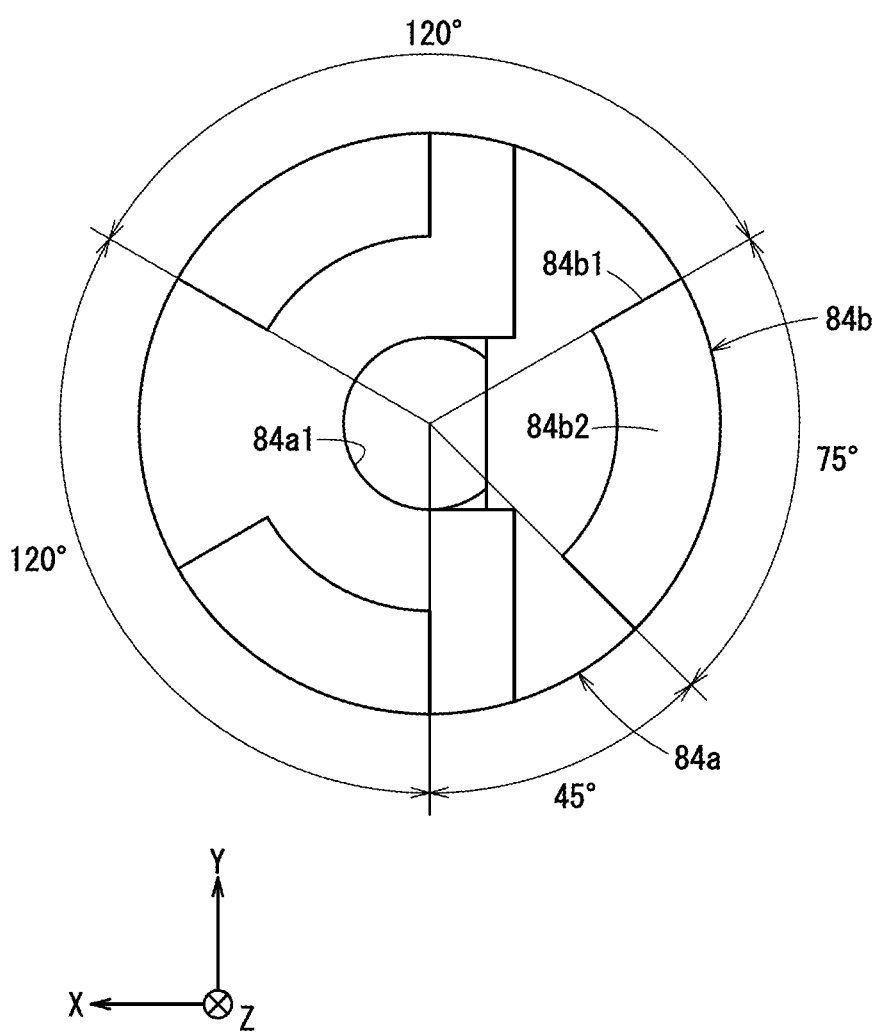
FIG. 29 is a front view of a cam.
Figure 30:
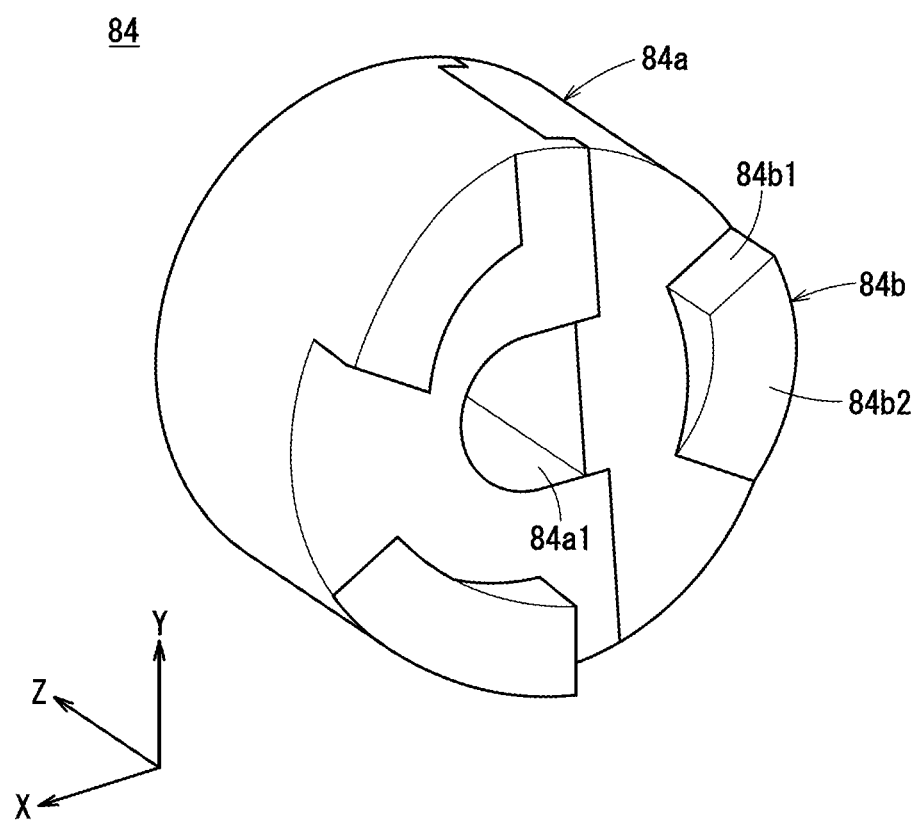
FIG. 30 is a perspective view of the cam.

As shown in FIG. 24, the stopper lock unit 72 includes a cam 84, a latch 86, and a coil spring 88. The cam 84 is provided on the negative side in the Z-axis direction of the shaft 68, and is capable of rotating integrally together with the shaft 68. FIG. 29 is a front view of the cam 84. FIG. 30 is a perspective view of the cam 84. The cam 84 includes a main body portion 84a and pawls 84b. The pawls 84b project out from the main body portion 84a toward the latch 86 (the negative side in the Z-axis direction). The main body portion 84a is a cylindrical member. A through hole 84a1 is formed in the center of the main body portion 84a. The shaft 68 passes through the through hole 84a1. As shown in FIG. 29, three pawls 84b are provided at intervals of 120° in the circumferential direction. Each of the pawls 84b includes a contact surface 84b1 and an inclined surface 84b2. The contact surface 84b1 is a surface parallel to the axial direction of the cam 84 (the Z-axis direction). The inclined surface 84b2 is a surface that serves to connect an end part of the contact surface 84b1 on the negative side in the Z-axis direction and the main body portion 84a. The inclined surface 84b2 is a surface that is inclined with respect to the surface of the main body portion 84a on the negative side in the Z-axis direction. The pawls 84b are each formed over a range of about 75° in the circumferential direction.

Figure 31:
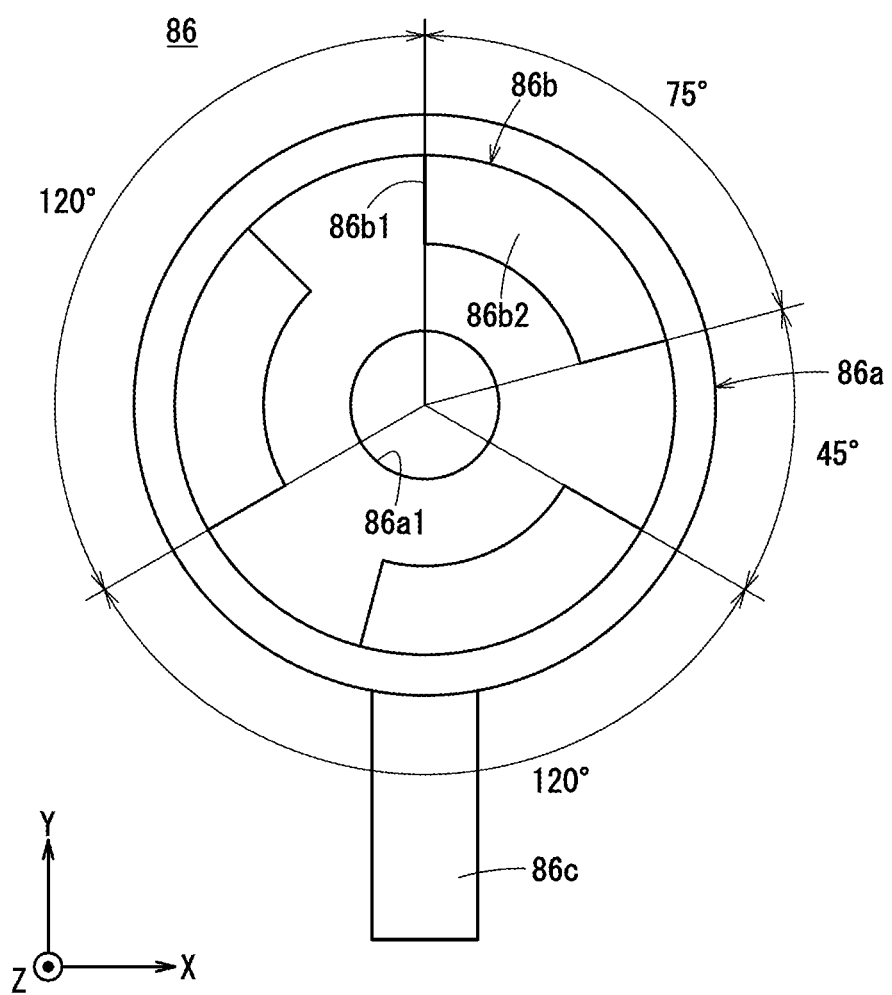
FIG. 31 is a front view of a latch.
Figure 32:
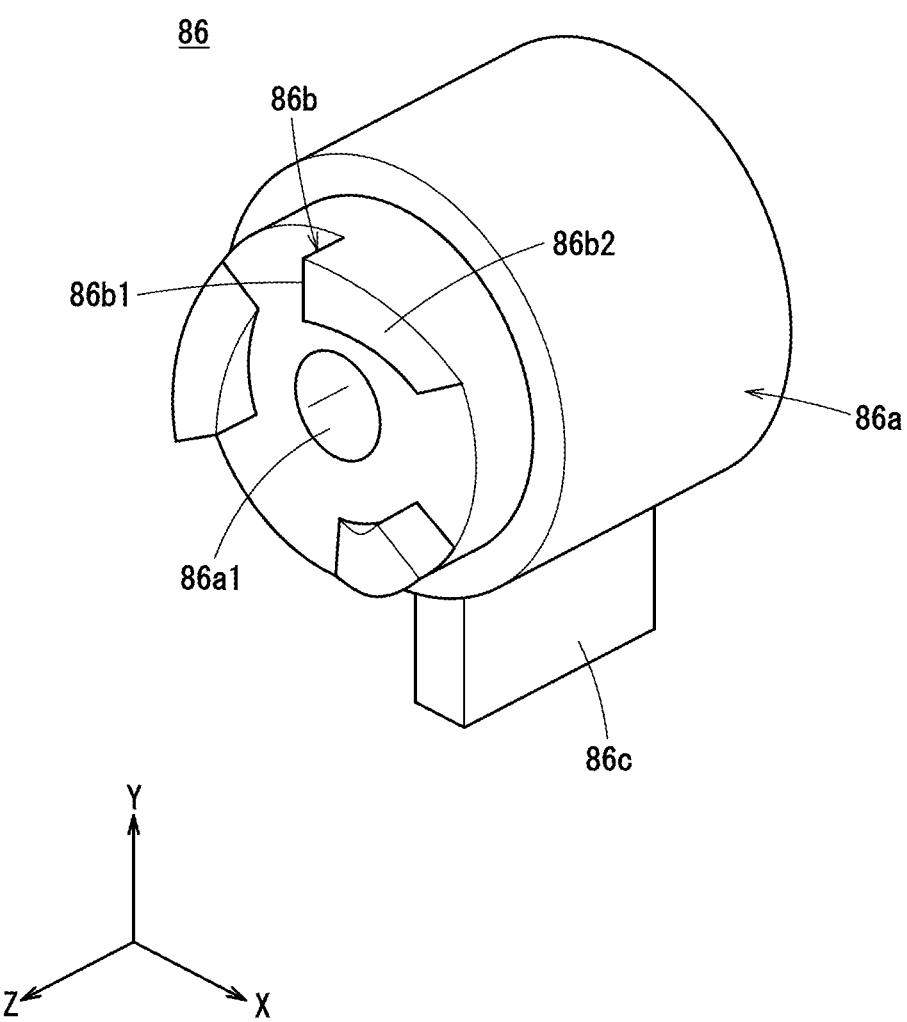
FIG. 32 is a perspective view of the latch.

As shown in FIG. 24, the latch 86 is provided inside a latch holder 90. The latch holder 90 is mounted on the main frame 26a. The latch 86 is provided so as to be capable of moving in the Z-axis direction. The latch 86 is provided so as to be incapable of rotating about the axis of the shaft 68. FIG. 31 is a front view of the latch 86. FIG. 32 is a perspective view of the latch 86. The latch 86 includes a main body portion 86a, pawls 86b, and a pin 86c. The main body portion 86a is a cylindrical member, and includes a through hole 86a1 formed in the center thereof. The shaft 68 passes through the through hole 86*a*1. The pawls 86*b* project out from the main body portion 86*a* toward the cam 84 (the negative side in the Z-axis direction). The pin 86*c* extends from the main body portion 86*a* to the negative side in the Y-axis direction.

As shown in FIG. 31, three pawls 86*b* are provided at intervals of 120° in the circumferential direction. Each of the pawls 86*b* includes a contact surface 86*b*1 and an inclined surface 86*b*2. The contact surface 86*b*1 is a surface parallel to the axial direction of the latch 86 (the Z-axis direction). The inclined surface 86*b*2 is a surface that serves to connect an end part of the contact surface 86*b*1 on the positive side in the Z-axis direction and the main body portion 86*a*. The inclined surface 86*b*2 is a surface that is inclined with respect to the surface of the main body portion 86*a* on the positive side in the Z-axis direction. The pawls 86*b* are each formed over a range of about 75° in the circumferential direction.

The shaft 68 passes through the through hole 86*a*1 of the latch 86. The shaft 68 is rotatably supported by the latch holder 90. The latch 86 is supported by the latch holder 90 so as to be capable of moving in the axial direction of the shaft 68 (the Z-axis direction). The latch 86 is supported in a manner so as to be incapable of rotating in the direction of rotation about the axis of the shaft 68. The latch 86 is biased toward the cam 84 by the coil spring 88 that is provided inside the latch holder 90.

At a time when the latch 86 is positioned on the side of the cam 84, in the case that the cam 84 rotates in a counterclockwise direction together with the shaft 68 as viewed from the negative side in the Z-axis direction, the contact surface 84*b*1 of the pawl 84*b* of the cam 84 comes into contact with the contact surface 86*b*1 of the pawl 86*b* of the latch 86. Consequently, the latch 86 restricts the rotation of the shaft 68 via the cam 84.

On the other hand, even at a time when the latch 86 is positioned on the side of the cam 84, in the case that the cam 84 rotates in a clockwise direction together with the shaft 68 as viewed from the negative side in the Z-axis, since the inclined surface 84*b*2 of the pawl 84*b* of the cam 84 presses the inclined surface 86*b*2 of the pawl 86*b* of the latch 86 to the negative side in the Z-axis direction, the shaft 68 is capable of rotating.

At a time when the latch 86 is positioned away from the cam 84, even in the case that the cam 84 rotates counterclockwise, or clockwise together with the shaft 68 as viewed from the negative side in the Z-axis direction, the pawl 86*b* of the latch 86 and the pawl 84*b* of the cam 84 do not come into contact with each other. Therefore, the shaft 68 becomes capable of rotating.

Figure 33:
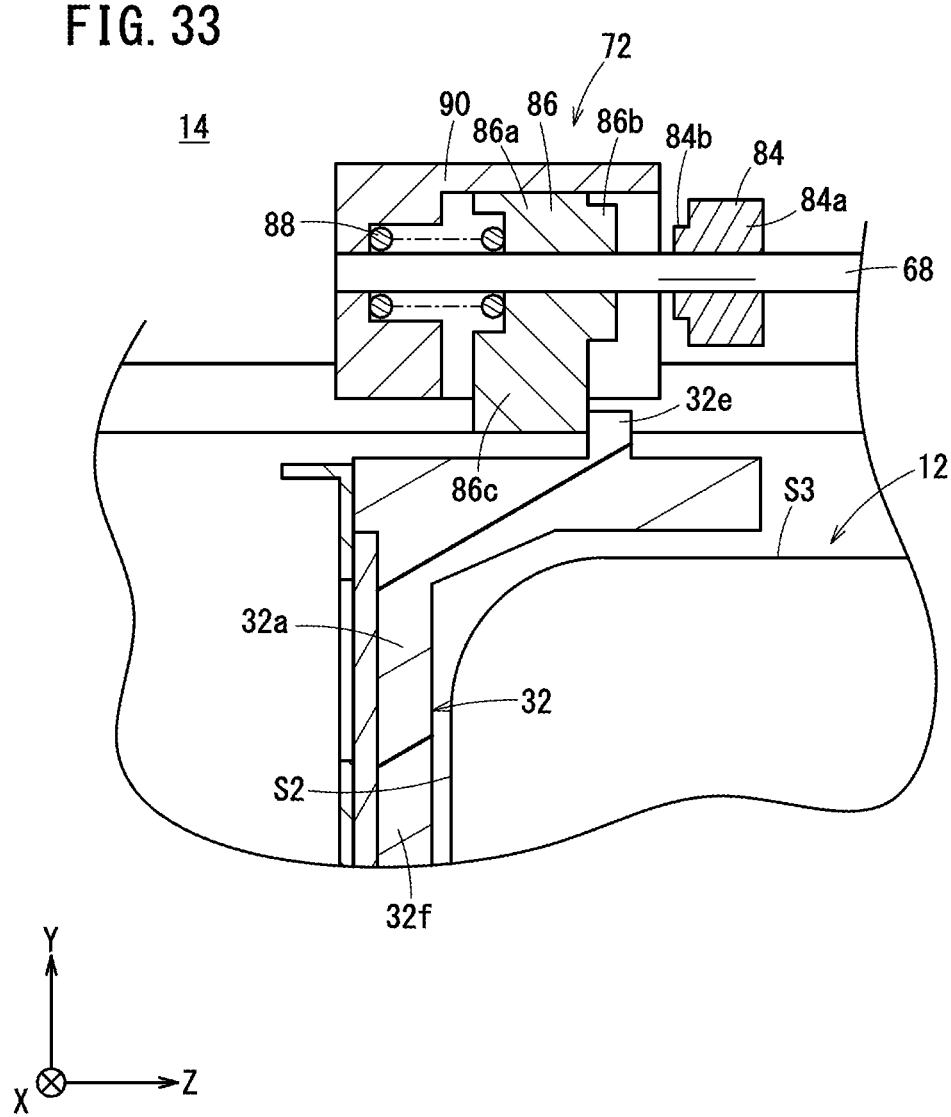
FIG. 33 is an enlarged cross-sectional view of a stopper lock unit of the slot and the vicinity thereof.
Figure 34:
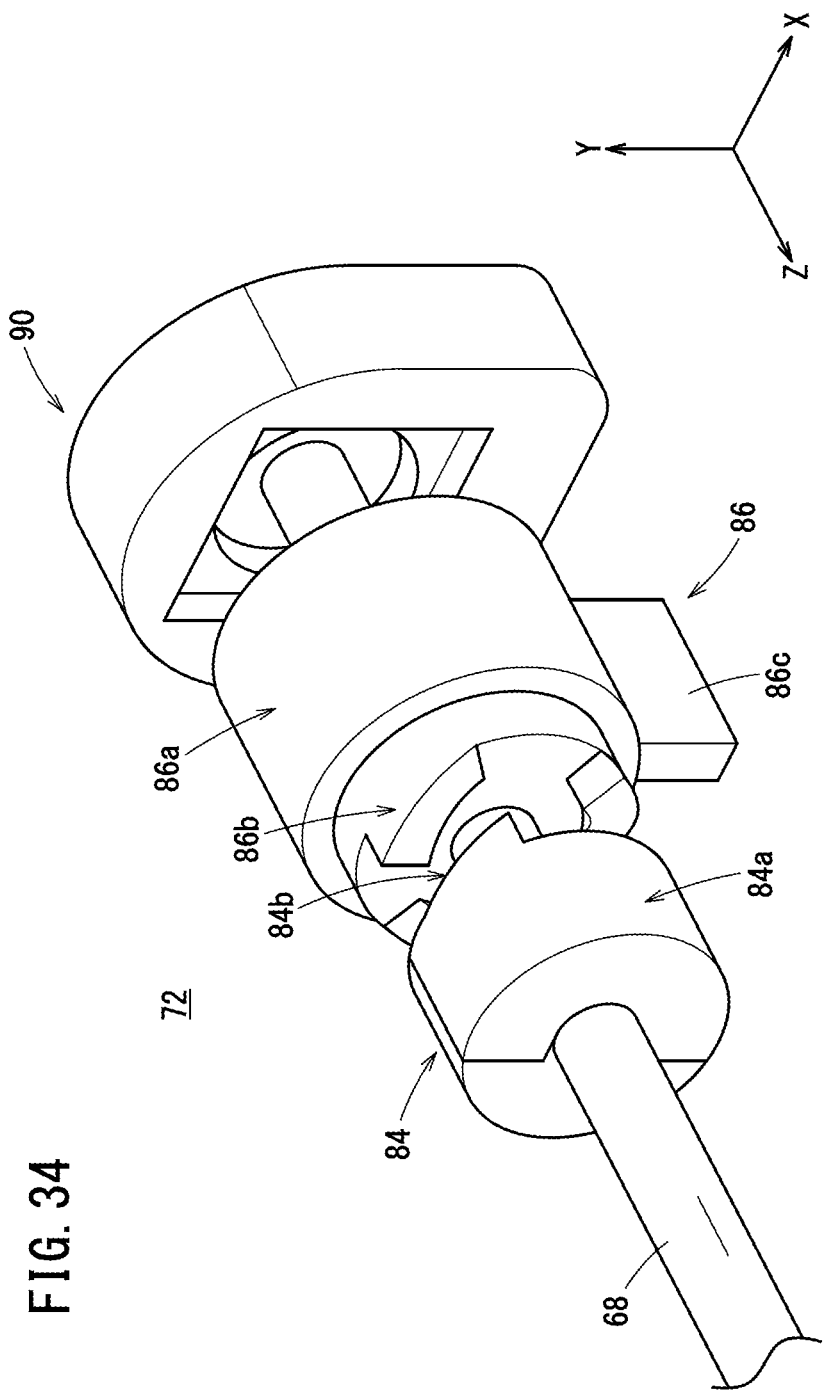
FIG. 34 is an enlarged perspective view of the stopper lock unit.

FIG. 33 is an enlarged cross-sectional view of the stopper lock unit 72 of the slot 14 and the vicinity thereof. The slot 14 shown in FIG. 33 is cut along a plane parallel to the YZ plane. FIG. 34 is an enlarged perspective view of the stopper lock unit 72 of the slot 14. In FIG. 34, a portion of the coil spring 88 and a portion of the latch holder 90 are omitted. FIG. 33 and FIG. 34 show a state in which the mobile battery 12 is pushed into the slot 14.

A pin 32*e* that projects out to the positive side in the Y-axis direction is formed on the surface of the tray main body 32*f* of the battery tray 32 on the positive side in the Y-axis direction. When the mobile battery 12 is pushed into the slot 14, and the battery tray 32 moves to the negative side in the Z-axis direction, the pin 32*e* of the tray main body 32*f* presses the pin 86*c* of the latch 86. In accordance with this feature, the latch 86 moves to the negative side in the Z-axis direction. Consequently, the pawl 86*b* of the latch 86 and the pawl 84*b* of the cam 84 become disengaged.

As shown in FIG. 25, the stopper lock releasing unit 74 includes a motor 92. The motor 92 is installed on the side surface of the battery holder 30 on the positive side in the Y-axis direction. A pinion 92*a* is mounted on the drive shaft of the motor 92. The pinion 92*a* meshes with a gear 94 that rotates integrally with the shaft 68. By the motor 92 being rotatably driven, the shaft 68 can be made to rotate.

Figure 35:
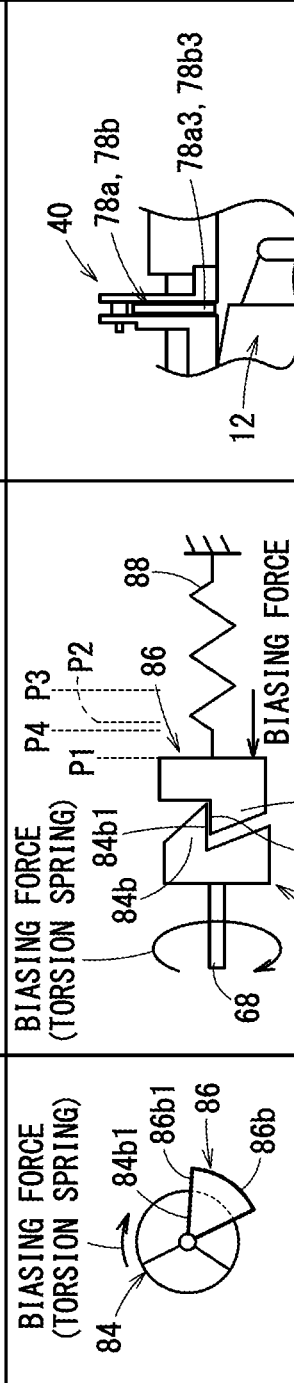
FIG. 35 is a table showing movement in a direction of rotation of the cam and the latch, movement in an axial direction of the cam and the latch, and movement of the battery lock mechanism.

FIG. 35 and FIG. 36 are tables showing movement of the cam 84 and the latch 86 in a direction of rotation, movement of the cam 84 and the latch 86 in an axial direction, and movement of the battery lock mechanism 40, at a time when the battery lock mechanism 40 changes from a lock released state to the locked state. Each of the diagrams shown in FIG. 35 and FIG. 36 is a schematic diagram. In accordance with FIG. 35 and FIG. 36, four states are shown including the lock released state, immediately prior to the locked state, a lowest point state, and the locked state. The lock released state indicates a state in which the mobile battery 12 is released from being locked by the battery lock mechanism 40. The immediately prior to the locked state indicates a state immediately prior to the mobile battery 12 being locked by the battery lock mechanism 40. The lowest point state indicates a state in which the mobile battery 12 is pushed maximally into the slot 14. The locked state indicates a state in which the mobile battery 12 is locked by the battery lock mechanism 40.

A position P1 is taken to be the position of the latch 86 in the Z-axis direction in the lock released state (see FIG. 35). A biasing force is applied to the latch 86 from the coil spring 88 toward the positive side in the Z-axis direction, and the latch 86 is pressed against the cam 84. The pawl 84*b* of the cam 84 and the pawl 86*b* of the latch 86 engage with each other, and therefore, although the biasing force in the direction of rotation acts on the cam 84 from the torsion spring 82 via the shaft 68, the cam 84 does not rotate.

When the user starts pushing the mobile battery 12 into the slot 14, the pin 32*e* of the tray main body 32*f* pushes the pin 86*c* of the latch 86. In accordance with this feature, the latch 86 moves to the negative side in the Z-axis direction. A position P2 is taken to be the position of the latch 86 in the Z-axis direction immediately prior to the locked state (see FIG. 35). Immediately prior to the locked state, a biasing force in the direction of rotation acts on the cam 84 from the torsion spring 82 via the shaft 68. However, since the pawl 84*b* of the cam 84 and the pawl 86*b* of the latch 86 are still in engagement, the cam 84 does not rotate.

A position P3 is taken to be the position of the latch 86 in the Z-axis direction in the lowest point state (see FIG. 36). At this time, the latch 86 and the cam 84 are separated from each other, and the pawl 84*b* of the cam 84 and the pawl 86*b* of the latch 86 are disengaged. Therefore, the cam 84 is made to rotate by the biasing force of the torsion spring 82. The shaft 68 rotates together with the cam 84, and furthermore, the lever 79 rotates together with the shaft 68. Consequently, the flaps 78*a* and 78*b* are lowered. In the lowest point state, in the Z-axis direction, a gap occurs between the mobile battery 12 and the stoppers 78*a*3 and 78*b*3.

When the user releases the force of pushing the mobile battery 12 from the lowest point state, the mobile battery 12 moves to the positive side in the Z-axis direction due to the force of the gas spring 50 pushing the battery tray 32 to the positive side in the Z-axis direction. The mobile battery 12 comes into contact with the stoppers 78*a*3 and 78*b*3 and becomes placed in the locked state. A position P4 is taken to be the position of the latch 86 in the Z-axis direction in the locked state (see FIG. 36). At this time, the latch 86 is pushed toward the cam 84 by the biasing force of the coil spring 88. Since the inclined surface 86b2 of the pawl 86b of the latch 86 presses the inclined surface 84b2 of the pawl 84b of the cam 84, the cam 84 is further rotated from the position thereof at the time of the lowest point state.

FIG. 37 is a table showing movement of the cam 84 and the latch 86 in a direction of rotation, and movement of the cam 84 and the latch 86 in an axial direction, at a time when the battery lock mechanism 40 changes from the locked state to the lock released state. Each of the diagrams shown in FIG. 37 is a schematic diagram. In FIG. 37, three states are shown including the locked state, a state during release of the lock, and the lock released state. The locked state indicates a state in which the mobile battery 12 is locked by the battery lock mechanism 40. The state during release of the lock indicates a state in which the mobile battery 12 is midway during being released from being locked by the battery lock mechanism 40. The lock released state indicates a state in which the mobile battery 12 is released from being locked by the battery lock mechanism 40.

In the locked state, the shaft 68 is rotated by the rotating force of the motor 92, and the cam 84 rotates integrally together with the shaft 68. In the state during release of the lock, the inclined surface 84b2 of the pawl 84b of the cam 84 presses the inclined surface 86b2 of the pawl 86b of the latch 86. In accordance with this feature, the latch 86 moves to the negative side in the Z-axis direction from the position P4, which is the axial position of the latch 86 in the locked state.

Together with the rotation of the shaft 68, the lever 79 rotates, and the flaps 78a and 78b are raised. In accordance with this feature, the locked state of the mobile battery 12 is released. In the lock released state, the battery tray 32 moves to the positive side in the Z-axis direction due to the biasing force of the gas spring 50. Accompanying the pin 32e of the battery tray 32 moving to the positive side in the Z-axis direction, the latch 86 also moves to the positive side in the Z-axis direction due to the biasing force of the coil spring 88. Consequently, the latch 86 is positioned at the position P1, which is the axial position of the latch 86 in the lock released state. At this time, the pawl 84b of the cam 84 and the pawl 86b of the latch 86 engage with each other.

The battery lock mechanism 40 is arranged on the positive side in the Y-axis direction of the slot 14 together with the tray lock mechanism 38. In accordance with this feature, a structure that projects out to the exterior of the frame 26 can be concentrated on the positive side in the Y-axis direction of the slot 14.

[Connector Unit]

Figure 38:
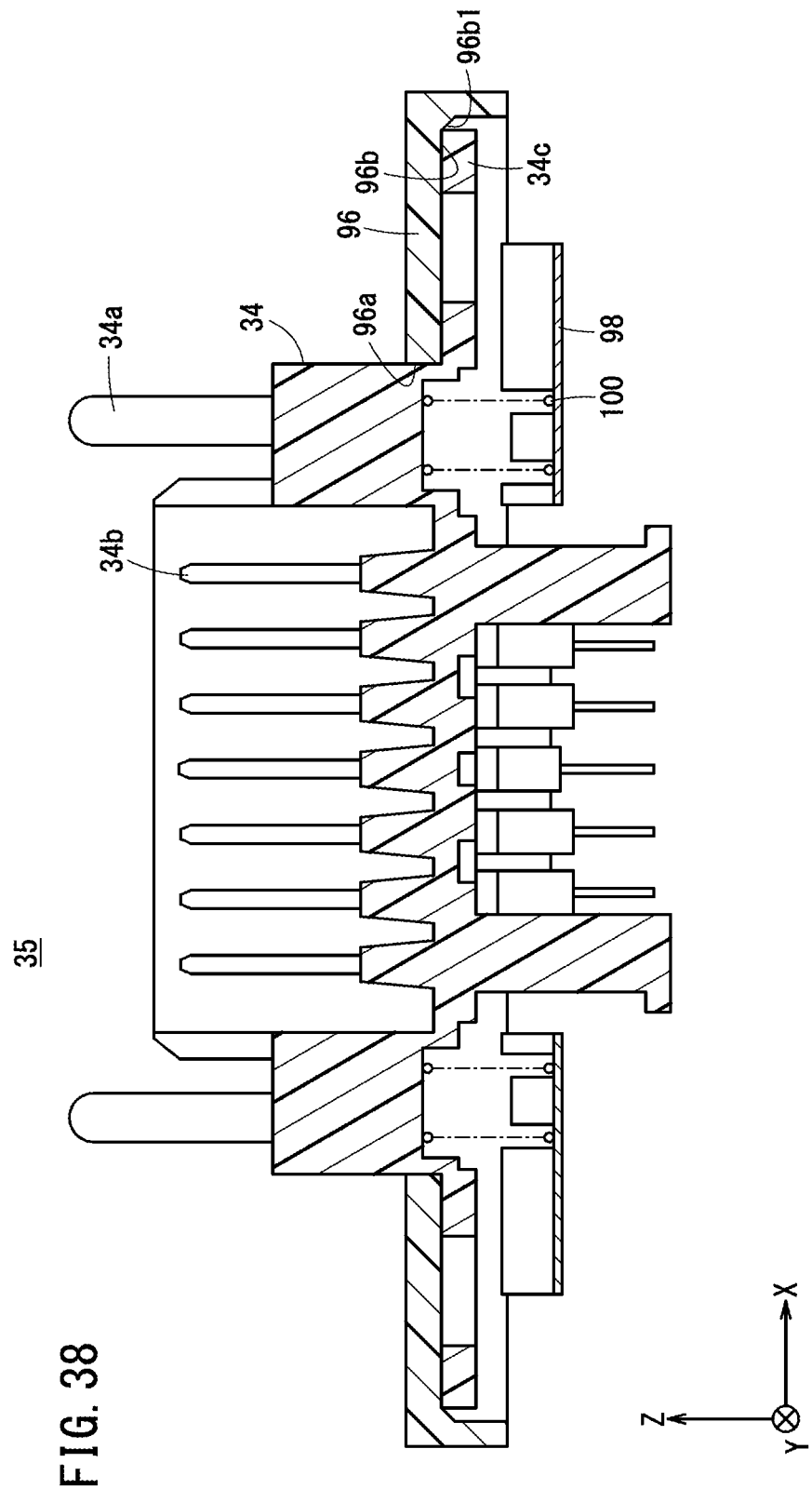
FIG. 38 is a cross-sectional view of a connector unit.
Figure 39:
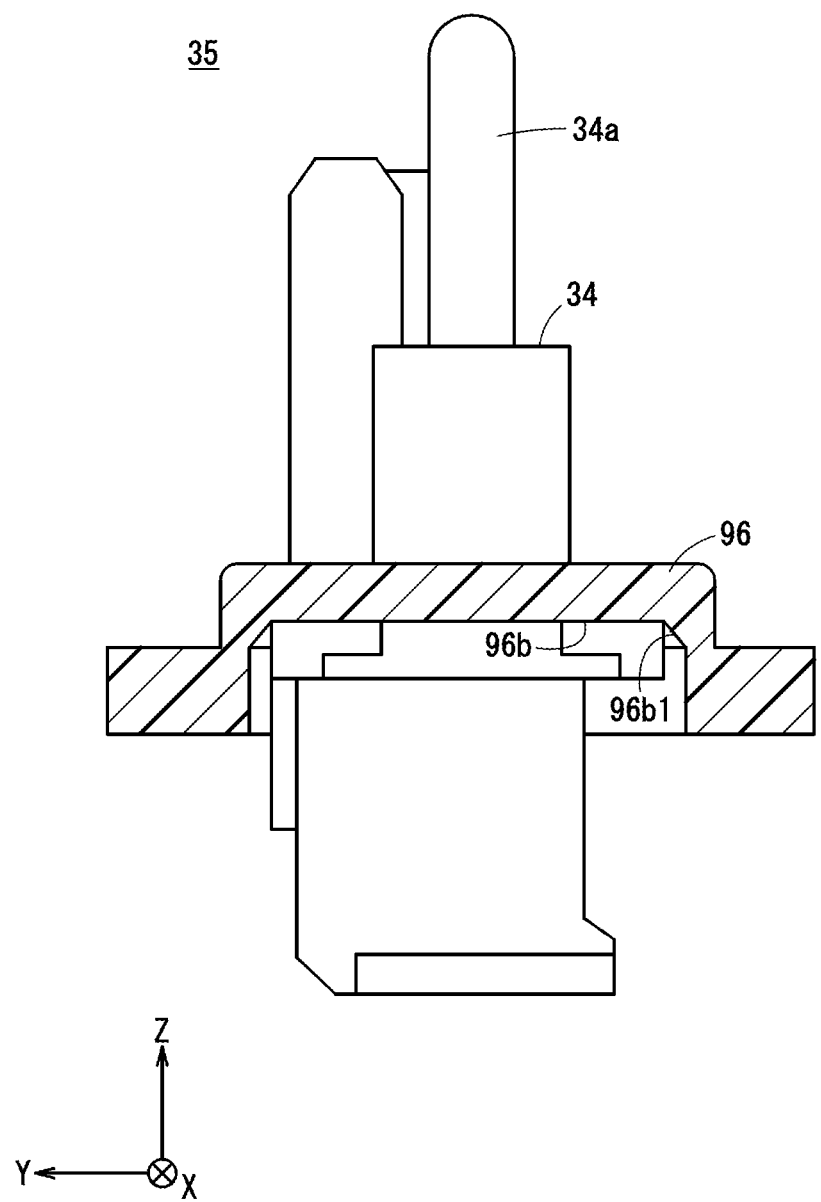
FIG. 39 is a cross-sectional view of the connector unit.

FIG. 38 and FIG. 39 are cross-sectional views of the connector unit 35. The connector unit 35 includes the connector 34, a connector holder 96, a plate 98, and a coil spring 100.

The connector 34 includes guide protruding portions 34a, terminals 34b, and a flange portion 34c. The guide protruding portions 34a are fitted into guide holes 15a (see FIG. 41) that are formed in the second surface S2 of the mobile battery 12. A pair of the guide protruding portions 34a are provided on both outer sides of the terminals 34b in the X-axis direction. The terminals 34b are fitted into non-illustrated terminal holes that are formed in the connector 15 of the mobile battery 12. Electrical power for charging the mobile battery 12 is supplied from the terminals 34b. Further, control signals for controlling the charging of the mobile battery 12 are transmitted from the terminals 34b.

The flange portion 34c is accommodated in a concave portion 96b of the connector holder 96, which will be described later.

Figure 40:
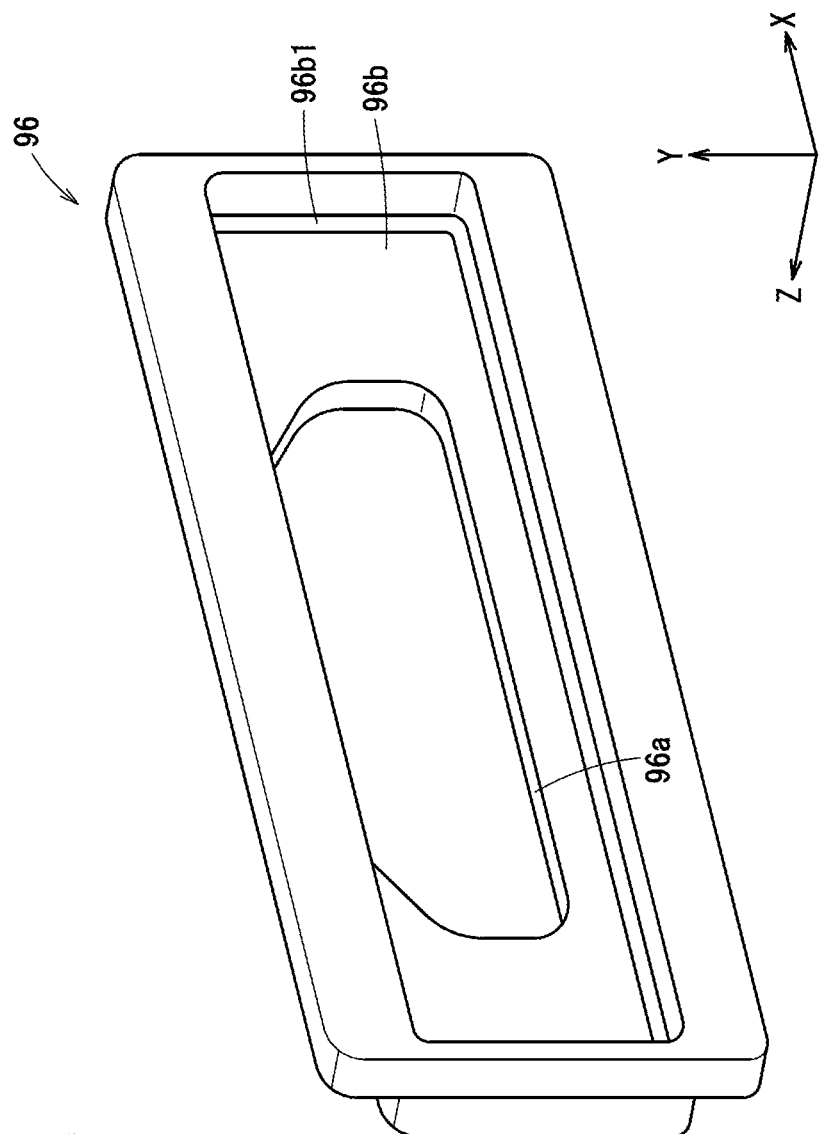
FIG. 40 is a perspective view of a connector holder.

FIG. 40 is a perspective view of the connector holder 96. The connector holder 96 includes a through hole 96a that passes therethrough in the Z-axis direction. As shown in FIG. 38, the guide protruding portion 34a and the terminals 34b of the connector 34 are inserted into the through hole 96a. The connector holder 96 includes the concave portion 96b on the surface thereof on the negative side in the Z-axis direction. The flange portion 34c of the connector 34 is accommodated in the concave portion 96b. A tapered portion 96b1 is formed at the edge of the concave portion 96b.

As shown in FIG. 38, the plate 98 is fixed to the negative side in the Z-axis direction of the connector holder 96. The coil spring 100 is provided between the plate 98 and the connector 34. The connector 34 is biased toward the positive side in the Z-axis direction by the coil spring 100.

Figure 41:
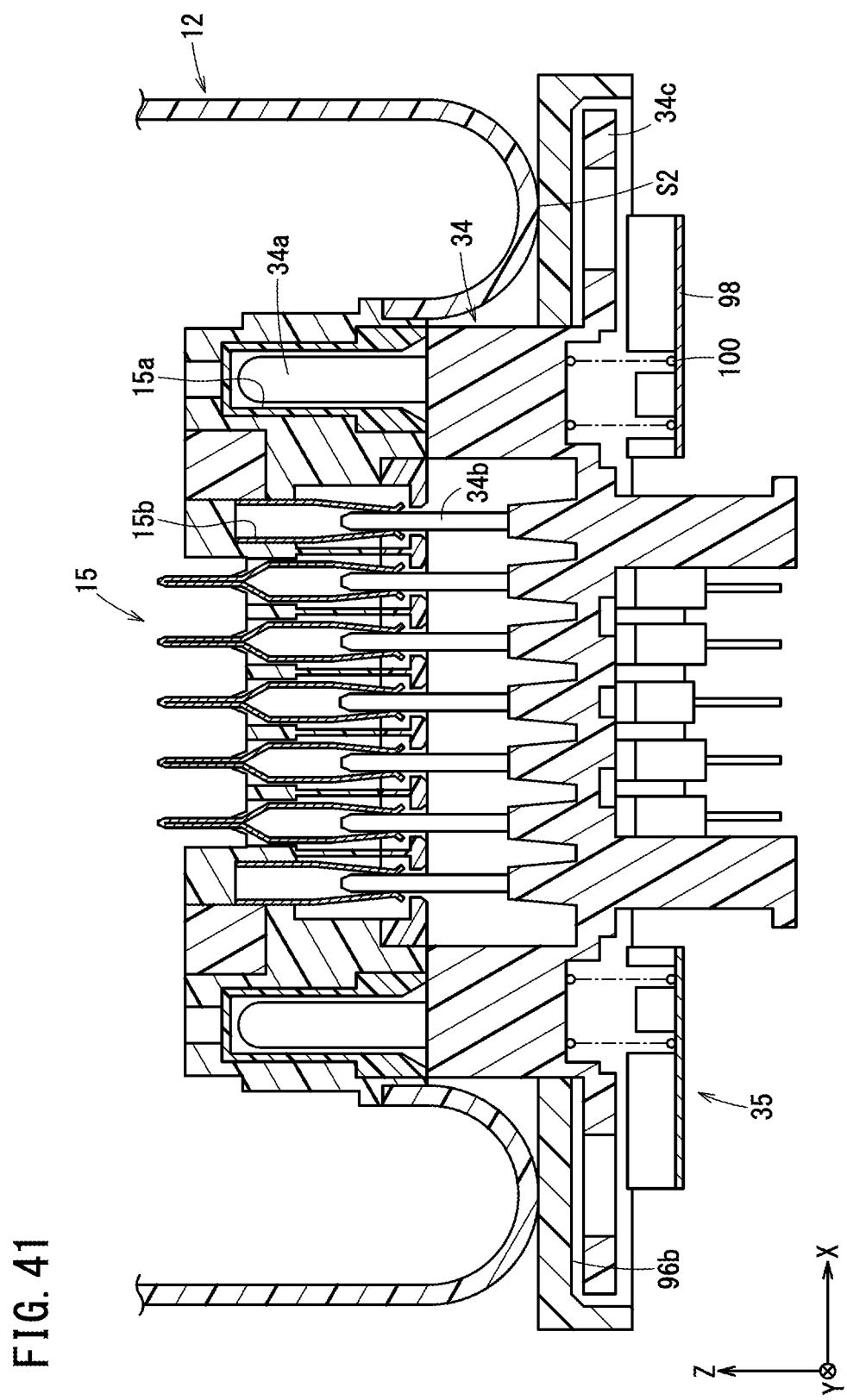
FIG. 41 is a partial cross-sectional view showing a state in which a connector of the connector unit is connected to a connector of the mobile battery.

FIG. 41 is a partial cross-sectional view showing a state in which the connector 34 of the connector unit 35 is connected to the connector 15 of the mobile battery 12. The connector 15 of the mobile battery 12 includes the guide holes 15a and terminal holes 15b. The guide holes 15a are fitted with the guide protruding portions 34a of the connector 34. The terminal holes 15b are fitted with the terminals 34b of the connector 34.

Until the terminals 34b of the connector 34 and the terminal holes 15b of the mobile battery 12 start to be fitted together, the flange portion 34c of the connector 34 is in contact with the bottom surface of the concave portion 96b of the connector holder 96 due to the biasing force of the coil spring 100, as shown in FIG. 38.

When the terminals 34b of the connector 34 and the terminal holes 15b of the mobile battery 12 start to be fitted together, the connector 34 moves to the negative side in the Z-axis direction with respect to the connector holder 96, in accordance with the force toward the negative side in the Z-axis direction that acts on the connector 34 from the mobile battery 12. Consequently, while the terminals 34b of the connector 34 and the terminal holes 15b of the mobile battery 12 are being fitted together, a force that presses the connector 34 toward the mobile battery 12 can be ensured.

After the terminals 34b of the connector 34 and the terminal holes 15b of the mobile battery 12 have been completely fitted together, as shown in FIG. 41, the flange portion 34c of the connector 34 is separated away from the bottom surface of the concave portion 96b of the connector holder 96. In accordance with this feature, even if the mobile battery 12 moves slightly within the slot 14, the terminals 34b of the connector 34 and the terminal holes 15b of the mobile battery 12 do not become disengaged.

At a time when the terminals 34b of the connector 34 are disengaged from the terminal holes 15b of the mobile battery 12, the flange portion 34c of the connector 34, which has separated away from the bottom surface of the concave portion 96b of the connector holder 96, moves toward the bottom surface of the concave portion 96b due to the biasing force of the coil spring 100. At this time, the flange portion 34c of the connector 34 is guided by the tapered portion 96b1 of the concave portion 96b of the connector holder 96, and thereby the connector 34 can be centered with respect to the connector holder 96.

As shown in FIG. 13, the connector unit 35 is arranged on the positive side in the Y-axis direction with respect to a central part of the slot 14 in the Y-axis direction. Thus, in a state in which the slot 14 is installed inside the battery exchange device 10, the connector unit 35 can be arranged at a position far away from the ground surface. Therefore, contact of water or the like with the connector unit 35 can be suppressed.

[Positional Relationship Between Slot and Mobile Battery]

Figure 42:
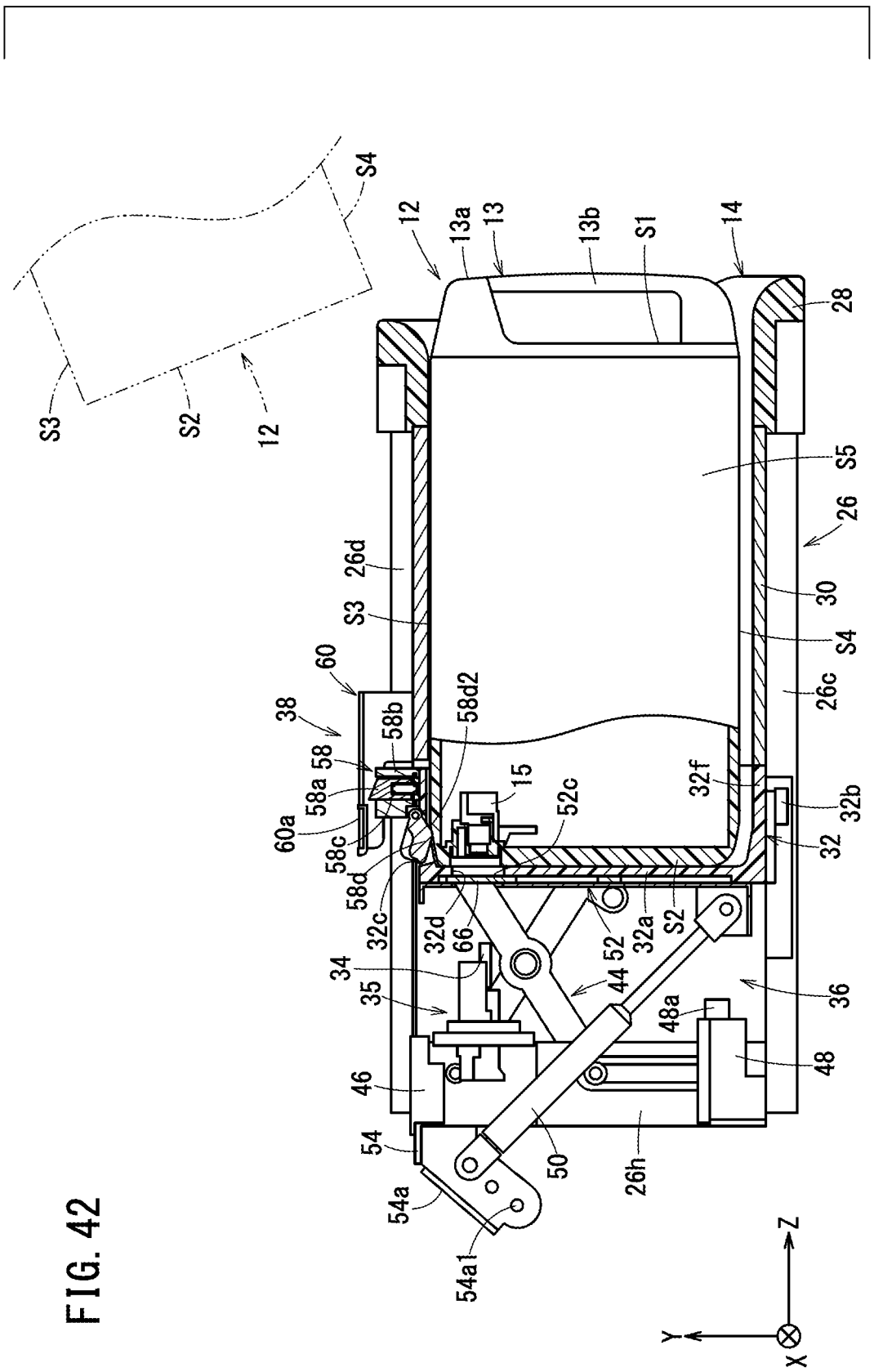
FIG. 42 is a cross-sectional view of the slot.

FIG. 42 is a cross-sectional view of the slot 14. The slot 14 shown in FIG. 42 is cut along a plane parallel to the YZ plane.

In a state in which the mobile battery 12 is inserted into the slot 14, the handle 13 of the mobile battery 12 is positioned on the positive side in the Z-axis direction with respect to an edge of the insertion opening 28 on the positive side in the Y-axis direction. Further, the handle 13 is positioned on the negative side in the Z-axis direction with respect to an edge of the insertion opening 28 on the negative side in the Y-axis direction. Consequently, a portion of the handle 13 is exposed to the exterior of the slot 14. Therefore, the user can easily grip the handle 13 at a time when the user receives the mobile battery 12 from the battery exchange device 10. Further, the mobile battery 12 does not project out from the slot 14 to the positive side in the Z-axis direction. Therefore, at a time when the user receives the mobile battery 12 from the battery exchange device 10, a bottom surface 12a of the mobile battery 12 can be prevented from colliding with the mobile battery 12 that is inserted into the slot 14 located therebelow.

Second Embodiment

Figure 43:
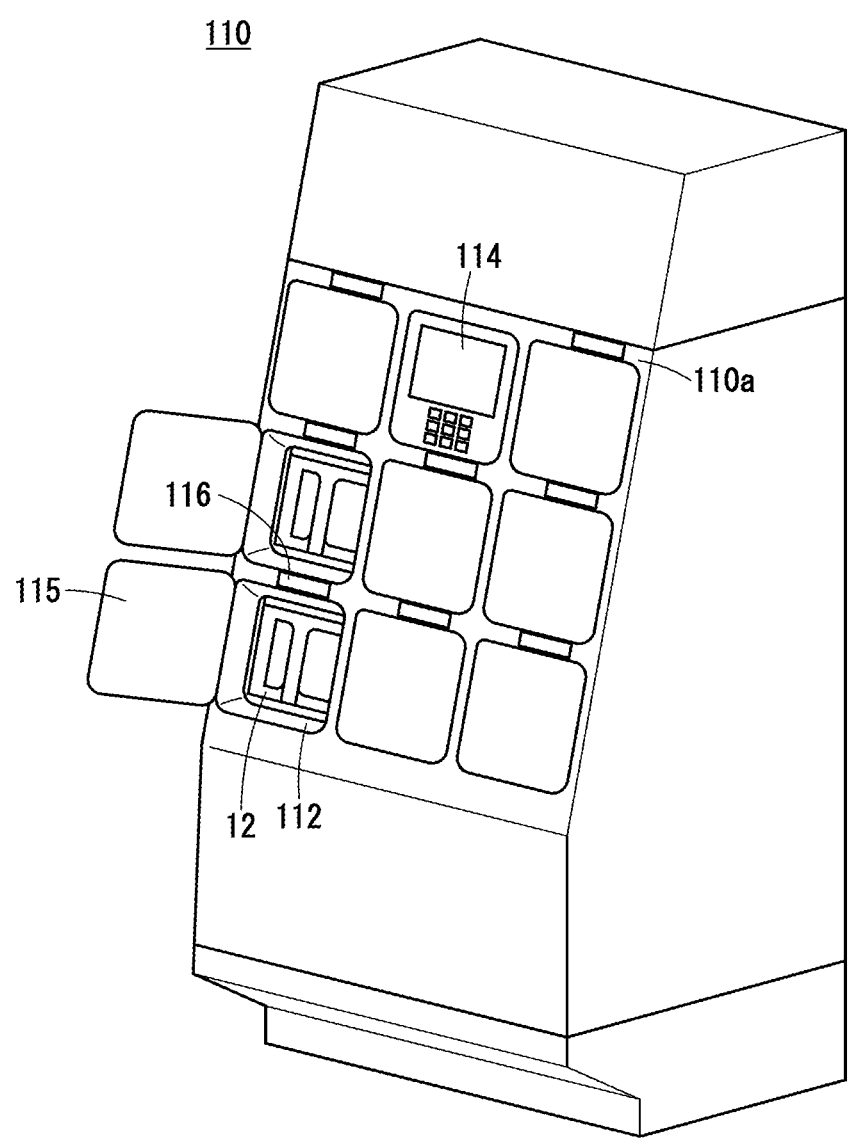
FIG. 43 is an external schematic diagram of a battery energy storage.

FIG. 43 is an external schematic diagram of a battery energy storage 110. A plurality (eight in the present embodiment) of the mobile batteries 12 are accommodated in the battery energy storage 110. The mobile batteries 12 inside the battery energy storage 110 are fully charged at a normal time, and the electrical power stored in the mobile batteries 12 is discharged, for example, at the time of a power outage or the like. The mobile batteries 12 that are used in the battery energy storage 110, for example, are the products that are repeatedly used in an electric motorcycle or the like, and become degraded, in a manner so that the state of health (SOH) thereof becomes no longer suitable for use in the electric motorcycle or the like. Further, the mobile batteries 12 that are used in the battery energy storage 110 may be new products that have not been subjected to deterioration. Furthermore, a portion of the mobile batteries 12 that are used in the battery energy storage 110 may be deteriorated products, and the rest of the mobile batteries 12 may be new products. The battery energy storage 110 corresponds to an external device of the present invention.

The battery energy storage 110 includes eight slots 112. The battery energy storage 110 includes a single operation panel 114. The mobile batteries 12 are accommodated in the slots 112. Unlike the battery exchange device 10 according to the first embodiment, taking out and insertion of the mobile batteries 12 is not carried out frequently in the battery energy storage 110. The mobile batteries 12 that are accommodated in the battery energy storage 110, for example, are replaced in the case that the mobile battery 12 has become damaged, or alternatively, in the case that the deterioration of the mobile battery 12 has progressed. An indicator 116 is provided above the slot 112. The indicator 116 displays the state of health of the mobile battery 12 that is accommodated in the slot 112 by illumination of colors, flashing, or the like. The operation panel 114 is a device that is operated by the user. By operating the operation panel 114, for example, the user is capable of initiating the supply of electrical power from the battery energy storage 110 to the exterior. The battery energy storage 110 includes a door 115 that closes the opening of each of the slots 112. The door 115 may be mounted thereon as an option.

Figure 44:
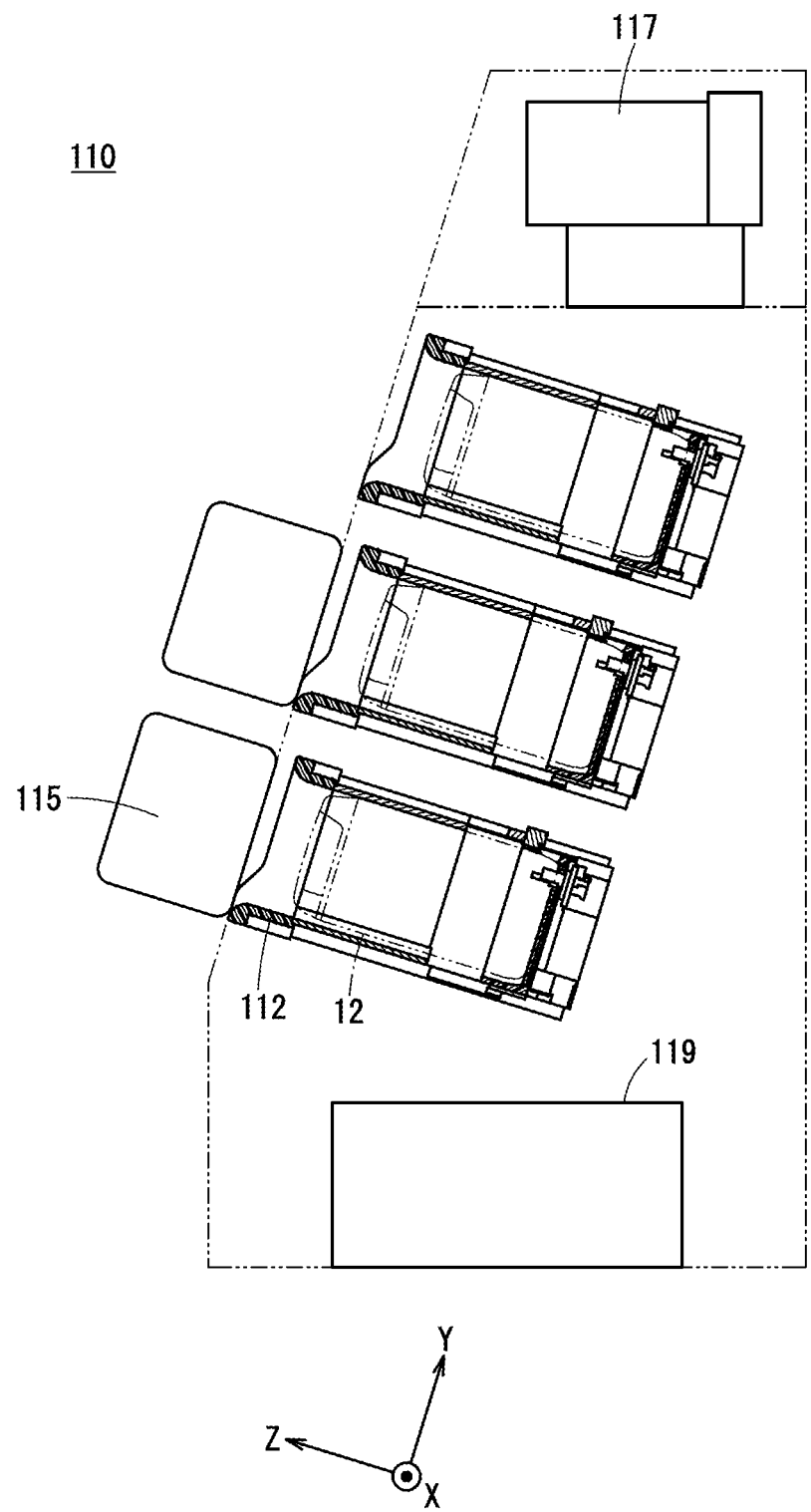
FIG. 44 is a cross-sectional view of the battery energy storage.

FIG. 44 is a cross-sectional view of the battery energy storage 110. The battery energy storage 110 includes a control device 117 located above the slots 112. The control device 117 controls charging, electrical power supply, and the like of the mobile batteries 12. At a time when the mobile battery 12 is charged, the control device 117 controls a non-illustrated AC/DC converter, and thereby converts AC electrical power supplied from a commercial electrical power source into DC electrical power and supplies the DC electrical power to the mobile battery 12. At a time when the mobile battery 12 is discharged, the control device 117 controls a non-illustrated DC/AC converter, and thereby converts the DC electrical power output from the mobile battery 12 into AC electrical power and supplies the AC electrical power to an external load. The battery energy storage 110 includes a utility space 119 located below the slots 112. A cooling device or the like may be installed in the utility space 119. The cooling device serves to cool the interior of the battery energy storage 110.

The present embodiment will be described based on an X-axis, a Y-axis, and a Z-axis, which are defined in the following manner. The direction in which the mobile battery 12 is inserted into the slot 112 is defined as a Z-axis direction, and a side where the slot 112 opens onto a front surface 110a of the battery energy storage 110 is defined as a positive side. A direction parallel to a widthwise direction of the battery energy storage 110 is defined as an X-axis direction, and a right side thereof when viewed from the side on which the slot 112 opens onto the front surface 110a of the battery energy storage 110 is defined as a positive side. A direction perpendicular to the Z-axis and the X-axis is defined as a Y-axis direction, and an upper side thereof is defined as a positive side.

Figure 45:
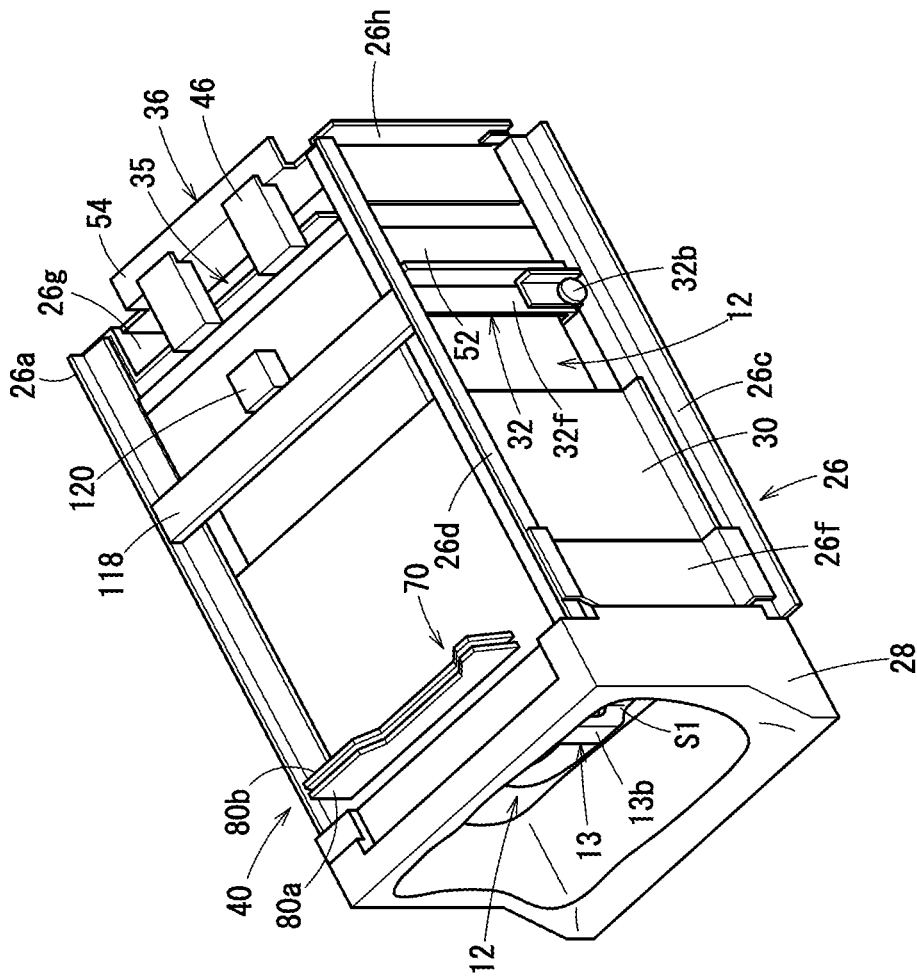
FIG. 45 is a perspective view showing the slot in a state with the mobile battery accommodated therein.
Figure 46:
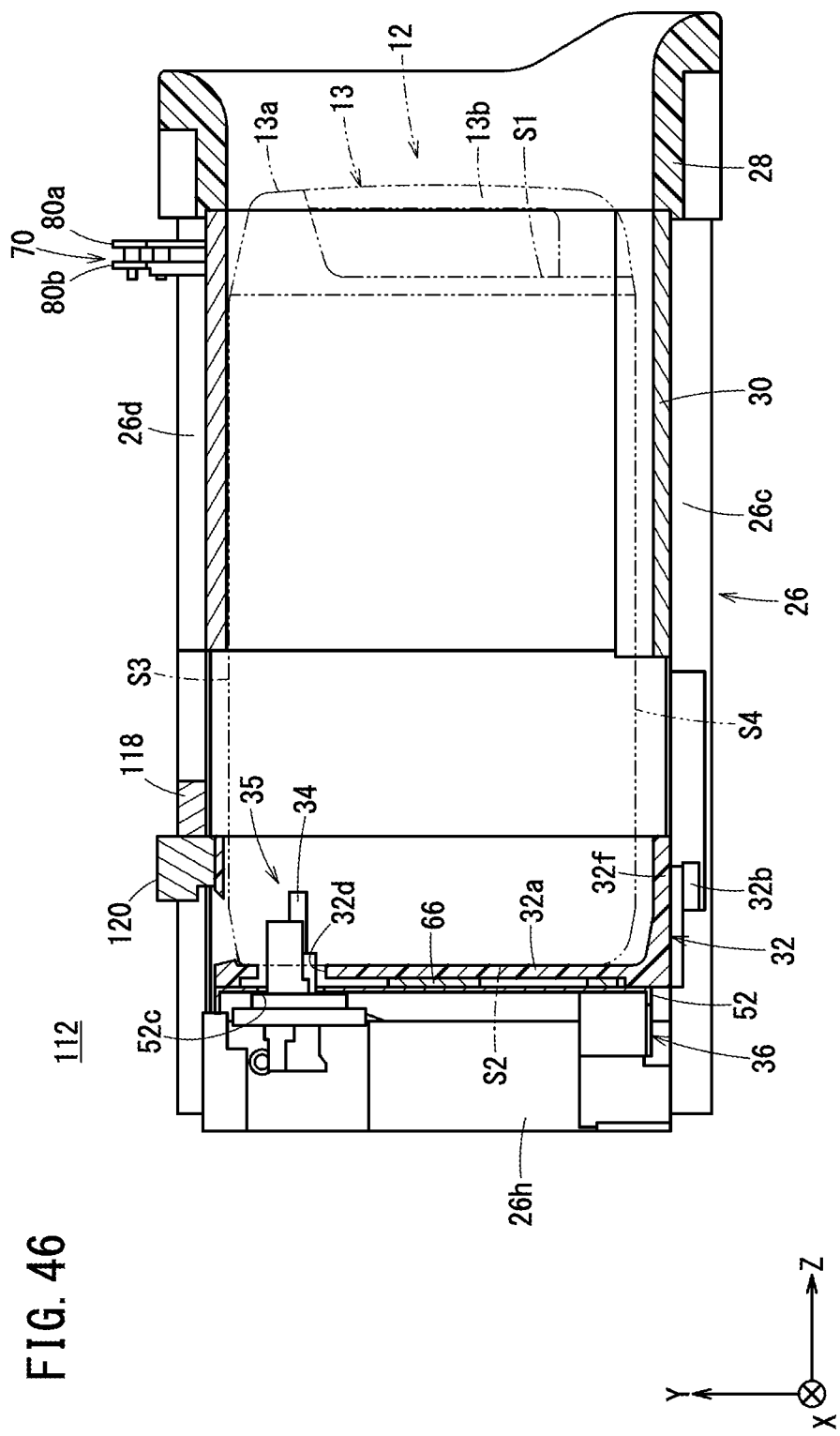
FIG. 46 is a cross-sectional view showing the slot in a state with the mobile battery accommodated therein.
Figure 47:
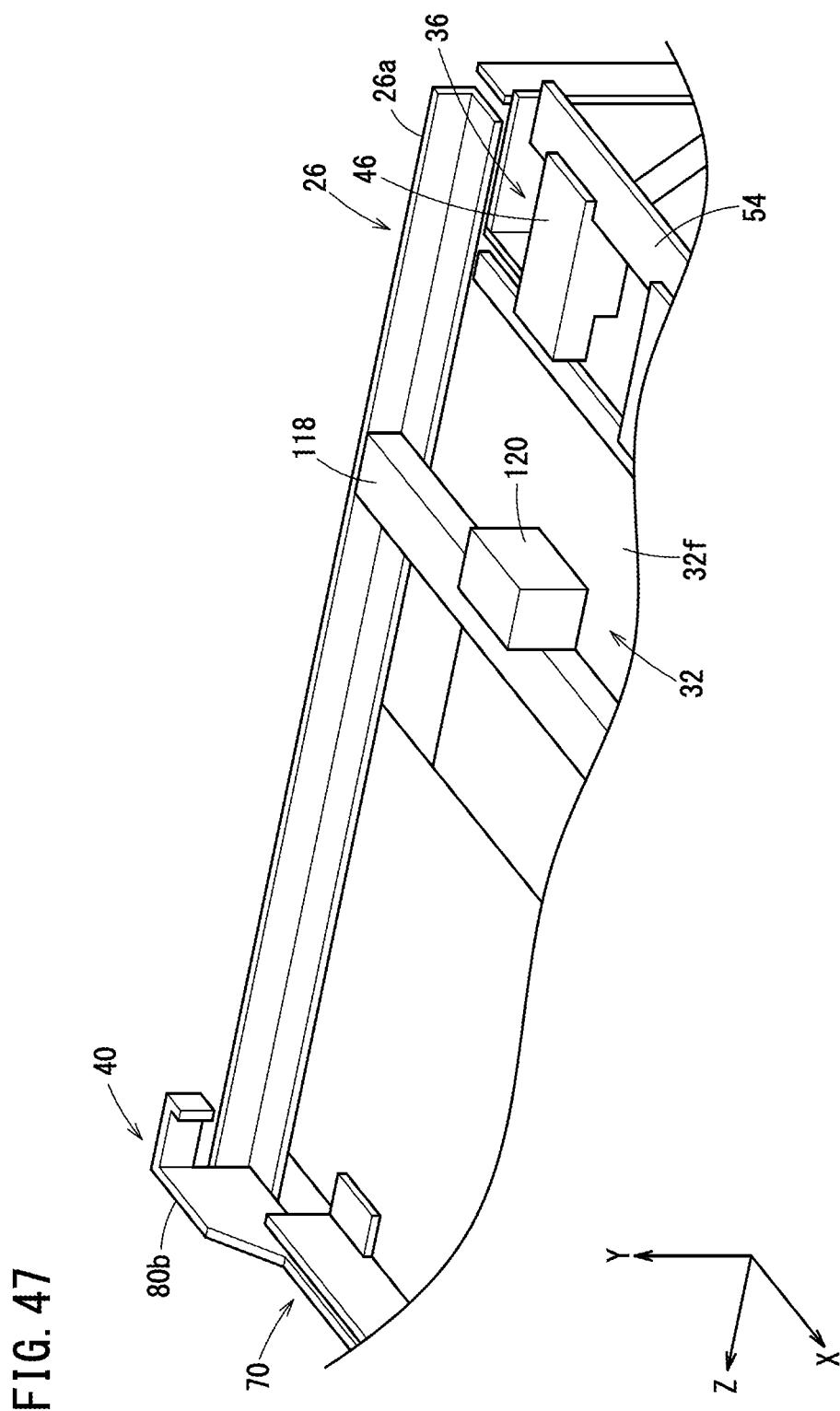
FIG. 47 is a partial perspective view of a side surface of the slot on a positive side in the Y-axis direction.

FIG. 45 is a perspective view showing the slot 112 in a state with the mobile battery 12 accommodated therein. FIG. 46 is a cross-sectional view showing the slot 112 in a state with the mobile battery 12 accommodated therein. The slot 112 shown in FIG. 46 is cut along a plane parallel to the YZ plane. FIG. 47 is a partial perspective view of a side surface of the slot 112 on the positive side in the Y-axis direction.

The slot 112 of the battery energy storage 110 has substantially the same configuration as that of the slot 14 of the battery exchange device 10 according to the first embodiment. However, the slot 112 does not include a portion of the configuration of the tray retention mechanism 36, all of the configuration of the tray lock mechanism 38, and a portion of the configuration of the battery lock mechanism 40 of the slot 14. Specifically, the slot 112 does not include the X-links 44, the air dampers 48, and the gas spring 50 of the tray retention mechanism 36. On the other hand, the slot 112 includes the stoppers 46 of the tray retention mechanism 36. Further, the slot 112 does not include the latch 58 and the striker 60 of the tray lock mechanism 38. Furthermore, the slot 112 does not include the shaft 68, the stopper lock unit 72, and the stopper lock releasing unit 74 of the battery lock mechanism 40. Furthermore, the slot 112 does not include the lever 79 and the torsion spring 82 of the stopper drive unit 70. On the other hand, the slot 112 includes the flaps 78a and 78b of the stopper drive unit 70.

In the configuration of the slot 112 of the battery energy storage 110, the same constituent parts as in the configuration of the slot 14 of the battery exchange device 10 are designated by the same reference numerals as in the first embodiment, and description thereof is omitted.

The slot 112 of the battery energy storage 110 includes a tray lock plate 118. The tray lock plate 118 is installed between the main frame 26a and the main frame 26d. A protruding part 120 is fixed to the tray main body 32f of the battery tray 32. The protruding part 120 is mounted on a side surface of the tray main body 32f on the positive side in the Y-axis direction. The protruding part 120 projects out toward the positive side in the Y-axis direction from the tray main body 32f. At a position where the battery tray 32 has moved to the negative side in the Z-axis direction, the protruding part 120 comes into contact with the tray lock plate 118 from the negative side in the Z-axis direction. In accordance with this feature, movement of the battery tray 32 to the positive side in the Z-axis direction is restricted.

Figure 48:
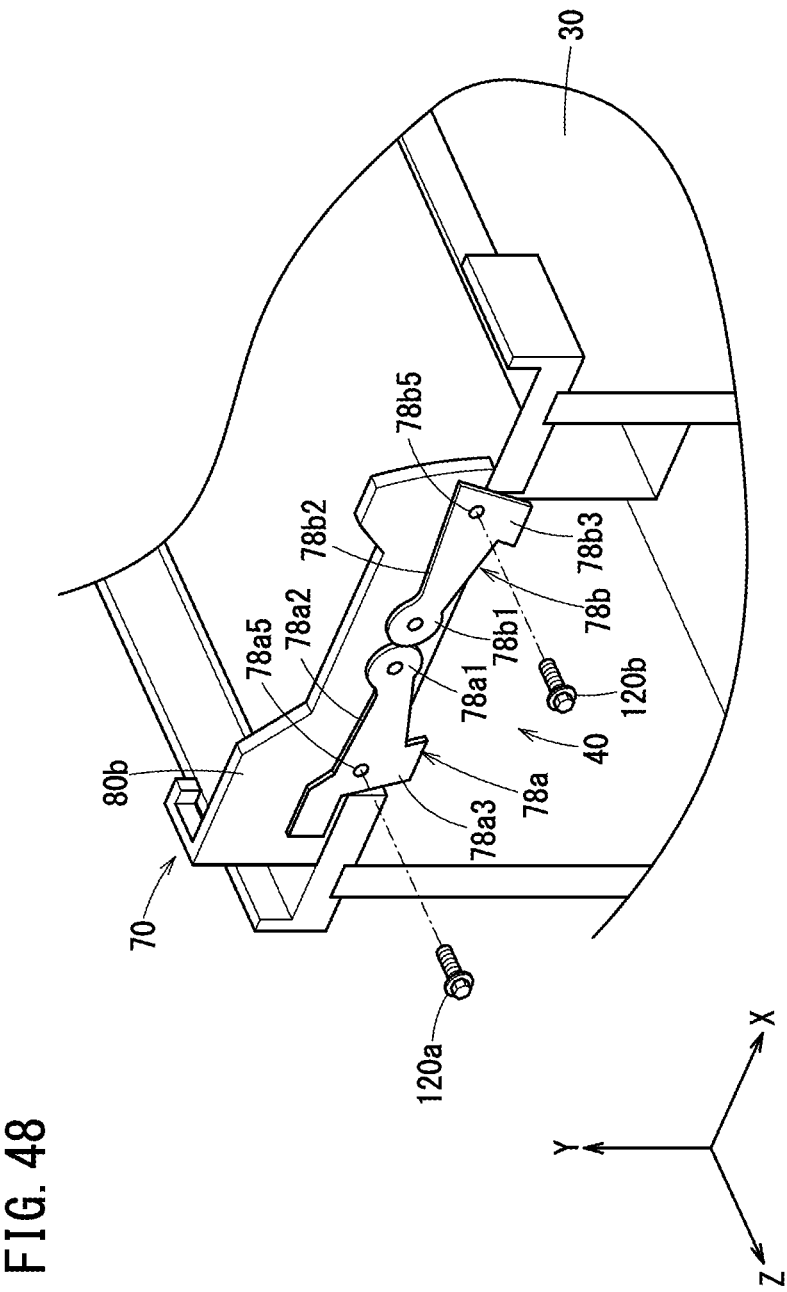
FIG. 48 is an enlarged perspective view of the battery lock mechanism.
Figure 49:
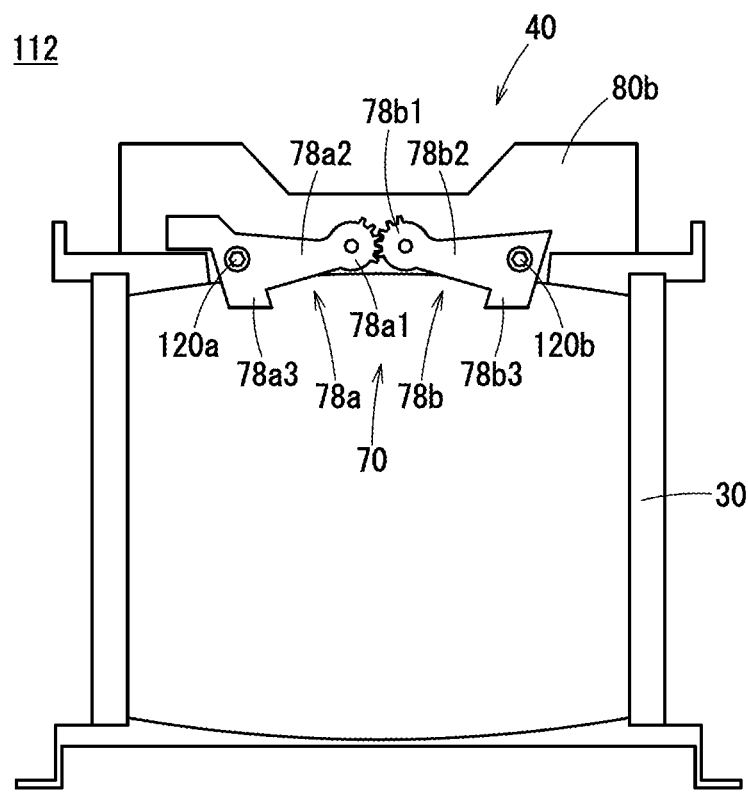
FIG. 49 is a cross-sectional front view of the slot.
Figure 50:
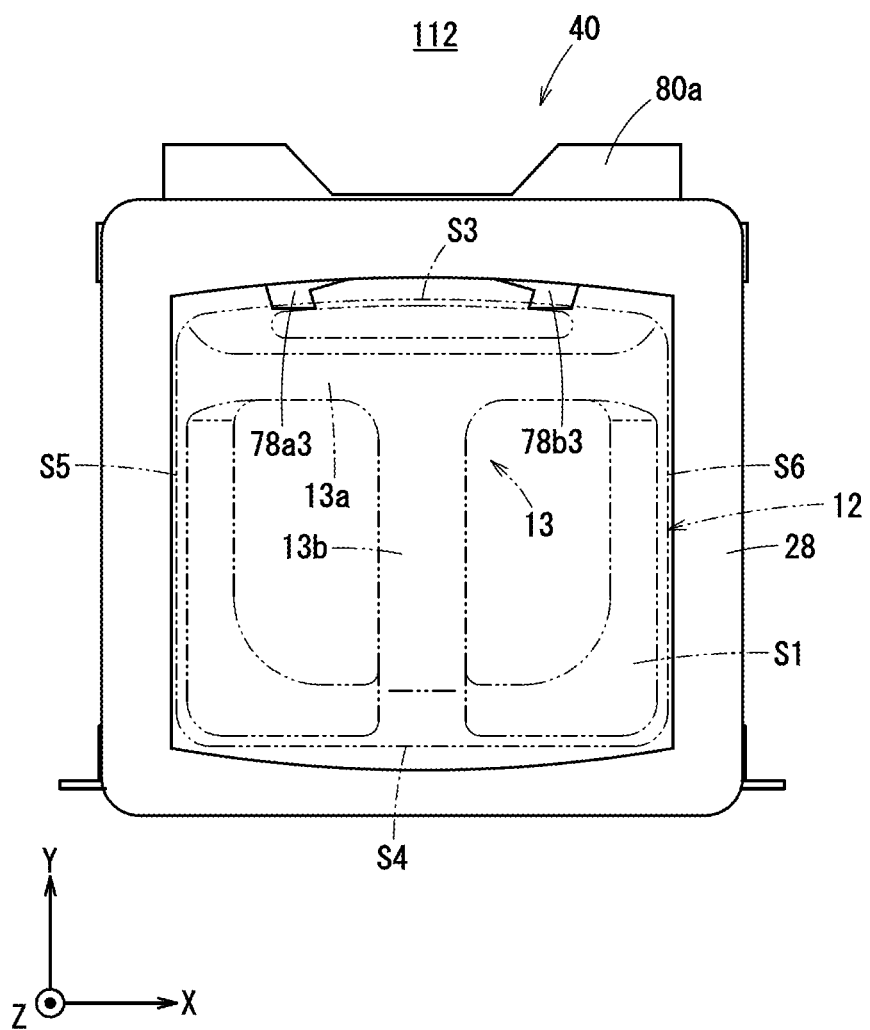
FIG. 50 is a front view of the slot.

FIG. 48 is an enlarged perspective view of the battery lock mechanism 40. FIG. 49 is a cross-sectional front view of the slot 112. The slot 112 shown in FIG. 49 is cut along a plane parallel to the XY plane. FIG. 50 is a front view of the slot 112.

The flaps 78a and 78b include bolt holes 78a5 and 78b5 in which bolts are fixed. The battery lock mechanism 40 is fixed by bolts 120a and 120b, in a state in which the flaps 78a and 78b are lowered. In accordance with this feature, at a time when the mobile battery 12 is about to be pulled out from the slot 112, the mobile battery 12 comes into contact with the stoppers 78a3 and 78b3. Consequently, the movement of the mobile battery 12 to the positive side in the Z-axis direction is restricted. Thus, the mobile battery 12 can be prevented from being stolen.

Although preferred embodiments of the present invention have been described above, the present invention is not limited to the embodiments described above, and various modifications are possible within a range that does not deviate from the essence and gist of the present invention.

The insertion opening 28 may be mounted in a manner so that the insertion opening 28 is capable of being replaced singly. A plurality of types of the insertion openings 28 having different shapes may be prepared. An insertion opening 28, which has a shape corresponding to the inclination of each of the slots 14 installed in the battery exchange device 10, is mounted therein. Further, a plurality of types of the insertion openings 28 made of different materials may be prepared. The insertion opening 28, which is made of a material corresponding to the region in which the battery exchange device 10 is installed, is mounted therein.

The battery exchange device 10 according to the first embodiment need not necessarily include the doors 18. According to the above-described first embodiment, the battery exchange device 10 is configured to initiate charging of the mobile battery 12 when the user accommodates the mobile battery 12 in the slot 14 and closes the door 18. In the case that the battery exchange device 10 does not include the doors 18, the battery exchange device 10 may initiate charging of the mobile battery 12 when a state is brought about in which the mobile battery 12 is pushed into the slot 14.

[Inventions that can be Obtained from Embodiments]

Inventions that are capable of being grasped from the above-described embodiments will be described below.

The present invention is characterized by the battery (12) having a substantially rectangular parallelepiped outer shape, the battery comprising the first surface (S1) and the second surface (S2) which are side surfaces of both ends thereof in a longitudinal direction, the third surface (S3) which is a side surface substantially perpendicular to the first surface and the second surface, the fourth surface (S4) which is a side surface substantially perpendicular to the first surface and the second surface, and which is on an opposite side from the third surface, the fifth surface (S5) which is a side surface substantially perpendicular to the first surface, the second surface, the third surface, and the fourth surface, the sixth surface (S6) which is a side surface substantially perpendicular to the first surface and the second surface, and which is on an opposite side from the fifth surface, and the grip member (13) provided on the first surface, wherein the grip member includes the first portion (13a) that extends in a direction from the fifth surface toward the sixth surface, at a position between the third surface and the fourth surface and closer to the third surface than the fourth surface, and the second portion (13b) that extends in a direction from the third surface toward the fourth surface, at an intermediate part in the direction from the fifth surface toward the sixth surface, in the longitudinal direction of the first portion, the intermediate part of the first portion is separated from the first surface, and both end parts of the first portion are connected to the first surface, the second portion includes the first end part and the second end part which are end parts in the longitudinal direction of the second portion, and the intermediate part which is a portion between the first end part and the second end part, the first end part of the second portion is connected to the intermediate part of the first portion and is separated from the first surface, the intermediate part of the second portion is separated from the first surface, and the second end part of the second portion is directly connected to the first surface.

In the above-described battery, the fifth surface and the sixth surface may each have a planar shape, the plurality of cells (17) each having an elongated shape may be included inside the battery, each of the cells may include electrodes (17a) at both ends in the longitudinal direction thereof, and each of the cells may be arranged in a manner so that the longitudinal direction thereof is a direction substantially perpendicular to the fifth surface and the sixth surface.

In the above-described battery, the third surface may have a curved shape that is convex toward an outer side, and the fourth surface, the fifth surface, and the sixth surface may each have a planar shape.

The above-described battery may further comprise, on the second surface, the connector (15) which carries out input and output of electrical power by being connected to the external device (10, 110), and the connector may be arranged at a position between the third surface and the fourth surface and closer to the third surface than the fourth surface.

REFERENCE SIGNS LIST

10 . . . battery exchange device (external device)
12 . . . mobile battery (battery)
13 . . . handle (grip member)
13a . . . first portion
13b . . . second portion
15 . . . connector
17 . . . cell
17a . . . electrode
110 . . . battery energy storage (external device)
S1 . . . first surface
S2 . . . second surface
S3 . . . third surface
S4 . . . fourth surface
S5 . . . fifth surface
S6 . . . sixth surface

The invention claimed is:

1. A battery having a substantially rectangular parallelepiped outer shape, the battery comprising:
   a first surface and a second surface which are side surfaces of both ends thereof in a longitudinal direction;
   a third surface which is a side surface substantially perpendicular to the first surface and the second surface;
   a fourth surface which is a side surface substantially perpendicular to the first surface and the second surface, and which is on an opposite side from the third surface;
   a fifth surface which is a side surface substantially perpendicular to the first surface, the second surface, the third surface, and the fourth surface;
   a sixth surface which is a side surface substantially perpendicular to the first surface and the second surface, and which is on an opposite side from the fifth surface; and
   a grip member provided on the first surface,
   wherein the grip member is formed in a T-shape when the battery is viewed from a side of the first surface,
   the grip member includes:
   a first portion configured to extend in a direction from the fifth surface toward the sixth surface, at a position between the third surface and the fourth surface and closer to the third surface than the fourth surface; and
   a second portion configured to extend in a direction from the third surface toward the fourth surface, from an intermediate part of the first portion in the direction from the fifth surface toward the sixth surface,
   in a longitudinal direction of the first portion, the intermediate part is separated from the first surface, and a space is formed between the first portion and the first surface,
   both end parts of the first portion are connected to the first surface,
   the second portion is arranged at a position at which a distance between the second portion and the fifth surface is substantially equal to a distance between the second portion and the sixth surface,
   the second portion includes a first end part which is one of end parts in a longitudinal direction of the second portion and which is close to the third surface, a second end part which is another one of the end parts in the longitudinal direction of the second portion and which is close to the fourth surface, and another intermediate part which is a portion between the first end part and the second end part,
   the first end part of the second portion is connected to the intermediate part of the first portion and is separated from the first surface, the another intermediate part of the second portion is separated from the first surface, and a space is formed between the second portion and the first surface, and
   the second end part of the second portion is directly connected to the first surface, and distanced from at least one of the fifth surface and the sixth surface in the longitudinal direction of the first portion.

2. The battery according to claim 1, wherein:
   the third surface has a curved shape that is convex toward an outer side; and
   the fourth surface, the fifth surface, and the sixth surface each have a planar shape.

3. The battery according to claim 1, further comprising, on the second surface, a connector configured to carry out input and output of electrical power by being connected to an external device, wherein
   the connector is arranged at a position between the third surface and the fourth surface and closer to the third surface than the fourth surface.

4. The battery according to claim 1, wherein:
   the fifth surface and the sixth surface each have a planar shape;
   a plurality of cells each having an elongated shape are included inside the battery;
   each of the cells includes electrodes at both ends in a longitudinal direction thereof; and
   each of the cells is arranged in a manner so that the longitudinal direction thereof is a direction substantially perpendicular to the fifth surface and the sixth surface.

* * * * *